(12) United States Patent
Sambonsugi

(10) Patent No.: US 9,961,255 B2
(45) Date of Patent: May 1, 2018

(54) IMAGE CAPTURING APPARATUS, CONTROL METHOD THEREOF, AND STORAGE MEDIUM

(71) Applicant: CANON KABUSHIKI KAISHA, Tokyo (JP)

(72) Inventor: Hideaki Sambonsugi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days. days.

(21) Appl. No.: 15/427,377

(22) Filed: Feb. 8, 2017

(65) Prior Publication Data
US 2017/0230569 A1    Aug. 10, 2017

(30) Foreign Application Priority Data

Feb. 9, 2016   (JP) .................................. 2016-023081
Nov. 1, 2016   (JP) .................................. 2016-214642

(51) Int. Cl.
*H04N 5/217*   (2011.01)
*H04N 5/232*   (2006.01)
(Continued)

(52) U.S. Cl.
CPC ......... *H04N 5/23212* (2013.01); *H04N 5/243* (2013.01); *H04N 5/3696* (2013.01); *H04N 5/378* (2013.01)

(58) Field of Classification Search
CPC ........ H04N 5/378; H04N 5/374; H04N 9/045; H04N 5/335; H04N 5/35563; H04N 5/37452; H04N 5/35581; H04N 5/217; H04N 5/357; H04N 5/2173; H04N 5/3575; H04N 5/365; H04N 5/3653; H04N 1/58; H04N 1/409; H01L 27/14627;
(Continued)

(56) References Cited

U.S. PATENT DOCUMENTS

2011/0221940 A1*  9/2011  Kato .................... H04N 5/3745
                                                348/250
2012/0006973 A1*  1/2012  Storm .................. H04N 5/3575
                                                250/208.1
(Continued)

FOREIGN PATENT DOCUMENTS

JP       2001-083407 A      3/2001
JP       2014-182360 A      9/2014

*Primary Examiner* — Chia-Wei A Chen
(74) *Attorney, Agent, or Firm* — Cowan, Liebowitz & Latman, P.C.

(57) ABSTRACT

An image capturing apparatus comprises an image sensor; a readout unit that reads out an added signal and that independently reads out the signal of the first photoelectric conversion portion; a calculation unit that calculates a signal corresponding to a signal of the second photoelectric conversion portion by subtracting the signal of the first photoelectric conversion portion from the added signal; a correlation calculation unit that performs correlation calculation for the signal of the first photoelectric conversion portion and the signal corresponding to the signal of the second photoelectric conversion portion; and a subtraction unit that subtracts, from the result of the correlation calculation on an object image by the correlation calculation unit, a correction value for correcting noise caused by obtaining the signal corresponding to the signal of the second photoelectric conversion portion.

32 Claims, 43 Drawing Sheets

(51) Int. Cl.
*H04N 5/378* (2011.01)
*H04N 5/243* (2006.01)
*H04N 5/369* (2011.01)

(58) Field of Classification Search
CPC .............. G01R 29/26; H04B 10/07953; G06T 2207/20182; G06K 9/40
See application file for complete search history.

(56) References Cited

U.S. PATENT DOCUMENTS

| | | | | |
|---|---|---|---|---|
| 2012/0026370 A1* | 2/2012 | Oike | .................... | H04N 5/2176 348/298 |
| 2012/0320246 A1* | 12/2012 | Ikuma | .................. | H04N 5/3575 348/300 |
| 2013/0044247 A1* | 2/2013 | Kawahito | .......... | H04N 5/35581 348/296 |
| 2014/0036122 A1* | 2/2014 | Hagihara | ............... | H04N 5/378 348/302 |
| 2014/0077065 A1* | 3/2014 | Hagihara | ............ | H03M 1/0624 250/208.1 |
| 2014/0192249 A1* | 7/2014 | Kishi | ................. | H04N 5/23212 348/349 |
| 2015/0237278 A1* | 8/2015 | Sakakibara | .......... | H04N 5/3698 348/301 |
| 2015/0304582 A1* | 10/2015 | Hirota | .................... | H04N 5/378 348/49 |
| 2016/0255293 A1* | 9/2016 | Gesset | ................... | H04N 5/357 348/308 |
| 2016/0373667 A1* | 12/2016 | Kim | ...................... | H04N 5/3532 |
| 2016/0373668 A1* | 12/2016 | Komai | ............. | H01L 27/14603 |
| 2017/0085817 A1* | 3/2017 | Yeh | ......................... | H03M 1/34 |
| 2017/0359531 A1* | 12/2017 | Sakakibara | .......... | H04N 5/3745 |

\* cited by examiner

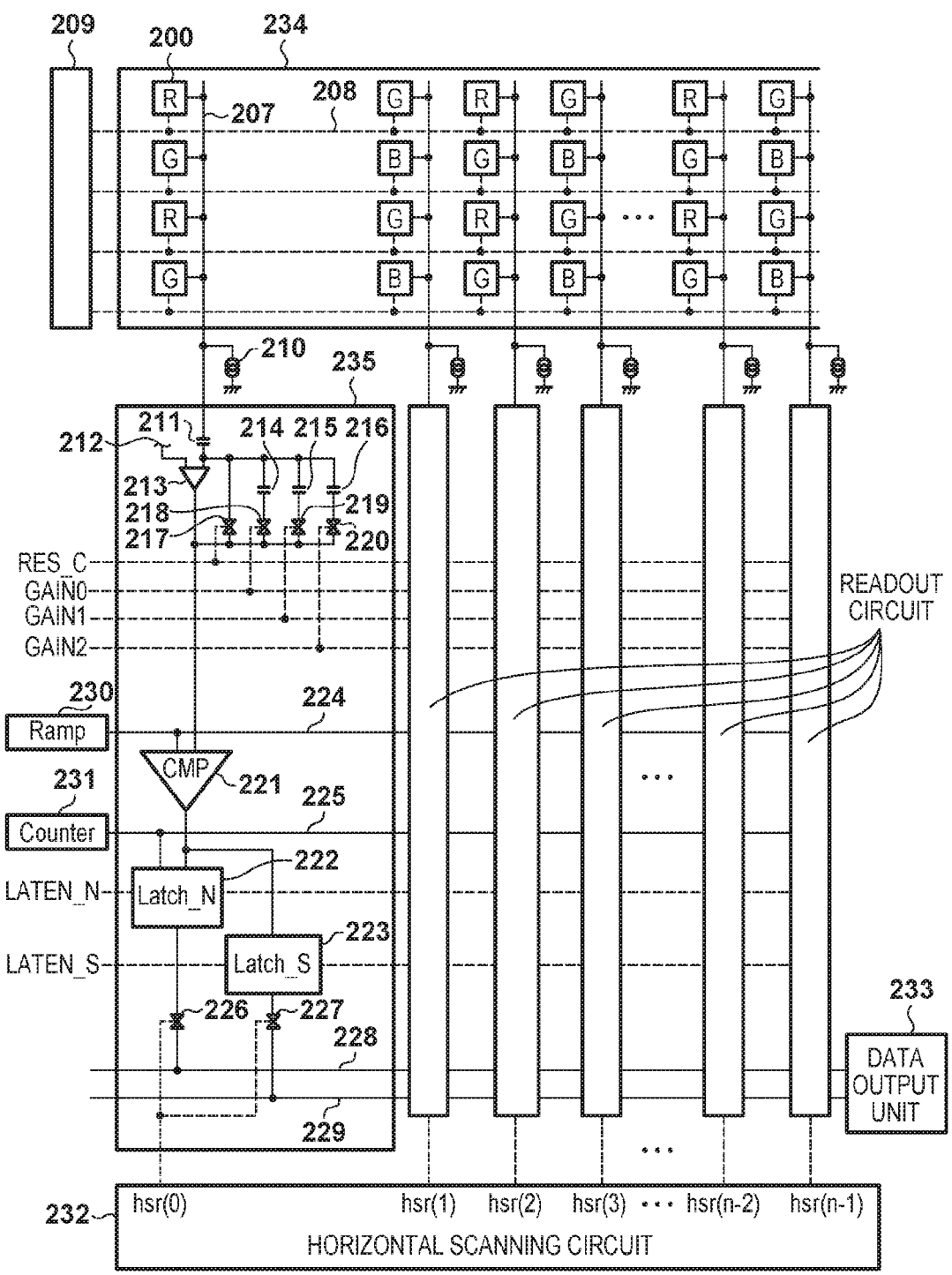

F I G. 5A
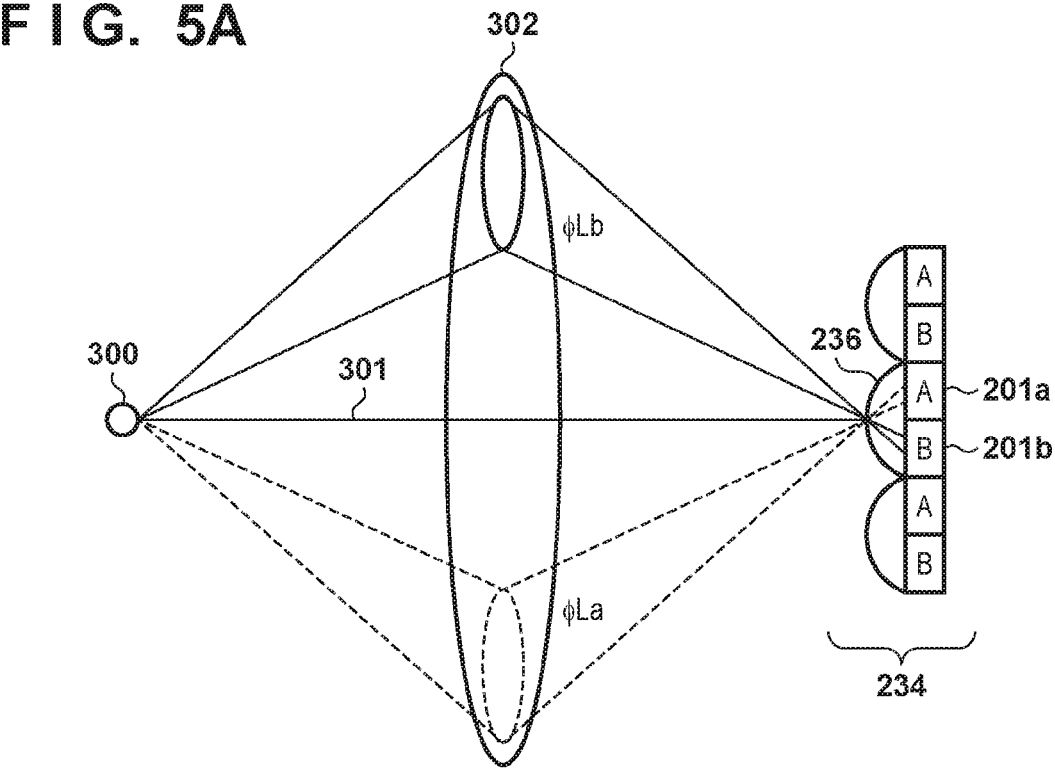
F I G. 5B
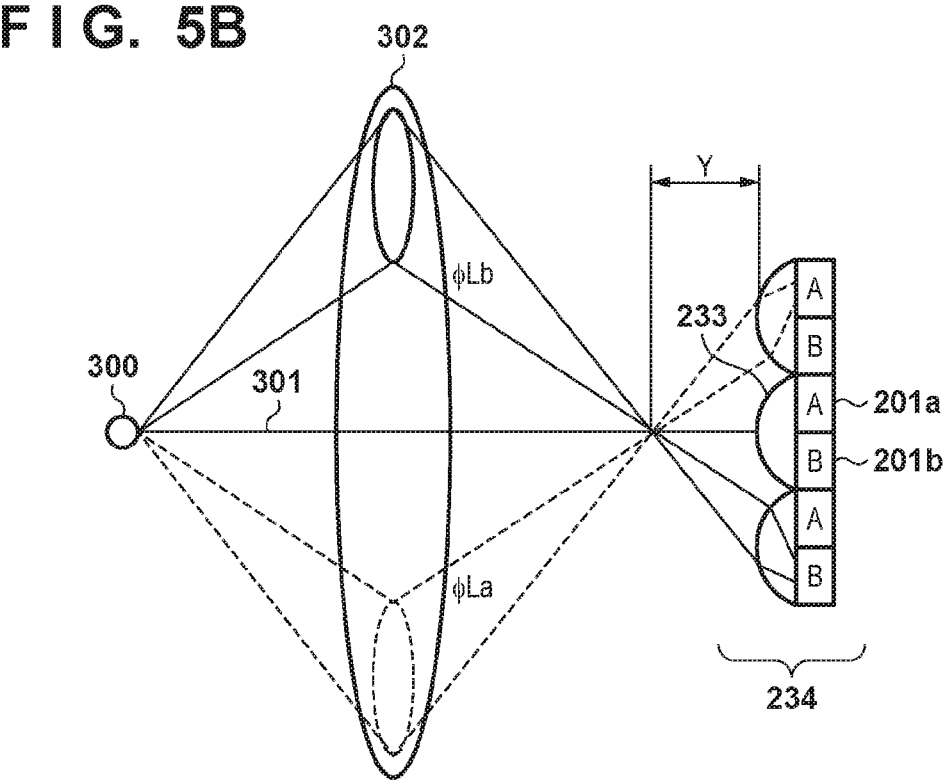

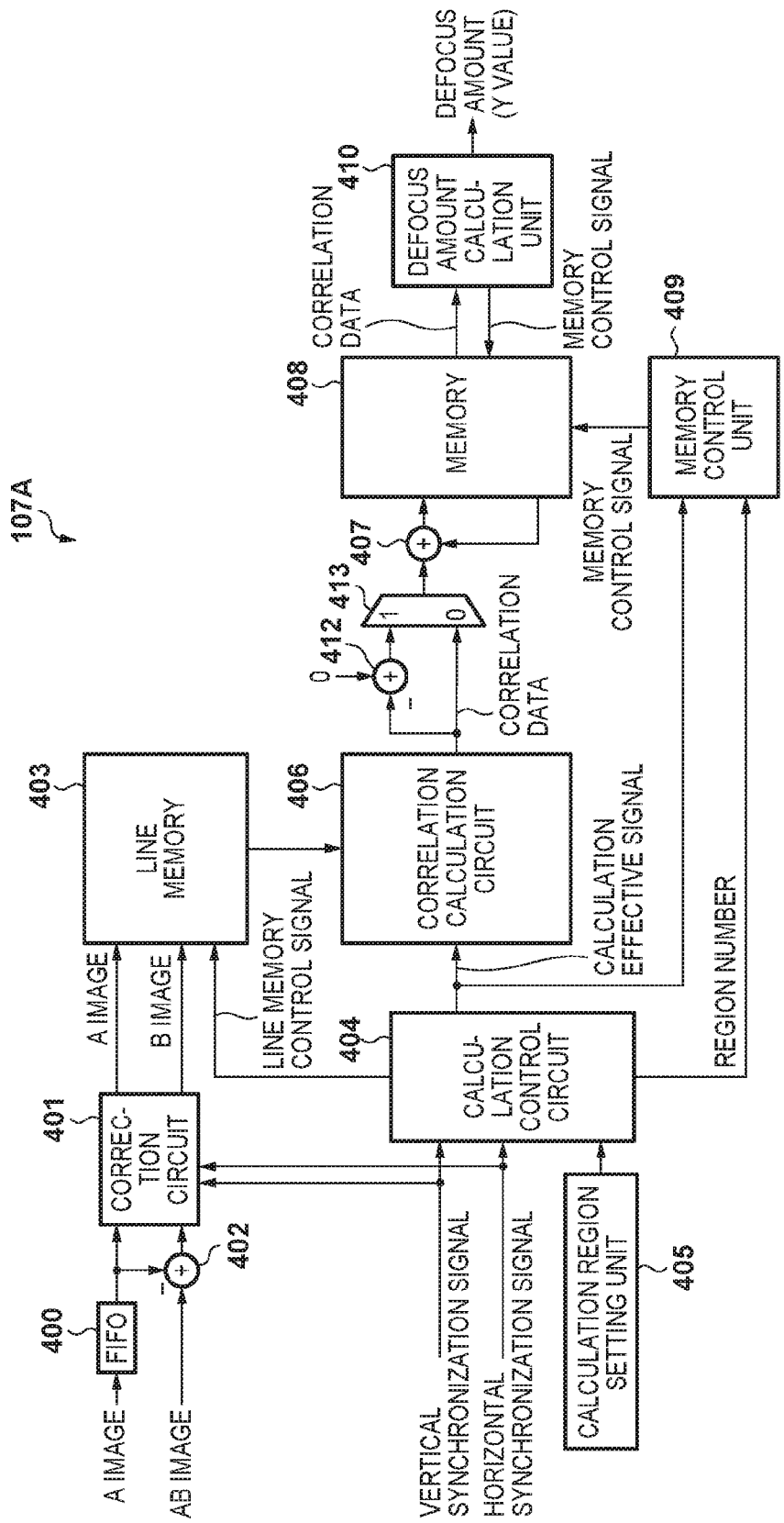

FIG. 18A

| Address | | |
|---|---|---|
| k | $-c22(S)$ | |
| k-1 | $-c22(S-1)$ | |
| · | ... | c22 |
| · | $-c22(-S+1)$ | |
| · | $-c22(-S)$ | |
| · | $-c21(S)$ | |
| · | $-c21(S-1)$ | |
| · | ... | c21 |
| · | $-c21(-S+1)$ | |
| · | $-c21(-S)$ | |
| · | $-c20(S)$ | |
| · | $-c20(S-1)$ | |
| · | ... | c20 |
| · | $-c20(-S+1)$ | |
| · | $-c20(-S)$ | |
| · | $-c12(S)$ | |
| · | $-c12(S-1)$ | |
| · | ... | c12 |
| · | $-c12(-S+1)$ | |
| · | $-c12(-S)$ | |
| · | $-c11(S)$ | |
| · | $-c11(S-1)$ | |
| · | ... | c11 |
| · | $-c11(-S+1)$ | |
| · | $-c11(-S)$ | |
| · | $-c10(S)$ | |
| · | $-c10(S-1)$ | |
| · | ... | c10 |
| · | $-c10(-S+1)$ | |
| · | $-c10(-S)$ | |
| · | $-c02(S)$ | |
| · | $-c02(S-1)$ | |
| · | ... | c02 |
| · | $-c02(-S+1)$ | |
| · | $-c02(-S)$ | |
| · | $-c01(S)$ | |
| · | $-c01(S-1)$ | |
| · | ... | c01 |
| · | $-c01(-S+1)$ | |
| · | $-c01(-S)$ | |
| · | $-c00(S)$ | |
| · | $-c00(S-1)$ | |
| · | ... | c00 |
| 1 | $-c00(-S+1)$ | |
| 0 | $-c00(-S)$ | |

| Address | | |
|---|---|---|
| k | $-c22(S) + d22(S)$ | |
| k-1 | $-c22(S-1) + d22(S-1)$ | |
| · | ... | c22,d22 |
| · | $-c22(-S) + d22(-S+1)$ | |
| · | $-c22(-S) + d22(-S)$ | |
| · | $-c21(S) + d21(S)$ | |
| · | $-c21(S-1) + d21(S-1)$ | |
| · | ... | c21,d21 |
| · | $-c21(-S) + d21(-S+1)$ | |
| · | $-c21(-S) + d21(-S)$ | |
| · | $-c20(S) + d20(S)$ | |
| · | $-c20(S-1) + d20(S-1)$ | |
| · | ... | c20,d20 |
| · | $-c20(-S) + d20(-S+1)$ | |
| · | $-c20(-S) + d20(-S)$ | |
| · | $-c12(S) + d12(S)$ | |
| · | $-c12(S-1) + d12(S-1)$ | |
| · | ... | c12,d12 |
| · | $-c12(-S) + d12(-S+1)$ | |
| · | $-c12(-S) + d12(-S)$ | |
| · | $-c11(S) + d11(S)$ | |
| · | $-c11(S-1) + d11(S-1)$ | |
| · | ... | c11,d11 |
| · | $-c11(-S) + d11(-S+1)$ | |
| · | $-c11(-S) + d11(-S)$ | |
| · | $-c10(S) + d10(S)$ | |
| · | $-c10(S-1) + d10(S-1)$ | |
| · | ... | c10,d10 |
| · | $-c10(-S) + d10(-S+1)$ | |
| · | $-c10(-S) + d10(-S)$ | |
| · | $-c02(S) + d02(S)$ | |
| · | $-c02(S-1) + d02(S-1)$ | |
| · | ... | c02,d02 |
| · | $-c02(-S) + d02(-S+1)$ | |
| · | $-c02(-S) + d02(-S)$ | |
| · | $-c01(S) + d01(S)$ | |
| · | $-c01(S-1) + d01(S-1)$ | |
| · | ... | c01,d01 |
| · | $-c01(-S) + d01(-S+1)$ | |
| · | $-c01(-S) + d01(-S)$ | |
| · | $-c00(S) + d00(S)$ | |
| · | $-c00(S-1) + d00(S-1)$ | |
| · | ... | c00,d00 |
| 1 | $-c00(-S) + d00(-S+1)$ | |
| 0 | $-c00(-S) + d00(-S)$ | |

| Address | | | |
|---|---|---|---|
| k | $-e02(S)*\alpha$ | | ↕ 408 |
| k-1 | $-e02(S-1)*\alpha$ | | |
| • | ... | e02 | |
| • | $-e02(-S)*\alpha$ | | |
| • | $-e02(-S)*\alpha$ | | |
| • | $-e01(S)*\alpha$ | | |
| • | $-e01(S-1)*\alpha$ | | |
| • | ... | e01 | |
| • | $-e01(-S)*\alpha$ | | |
| • | $-e01(-S)*\alpha$ | | |
| • | $-e00(S)*\alpha$ | | |
| • | $-e00(S-1)*\alpha$ | | |
| • | ... | e00 | |
| • | $-e00(-S)*\alpha$ | | |
| • | $-e00(-S)*\alpha$ | | |
| • | $-e02(S)*\alpha$ | | |
| • | $-e02(S-1)*\alpha$ | | |
| • | ... | e02 | |
| • | $-e02(-S)*\alpha$ | | |
| • | $-e02(-S)*\alpha$ | | |
| • | $-e01(S)*\alpha$ | | |
| • | $-e01(S-1)*\alpha$ | | |
| • | ... | e01 | |
| • | $-e01(-S)*\alpha$ | | |
| • | $-e01(-S)*\alpha$ | | |
| • | $-e00(S)*\alpha$ | | |
| • | $-e00(S-1)*\alpha$ | | |
| • | ... | e00 | |
| • | $-e00(-S)*\alpha$ | | |
| • | $-e00(-S)*\alpha$ | | |
| • | $-e02(S)*\alpha$ | | |
| • | $-e02(S-1)*\alpha$ | | |
| • | ... | e02 | |
| • | $-e02(-S)*\alpha$ | | |
| • | $-e02(-S)*\alpha$ | | |
| • | $-e01(S)*\alpha$ | | |
| • | $-e01(S-1)*\alpha$ | | |
| • | ... | e01 | |
| • | $-e01(-S)*\alpha$ | | |
| • | $-e01(-S)*\alpha$ | | |
| • | $-e00(S)*\alpha$ | | |
| • | $-e00(S-1)*\alpha$ | | |
| • | ... | e00 | |
| 1 | $-e00(-S)*\alpha$ | | |
| 0 | $-e00(-S)*\alpha$ | | |

FIG. 23B

| Address | | | |
|---|---|---|---|
| k | $-e02(S)*\alpha + f22(S)$ | | ↕ 408 |
| k-1 | $-e02(S-1)*\alpha + f22(S-1)$ | | |
| • | ... | e02,f22 | |
| • | $-e02(-S)*\alpha + f22(-S+1)$ | | |
| • | $-e02(-S)*\alpha + f22(-S)$ | | |
| • | $-e01(S)*\alpha + f21(S)$ | | |
| • | $-e01(S-1)*\alpha + f21(S-1)$ | | |
| • | ... | e01,f21 | |
| • | $-e01(-S)*\alpha + f21(-S+1)$ | | |
| • | $-e01(-S)*\alpha + f21(-S)$ | | |
| • | $-e00(S)*\alpha + f20(S)$ | | |
| • | $-e00(S-1)*\alpha + f20(S-1)$ | | |
| • | ... | e00,f20 | |
| • | $-e00(-S)*\alpha + f20(-S+1)$ | | |
| • | $-e00(-S)*\alpha + f20(-S)$ | | |
| • | $-e02(S)*\alpha + f12(S)$ | | |
| • | $-e02(S-1)*\alpha + f12(S-1)$ | | |
| • | ... | e02,f12 | |
| • | $-e02(-S)*\alpha + f12(-S+1)$ | | |
| • | $-e02(-S)*\alpha + f12(-S)$ | | |
| • | $-e01(S)*\alpha + f11(S)$ | | |
| • | $-e01(S-1)*\alpha + f11(S-1)$ | | |
| • | ... | e01,f11 | |
| • | $-e01(-S)*\alpha + f11(-S+1)$ | | |
| • | $-e01(-S)*\alpha + f11(-S)$ | | |
| • | $-e00(S)*\alpha + f10(S)$ | | |
| • | $-e00(S-1)*\alpha + f10(S-1)$ | | |
| • | ... | e00,f10 | |
| • | $-e00(-S)*\alpha + f10(-S+1)$ | | |
| • | $-e00(-S)*\alpha + f10(-S)$ | | |
| • | $-e02(S)*\alpha + f02(S)$ | | |
| • | $-e02(S-1)*\alpha + f02(S-1)$ | | |
| • | ... | e02,f02 | |
| • | $-e02(-S)*\alpha + f02(-S+1)$ | | |
| • | $-e02(-S)*\alpha + f02(-S)$ | | |
| • | $-e01(S)*\alpha + f01(S)$ | | |
| • | $-e01(S-1)*\alpha + f01(S-1)$ | | |
| • | ... | e01,f01 | |
| • | $-e01(-S)*\alpha + f01(-S+1)$ | | |
| • | $-e01(-S)*\alpha + f01(-S)$ | | |
| • | $-e00(S)*\alpha + f00(S)$ | | |
| • | $-e00(S-1)*\alpha + f00(S-1)$ | | |
| • | ... | e00,f00 | |
| 1 | $-e00(-S)*\alpha + f00(-S+1)$ | | |
| 0 | $-e00(-S)*\alpha + f00(-S)$ | | |

FIG. 27
SHIFT AMOUNT:-2
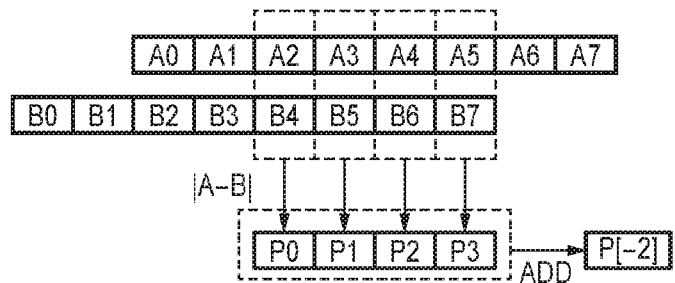
SHIFT AMOUNT:-1
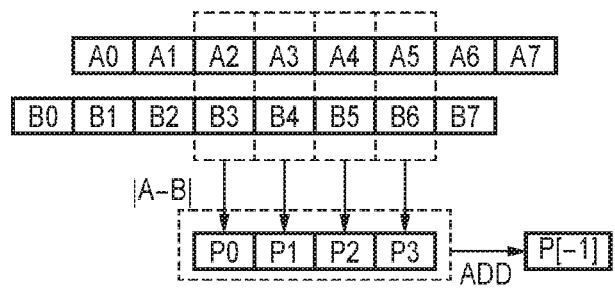
SHIFT AMOUNT:0
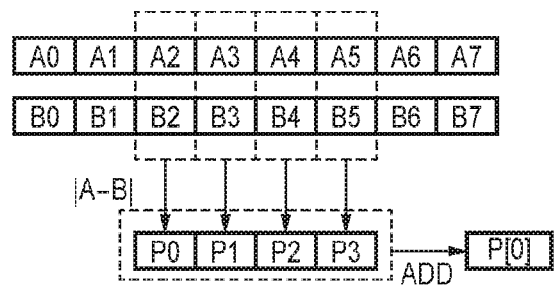
SHIFT AMOUNT:+1
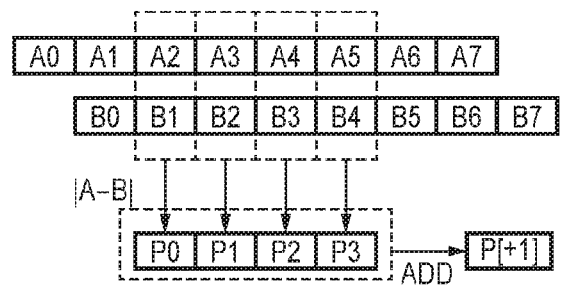
SHIFT AMOUNT:+2
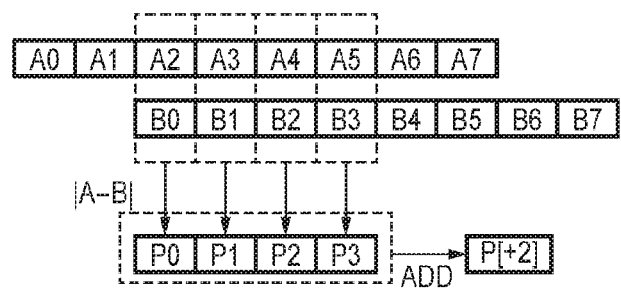

F I G. 29

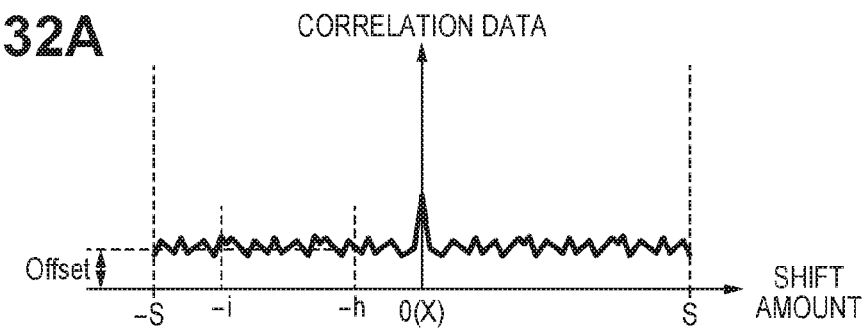
F I G. 32A
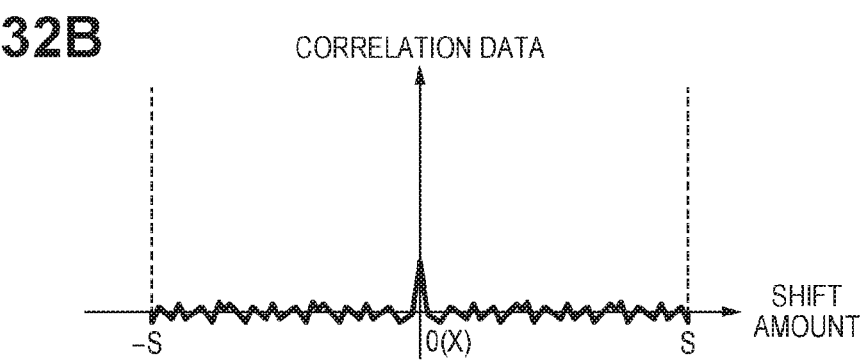
F I G. 32B
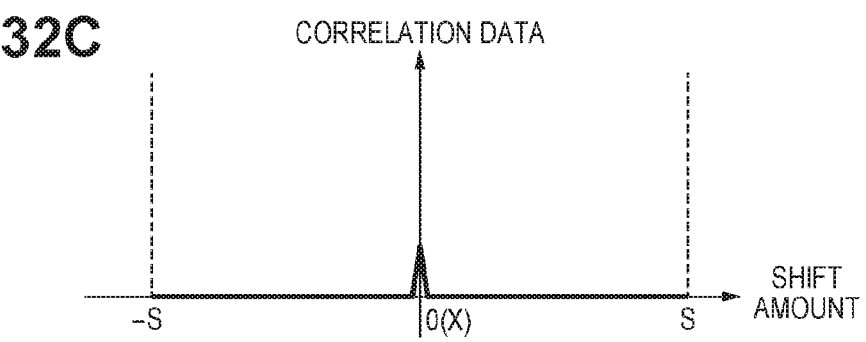
F I G. 32C
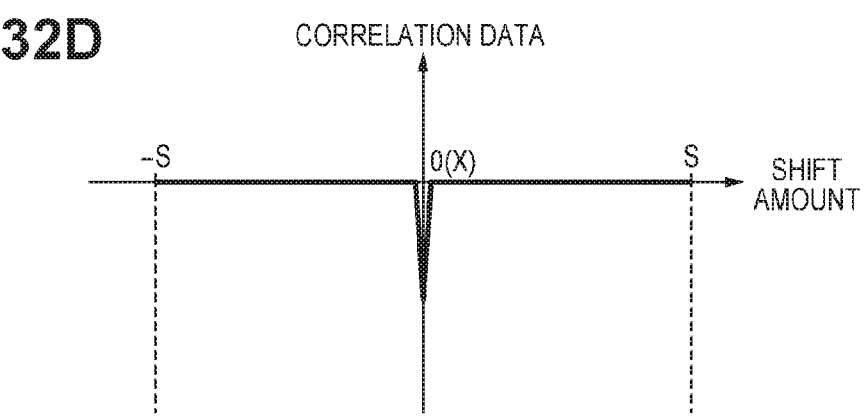
F I G. 32D

FIG. 33A

Address

| k | 0 |
| k-1 | ... |
| . | 0 |
| . | -e01(0)*α |  e02
| . | 0 |
| . | ... |
| . | 0 |
| . | 0 |
| . | ... |
| . | 0 |
| . | -e01(0)*α | e01
| . | 0 |
| . | ... |
| . | 0 |
| . | 0 |
| . | ... |
| . | 0 |
| . | -e00(0)*α | e00
| . | 0 |
| . | ... |
| . | 0 |
| . | 0 |
| . | ... |
| . | 0 |
| . | -e01(0)*α | e02
| . | 0 |
| . | ... |
| . | 0 |
| . | 0 |
| . | ... |
| . | 0 |
| . | -e01(0)*α | e01
| . | 0 |
| . | ... |
| . | 0 |
| . | 0 |
| . | ... |
| . | 0 |
| . | -e00(0)*α | e00
| . | 0 |
| . | ... |
| . | 0 |
| . | 0 |
| . | ... |
| . | 0 |
| . | -e01(0)*α | e02
| . | 0 |
| . | ... |
| . | 0 |
| . | 0 |
| . | ... |
| . | 0 |
| . | -e01(0)*α | e01
| . | 0 |
| . | ... |
| . | 0 |
| . | 0 |
| . | ... |
| . | 0 |
| . | -e00(0)*α | e00
| 1 | ... |
| 0 | 0 |

Address
k
k−1
⋮
⋮
1
0

408

| Address value | Value |
|---|---|
| 0 | + f22(−S) |
| ... | ... |
| 0 | + f22(−1) |
| −e02(0)*α | + f22(0) |
| 0 | + f22(1) |
| ... | ... |
| 0 | + f22(S) |
| 0 | + f21(−S) |
| ... | ... |
| 0 | + f21(−1) |
| −e01(0)*α | + f21(0) |
| 0 | + f21(1) |
| ... | ... |
| 0 | + f21(S) |
| 0 | + f20(−S) |
| ... | ... |
| 0 | + f20(−1) |
| −e00(0)*α | + f20(0) |
| 0 | + f20(1) |
| ... | ... |
| 0 | + f20(S) |
| 0 | + f12(−S) |
| ... | ... |
| 0 | + f12(−1) |
| −e02(0)*α | + f12(0) |
| 0 | + f12(1) |
| ... | ... |
| 0 | + f12(S) |
| 0 | + f11(−S) |
| ... | ... |
| 0 | + f11(−1) |
| −e01(0)*α | + f11(0) |
| 0 | + f11(1) |
| ... | ... |
| 0 | + f11(S) |
| 0 | + f10(−S) |
| ... | ... |
| 0 | + f10(−1) |
| −e00(0)*α | + f10(0) |
| 0 | + f10(1) |
| ... | ... |
| 0 | + f10(S) |
| 0 | + f02(−S) |
| ... | ... |
| 0 | + f02(−1) |
| −e02(0)*α | + f02(0) |
| 0 | + f02(1) |
| ... | ... |
| 0 | + f02(S) |
| 0 | + f01(−S) |
| ... | ... |
| 0 | + f01(−1) |
| −e01(0)*α | + f01(0) |
| 0 | + f01(1) |
| ... | ... |
| 0 | + f01(S) |
| 0 | + f00(−S) |
| ... | ... |
| 0 | + f00(−1) |
| −e00(0)*α | + f00(0) |
| 0 | + f00(1) |
| ... | ... |
| 0 | + f00(S) |

Groups (right-side labels): e02,f22 ; e01,f21 ; e00,f20 ; e02,f12 ; e01,f11 ; e00,f10 ; e02,f02 ; e01,f01 ; e00,f00

F I G. 36

| PIXEL SIGNAL | G (−4) | R (−3) | G (−2) | R (−1) | G (0) TARGET PIXEL | R (1) | G (2) | R (3) | G (4) |
|---|---|---|---|---|---|---|---|---|---|
| FILTER COEFFICIENT | X(−4) | X(−3) | X(−2) | X(−1) | X(0) | X(1) | X(2) | X(3) | X(4) |
| MODE 1 (FILTER OFF) | 0 | 0 | 0 | 0 | 1 | 0 | 0 | 0 | 0 |
| MODE 2 | −1 | 0 | −2 | 0 | 0 | 0 | 2 | 0 | 1 |

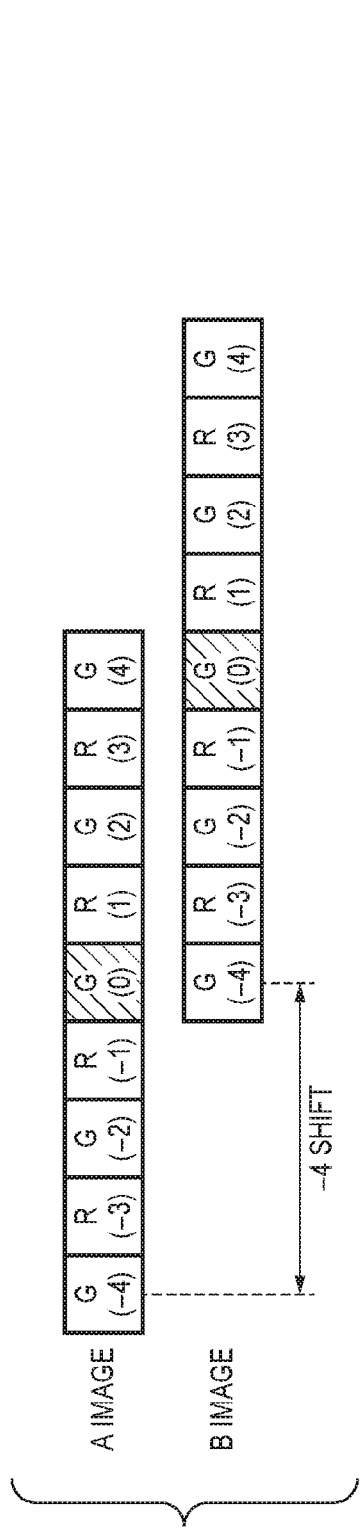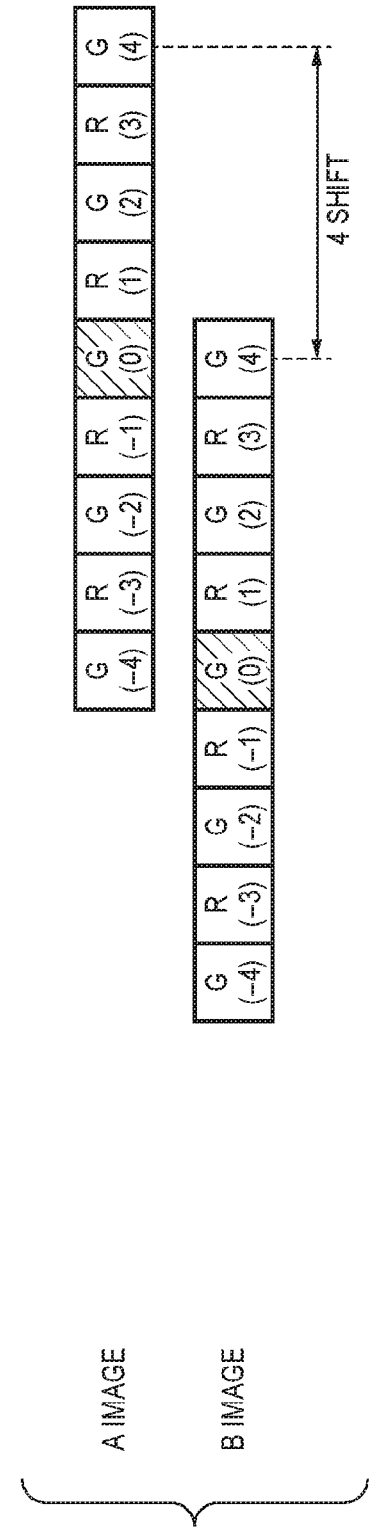

IMAGE CAPTURING APPARATUS, CONTROL METHOD THEREOF, AND STORAGE MEDIUM

BACKGROUND OF THE INVENTION

Field of the Invention

The present invention relates to a technique for performing focus detection by a phase difference detection method using image signals from an image sensor that has pixels for focus detection on the imaging plane.

Description of the Related Art

Conventionally, as focus detection methods for performing focus control in image capturing apparatuses, various methods have been proposed, such as a phase difference detection method that uses focus detection elements, and a contrast method that uses the contrast component of an image from an image sensor. Also, there is known to be a technique for performing focus detection by a phase difference detection method at the same time as image capturing, by adopting a configuration in which pixels in an image sensor receive light from different pupil regions of an imaging lens.

Japanese Patent Laid-Open No. 2001-083407 discloses an image sensor in which a luminous beam converged by one microlens in one pixel is photoelectrically converted using divided photodiodes (hereinafter, PDs), and thereby each PD receives light from a different pupil region of an imaging lens. Focus detection for the imaging lens is then performed by comparing output of the two PDs.

Also, Japanese Patent Laid-Open No. 2014-182360 discloses a technique for reading out the electric charges of a portion of the PDs under one microlens, then reading out the addition value of the electric charges of all the PDs under the same microlens, and thereby generating the value of the other photoelectric conversion portion from the difference between those values. Accordingly, focus detection is performed while maintaining the characteristics of image signals for image capturing.

However, the conventional techniques disclosed in Japanese Patent Laid-Open No. 2001-083407 and Japanese Patent Laid-Open No. 2014-182360 above have the following problem. For example, in the case where a PD is divided into two under one microlens, the pixel signal corresponding to the electric charge of one PD is assumed to be an A image, and the pixel signal corresponding to the electric charge of the other PD is assumed to be a B image. Also, the addition value of the signals of all the PDs is assumed to be an A+B image.

In focus detection, the A image is read out, the A+B image is then read out, and the B image is generated by subtracting the A image from the A+B image, in order to perform calculation of focus detection. It is also possible to independently read out the A image and the B image and perform calculation for focus detection, but the A+B image is also required in order to generate an image. In that case, if the A image and the B image, both of which have random noise, are added and the A+B image is generated, the random noise amount of the A+B image increase due to the addition. If the random noise amount increases, the image quality deteriorates, and thus a configuration is adopted here in which instead of reading out the A image and the B image, the A image and the A+B image are independently read out. In calculation of focus detection, an A image row includes pixels arranged in the horizontal direction, a B image row includes corresponding pixels arranged in the horizontal direction, the B image row is subtracted from the A image row while shifting the A image row and the B image row in the horizontal direction, the absolute values are then calculated, and the absolute values are added to obtain a correlation value of the A image and the B image (correlation calculation). A defocus amount is calculated from the obtained correlation value.

For example, in FIG. 26, a PD for A image is denoted by 1101, and a PD for B image is denoted by 1102, which are under one microlens 1100. The A images of the row of pixels arranged in the horizontal direction are denoted by A0 to A7, and the B images of the row of pixels arranged in the horizontal direction are denoted by B0 to B7. Data generated by the above processing is subjected to correlation calculation for the A image row and the B image row. As shown in FIG. 27, when the shift amount is −2, the B image row is shifted relative to the A image row by two pixels to the left, and the absolute value of the value obtained by subtracting the corresponding pixel value after the shift is calculated. In this case, correlation values P(0) to P(3) of the pixels are calculated as:

$P(0)=|A2-B4|$, $P(1)=|A3-B5|$, $P(2)=|A4-B6|$, and $P(3)=|A5-B7|$, and a correlation value P[−2] when the shift amount is −2 is calculated by adding the correlation values P(0) to P(3) as follows:

$P[-2]=P(0)+P(1)+P(2)+P(3)$

In a similar manner, correlation values in the case of other shift amounts are also calculated as shown in FIG. 27. At this time, A image signals corresponding to the electric charges of the PDs in a k-th row are assumed to be S[A(k)], and (A+B) image signals are assumed to be S[(A+B)(k)]. Also, random noise that is caused by a readout circuit and is superimposed on pixel data when the A image is read out is assumed to be N[A(k)], and random noise that is caused by the readout circuit and is superimposed on pixel data when the (A+B) image is readout is assumed to be N[(A+B)(k)]. When the B image is generated in accordance with the above description, the following expression holds true.

$$B \text{ image} = (A + B) \text{ image} - A \text{ image}$$
$$= (S[(A + B)(k)] + N[(A + B)(k)]) - (S[A(k)] + N[A(k)])$$
$$= S[(A + B)(k)] - S[A(k)] + N[(A + B)(k)] - N[A(k)]$$

In correlation calculation for one row when the shift amount is S (S is not 0), correlation calculation for the A image of an m-th row and the B image of an n-th row is performed, and a correlation value P(h) at this time is as follows.

$$P(h) = |A \text{ image} - B \text{ image}|$$
$$= |(S[A(m)] + N[A(m)]) - (S[(A + B)(n)] - S[A(n)] + N[(A + B)(n)] - N[A(n)])|$$
$$= |S[A(m)] + S[A(n)] - S[(A + B)(n)] + N[A(m)] + N[A(n)] - N[(A + B)(n)]|$$

Here, the higher the correlation between the A image and the B image is, the smaller this correlation value P(h) becomes.

Also, in correlation calculation for one row when the shift amount is 0, correlation calculation for the A image of the m-th row and the B image of the m-th row is performed, and the correlation value P(h) at this time is as follows.

$$P(h) = |A \text{ image} - B \text{ image}|$$
$$= \begin{vmatrix} (S[A(m)] + N[A(m)]) - (S[(A+B)(m)] - \\ S[A(m)] + N[(A+B)(m)] - N[A(m)]) \end{vmatrix}$$
$$= \begin{vmatrix} S[A(m)] + S[A(m)] - S[(A+B)(m)] + \\ N[A(m)] + N[A(m)] - N[(A+B)(m)] \end{vmatrix}$$

Here, the amount of random noise superimposed on the correlation value when the shift amount is S (S is not 0) and the amount of random noise superimposed on the correlation value when the shift amount is 0 are as follows.

When shift amount=S:Noise(S)=N[A(m)]+N[A(n)]-N[(A+B)(n)], and

When shift amount=0:Noise(0)=N[A(m)]+N[A(m)]-N[(A+B)(m)].

N[A(m)], N[A(n)] and N[(A+B) (n)] are random noise not correlated with each other, and thus Noise(S) will be a nearly constant value when the shift amount is not 0, as shown in FIG. 28A. On the other hand, regarding Noise(0), although N[A(m)] and N[(A+B)(m)] are random noise not correlated with each other, N[A(m)] is doubled (N[A(m)]*2) and is larger than Noise(S). Therefore, as shown in FIG. 28A, only when the shift amount is 0, the correlation amount increases due to random noise.

As described above, in the case of generating the B image from the A+B image and the A image and performing correlation calculation, a random noise amount obtained by inverting the sign of a random noise amount superimposed on the A image is superimposed on the B image, and thereby when the shift amount=0, the noise amount of N[A(m)]*2 is always superimposed on the correlation value. Accordingly, a local peak is generated.

In cases of shooting an object for which the contrast between the A image and the B image is low and shooting in a low luminance environment, the correlation value P(h) decreases, but in this case, the noise amount expressed by N[A(m)]*2 becomes dominant. Without noise influence, the correlation value P(h) is smallest (H point in FIG. 28B) when the shift amount is 0 while the imaging optical system is in focus, and focus detection is appropriately performed by detecting this point. However, when the noise amount of N[A(m)]*2 is dominant, as shown in FIG. 28C, a result will be obtained that the correlation value P(h) increases (correlation is low) (I point), when the shift amount is 0. As a result, there has been a problem in that a plurality of points where the correlation value P(h) is lowest are generated (J point, K point), those points are recognized as a shift amount of an in-focus position, and as a result, erroneous ranging and hunting occur.

SUMMARY OF THE INVENTION

The present invention has been made in light of the above-described problem, and aims to provide an image capturing apparatus that reduces noise influence and enables highly accurate focus detection even in the case of shooting a low contrast object and shooting in a low luminance environment.

According to a first aspect of the present invention, there is provided an image capturing apparatus comprising: an image sensor in which a plurality of unit pixels, each of which has a first photoelectric conversion portion and a second photoelectric conversion portion arranged for one microlens, are arranged; a readout unit configured to read out an added signal obtained by adding a signal of the first photoelectric conversion portion and a signal of the second photoelectric conversion portion, and to independently read out the signal of the first photoelectric conversion portion; a calculation unit configured to calculate a signal corresponding to a signal of the second photoelectric conversion portion by subtracting the signal of the first photoelectric conversion portion from the added signal; a correlation calculation unit configured to perform correlation calculation for the signal of the first photoelectric conversion portion and the signal corresponding to the signal of the second photoelectric conversion portion; and a subtraction unit configured to subtract, from a result of the correlation calculation on an object image by the correlation calculation unit, a correction value for correcting noise caused by obtaining the signal corresponding to the signal of the second photoelectric conversion portion by subtracting the signal of the first photoelectric conversion portion from the added signal.

According to a second aspect of the present invention, there is provided a control method of an image capturing apparatus including an image sensor in which a plurality of unit pixels, each of which has a first photoelectric conversion portion and a second photoelectric conversion portion arranged for one microlens, are arranged, the method comprising: reading out an added signal obtained by adding a signal of the first photoelectric conversion portion and a signal of the second photoelectric conversion portion, and independently reading out the signal of the first photoelectric conversion portion; calculating a signal corresponding to a signal of the second photoelectric conversion portion by subtracting the signal of the first photoelectric conversion portion from the added signal; performing correlation calculation for the signal of the first photoelectric conversion portion and the signal corresponding to the signal of the second photoelectric conversion portion; and subtracting, from a result of the correlation calculation on an object image in the calculating of correlation, a correction value for correcting noise caused by obtaining the signal corresponding to the signal of the second photoelectric conversion portion by subtracting the signal of the first photoelectric conversion portion from the added signal.

Further features of the present invention will become apparent from the following description of exemplary embodiments with reference to the attached drawings.

BRIEF DESCRIPTION OF THE DRAWINGS

FIG. 3 is a diagram showing the configuration of the image sensor used in the image capturing apparatus according to the embodiments of the present invention.

FIGS. 5A and 5B are diagrams showing the concept of focus detection by a phase difference detection method.

FIG. 15 is a diagram showing the configuration of an AF calculation unit in a second embodiment.

FIGS. 18A and 18B are diagrams illustrating the operation of the AF calculation unit in the second embodiment.

FIGS. 23A and 23B are diagrams illustrating the operation of the AF calculation unit in the third embodiment.

FIG. 27 is a diagram illustrating the configuration and operation of a conventional technique.

FIG. 29 is a diagram showing the configuration of an AF calculation unit in a fourth embodiment.

FIGS. 32A to 32D are diagrams illustrating the operation of the AF calculation unit in the fourth embodiment.

FIGS. 33A and 33B are diagrams illustrating the operation of the AF calculation unit in the fourth embodiment.

FIG. 36 is a diagram showing the relationship between pixel signals and filter coefficients in the fifth embodiment.

FIGS. 38A and 38B are diagrams showing the relationship between an image A and an image B for shift amounts in the fifth embodiment.

DESCRIPTION OF THE EMBODIMENTS

Embodiments of the present invention will be described in detail below with reference to the attached drawings.

First Embodiment

Figure 1:
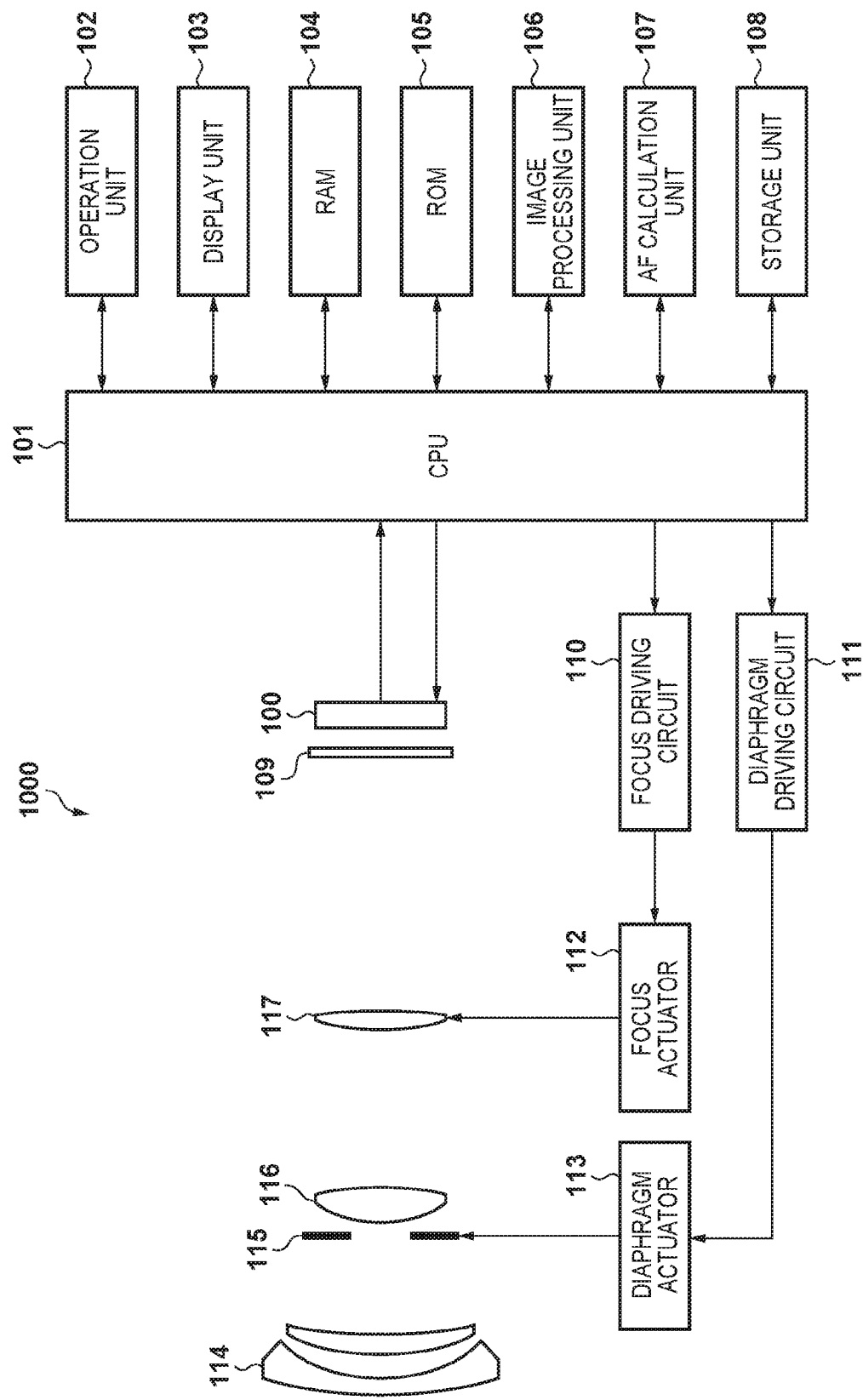
FIG. 1 is a diagram showing the configuration of an image capturing apparatus according to embodiments of the present invention.

FIG. 1 is a block diagram showing the configuration of an image capturing apparatus according to a first embodiment of the present invention. FIG. 1 shows an image capturing apparatus in which an image capturing apparatus main body (camera main body) and an imaging lens (imaging optical system) are integrated. However, the present invention is not limited thereto, and is also applicable to an image capturing system in which an imaging lens is replaceably mounted to an image capturing apparatus main body. Moreover, in the embodiments below, the image capturing apparatus includes a function as a focus detection apparatus, and thus the image capturing apparatus also serves as a focus detection apparatus.

In FIG. 1, an image capturing apparatus 1000 has an image sensor 100, a CPU 101, an operation unit 102, a display unit 103, a RAM 104, a ROM 105, an image processing unit 106, an AF (autofocus) calculation unit 107 and a storage unit 108. The image capturing apparatus 1000 further has a focal plane shutter 109, a focus driving circuit 110, a diaphragm driving circuit 111, a focus actuator 112, and a diaphragm actuator 113. The image capturing apparatus 1000 also has a first lens group 114, a second lens group 116, a diaphragm 115 and a third lens group 117 as lens groups and members constituting the optical system.

The image sensor 100 has a function of shooting moving images or still images. This image sensor 100 converts an optical image (object image) of an object formed by the imaging optical system into electrical signals. The converted electrical signals are converted into digital signals (image data) in the image sensor 100 in accordance with predetermined quantization bits, and are output. The driving of the image sensor 100 is controlled by the CPU 101.

Note that in the example shown in FIG. 1, a configuration is shown in which digital signals are output from the image sensor 100, but the present invention is not limited thereto. For example, a configuration may be adopted in which analog signals are output from the image sensor 100, and are converted into digital signals by an AD converter provided outside of the image sensor 100.

The CPU 101 has a function as a control means that performs overall control of the image capturing apparatus 1000. The image processing unit 106 performs processing such as correction and compression of image data obtained as a result of shooting. The RAM 104 is a memory (image memory) for storing image data output from the image sensor 100 and image data processed by the image processing unit 106, and furthermore, the RAM 104 is also used as a work memory by the CPU 101 to be described later. Note that another memory may be used as the RAM 104 as long as the memory has an access speed at an acceptable level. A program that runs on the CPU 101 is stored in the ROM 105. As one example, a flash ROM is used as the ROM 105, but another memory may be used as long as the memory has an access speed at an acceptable level.

The storage unit 108 is a non-volatile memory or a hard disk, for example. Still image data and moving image data are recorded in the storage unit 108, for example. FIG. 1 indicates that the storage unit 108 is included in the image capturing apparatus, but the storage unit 108 may be a recording medium such as a non-volatile memory, a hard disk or the like that is removable via a connector. The operation unit 102 is an interface used when operations such as giving a shooting instruction and performing image capturing condition setting are performed by the user with respect to the CPU 101. The display unit 103 performs display of a still image and a moving image obtained as a result of shooting, menu display, and the like, in accordance with control by the CPU 101.

The AF calculation unit 107 performs focus detection based on image data output from the image sensor 100. Focus detection processing will be described later in detail. Light that enters the image capturing apparatus 1000 passes through the first lens group 114, the diaphragm 115, the second lens group 116, the third lens group 117 and the focal plane shutter 109 in the stated order, and enters the image sensor 100. The first lens group 114 is held so as to be able to advance/retreat in the optical axis direction. The diaphragm 115 can operate so as to adjust the opening diameter thereof, and is a mechanism for performing light amount adjustment during shooting. The diaphragm 115 and the second lens group 116 integrally advance/retreat in the optical axis direction, realizing a power varying function (zooming function) in conjunction with an advancing/retreating operation of the first lens group 114. The third lens group (focus lens) 117 performs focus adjustment by advancing/retreating in the optical axis direction.

The focal plane shutter 109 is a shutter for adjusting the exposure time during still image shooting. In this embodiment, a configuration is adopted in which an exposure time of the image sensor 100 is adjusted using the focal plane shutter 109, namely, a mechanical shutter, but the present invention not limited thereto. For example, a configuration may be adopted in which the image sensor 100 has an electronic shutter function, and an electric charge accumulating time is electronically controlled using control signals, thereby adjusting the exposure time. The focus driving circuit 110 controls driving of the focus actuator 112 based on a focus detection result of the AF calculation unit 107, and drives the third lens group 117 so as to advance/retreat in the optical axis direction, thereby performing focus adjustment. The diaphragm driving circuit 111 controls driving of the diaphragm actuator 113 so as to control the opening diameter of the diaphragm 115.

Figure 2A:
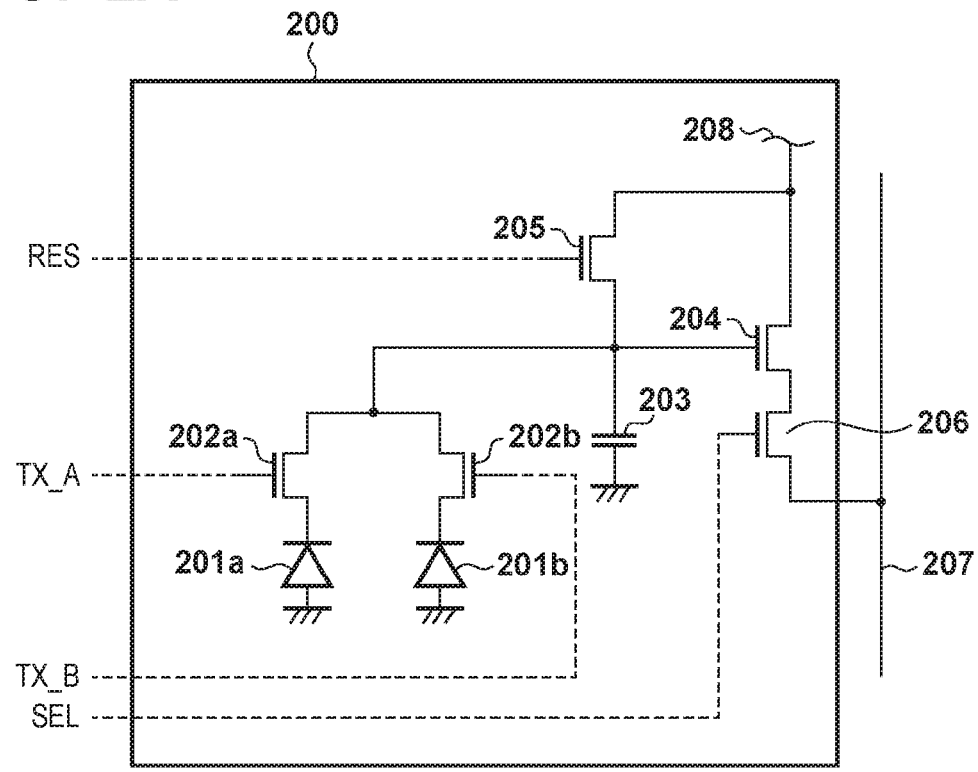
FIGS. 2A and 2B are diagrams showing the configuration of an image sensor used in the image capturing apparatus according to the embodiments of the present invention.

Next, the configuration of the image sensor 100 shown in FIG. 1 will be described in more detail with reference to FIGS. 2A, 2B and 3. FIG. 2A is a circuit diagram showing the configuration of one pixel (unit pixel) 200 in the image sensor 100. The pixel 200 has photodiodes 201a and 201b, transfer switches 202a and 202b, a floating diffusion region 203, an amplification unit 204, a reset switch 205 and a selection switch 206. Note that each switch is constituted by a MOS transistor or the like. In the following description, each switch is assumed to be an N type MOS transistor as an example, but the switch may be a P type MOS transistor, or may be another switching element.

As described above, the image sensor 100 in this embodiment has two photodiodes in one pixel 200. Note that the number of photodiodes provided in each of the pixels 200 is not limited to two as shown in FIG. 2A, and three or more (e.g., four) photodiodes may be provided. In this embodiment, the photodiodes 201a and 201b, as will be described later, function as focus detection pixels as well as image capturing pixels.

Figure 2B:
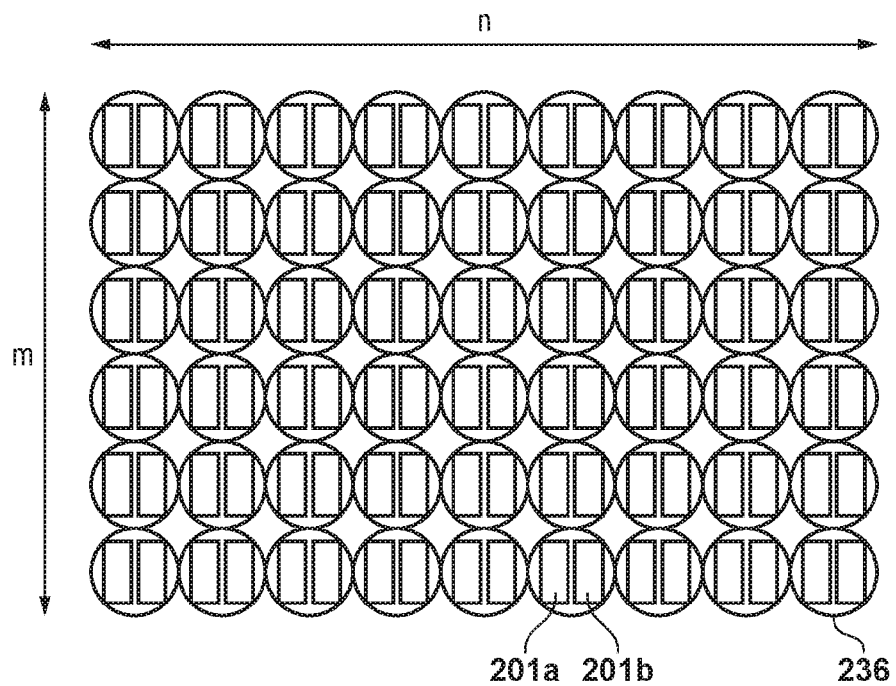

The photodiodes 201a and 201b receive light that passed through the same microlens 236 shown in FIG. 2B, and function as photoelectric conversion portions for generating signal electric charges that are based on the amount of the received light by performing photoelectric conversion. A signal obtained by the photodiode 201a is referred to as an A signal, and a signal obtained by the photodiode 201b is referred to as a B signal.

The transfer switch 202a is connected between the photodiode 201a and the floating diffusion region 203, and the transfer switch 202b is connected between the photodiode 201b and the floating diffusion region 203. The transfer switches 202a and 202b are elements that respectively transfer electric charges generated in the photodiodes 201a and 201b to the common floating diffusion region 203. The transfer switches 202a and 202b are respectively controlled by control signals TX_A and TX_B.

The floating diffusion region 203 temporarily holds electric charges transferred from the photodiodes 201a and 201b and functions as an electric charge/voltage conversion unit that converts the held electric charges into voltage signals. The amplification unit 204 is a source follower MOS transistor. The gate of the amplification unit 204 is connected to the floating diffusion region 203, and the drain of the amplification unit 204 is connected to a common power supply 208 that supplies a power supply potential VDD. The amplification unit 204 amplifies voltage signals that are based on the electric charges held in the floating diffusion region, and outputs the voltage signals as image signals.

The reset switch 205 is connected between the floating diffusion region 203 and the common power supply 208. The reset switch 205 is controlled by a control signal RES, and has a function of resetting the potential of the floating diffusion region 203 to the power supply potential VDD. The selection switch 206 is connected between the source of the amplification unit 204 and a vertical output line 207. The selection switch 206 is controlled by a control signal SEL, and outputs, to the vertical output line 207, image signals amplified by the amplification unit 204.

FIG. 3 is a diagram showing the configuration of the image sensor 100. The image sensor 100 has a pixel array 234, a vertical scanning circuit 209, a current source load 210, a readout circuit 235, common output lines 228 and 229, a horizontal scanning circuit 232 and a data output unit (output amplifier) 233.

The pixel array 234 has a plurality of pixels 200 arranged in a matrix. For ease of description, FIG. 3 shows n pixels in the horizontal direction and four pixels in the vertical direction, but the number of rows and the number of columns of the pixels 200 are arbitrary. In addition, each pixel 200 is provided with any one of color filters of different colors. In the example shown in FIG. 3, the colors of the color filters are assumed to be red (R), green (G) and blue (B). These pixels 200 are arranged in a Bayer array. Also, the image sensor 100 in this embodiment has an OB region (optical black region, light shielded pixels) in which a portion of the pixel array 234 is shielded from light by a light-shielding layer.

The vertical scanning circuit 209 outputs control signals to the pixels 200 in each row via a driving signal line 208 provided for each row. Note that in FIG. 3, for ease of description, one driving signal line 208 is illustrated for each row, but a plurality of driving signal lines are connected to each row in actuality.

The pixels 200 in the same row are commonly connected to the vertical output line 207 provided for each column. A signal output from each pixel 200 is input to the readout circuit 235 via this vertical output line 207, and is processed by the readout circuit 235. The current source load 210 is connected to the vertical output line 207 of each column.

The horizontal scanning circuit 232 sequentially selects a column from which signals are to be output, from a plurality of readout circuits 235, by outputting control signals hsr (0) to hsr (n−1). The readout circuit 235 of the selected column outputs a processed signal to a data output unit 233 via the common output lines 228 and 229.

Next, the specific circuit configuration of the readout circuit 235 will be described. The readout circuit 235 has a clamp capacitor 211, feedback capacitors 214 to 216, an operational amplifier 213, and a reference voltage source 212 and switches 217 to 220. The readout circuit 235 also has a comparator 221, a Latch_N222 and a Latch_N223, and switches 226 and 227.

A signal input to the readout circuit 235 using the vertical output line 207 is input to an inverted input terminal of the operational amplifier 213 via the clamp capacitor 211. A reference voltage Vref is supplied from the reference voltage source 212 to a non-inverted input terminal of the operational amplifier 213. The feedback capacitors 214 to 216 are connected between the inverted input terminal and an output terminal of the operational amplifier 213. The switch 217 is also connected between the inverted input terminal and the output terminal of the operational amplifier 213, and has a function for causing two ends of the feedback capacitors 214 to 216 to short-circuit. The switch 217 is controlled by a control signal RES_C. Also, the switches 218 to 220 are controlled by control signals GAIN 0 to GAIN 2.

The output terminal of the operational amplifier 213 and a ramp signal 224 output from a ramp signal generator 230 are connected to the comparator 221. The Latch_N222 is a storage element for holding a noise level (N signal), and a Latch_S is a storage element for holding a signal level (S signal) of an AB signal (added signal) obtained by adding an A signal and a B signal. A signal from an output terminal of the comparator 221 and a counter value 225 output from a counter 231 are input to the Latch_N222 and the Latch_N223, and are respectively controlled by control signals LATEN_N and LATEN_S. Output terminals of the Latch_N and the Latch_S are respectively connected to the common output lines 228 and 229 via the switches 226 and 227. The common output lines 228 and 229 are connected to the data output unit 233.

The switches 226 and 227 are controlled by a control signal hsr (h) from the horizontal scanning circuit 232. Here, h indicates the column number of the readout circuit 235 to which the control signal line is connected. Signals held in the Latch_N222 and the Latch_N223 are output via the common output lines 228 and 229, and are output to the outside of the data output unit 233. This operation is referred to as horizontal transfer.

Figure 4:
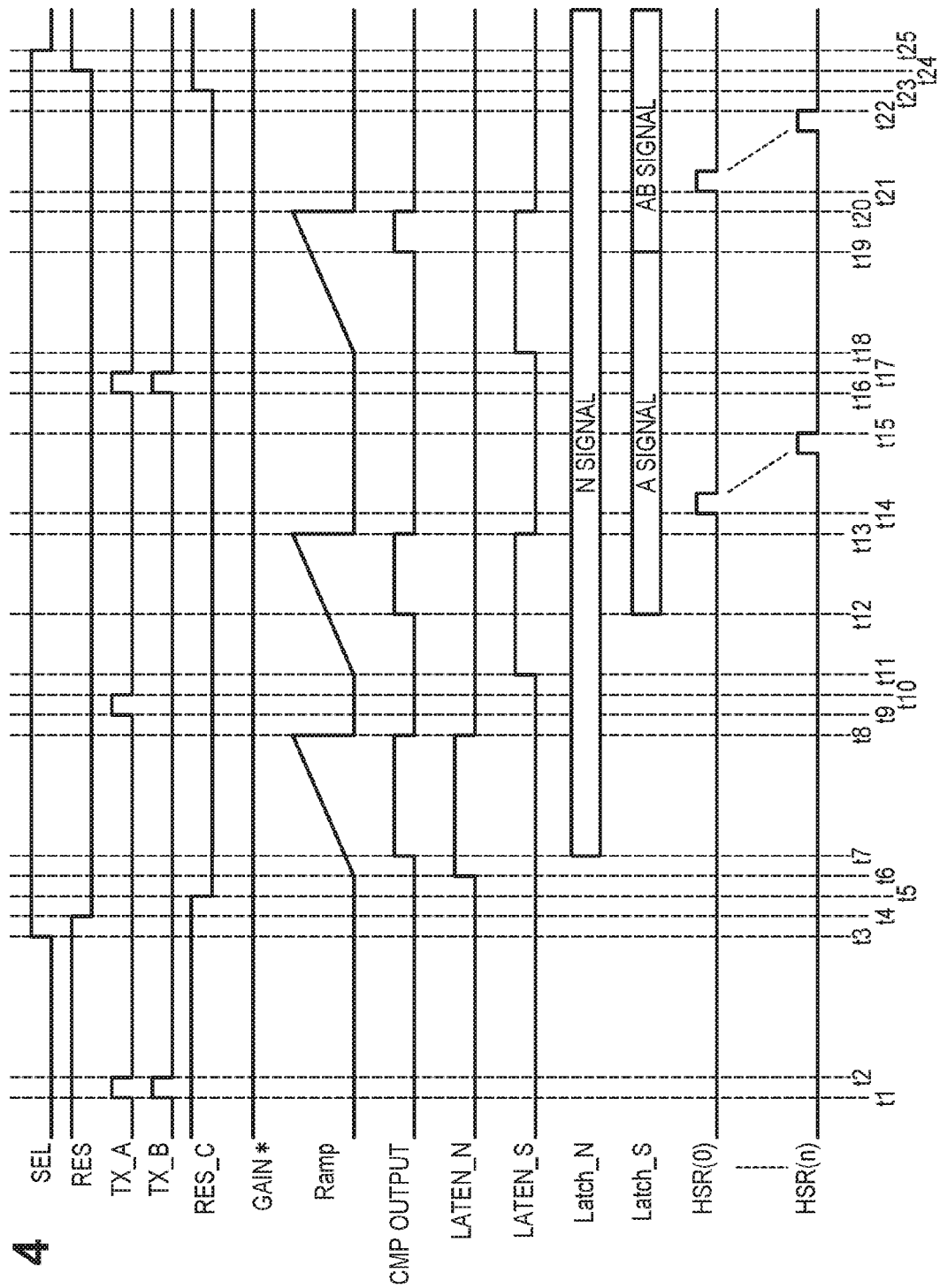
FIG. 4 is a timing chart showing the operations of an image sensor.

FIG. 4 is a timing chart showing a readout operation of the image sensor 100. An operation of reading out image signals for one row will be described below with reference to FIG. 4. Note that it is assumed that when a control signal is H, the switch is turned on, and when a control signal is L, the switch is turned off.

At a time t1, control signals TX_A and TX_B rise to H, and the transfer switches 202a and 202b are turned on. At this time, a signal RES has risen to H, and the electric charges accumulated in the photodiodes 201a and 201b are transferred to the power supply 208 via the transfer switches 202a and 202b and the reset switch 205, and the photodiodes 201a and 201b are reset. At a time t2, the control signals TX_A and TX_B are lowered to L, and accumulation of photoelectric charges in the photodiodes 201a and 201b is started.

At a time t3 after photoelectric charges are accumulated for a predetermined time, a control signal SEL of the selection switch 206 rises to H, and the source of the amplification unit 204 is connected to the vertical output line 207. At a time t4, reset of the floating diffusion region 203 is released by lowering the control signal RES of the reset switch 205 to L. At this time, a potential at a reset signal level that is based on the potential of the floating diffusion region 203 is read out to the vertical output line 207 via the amplification unit 204, and is input to the readout circuit 235.

After that, at a time t5, when a control signal RES_C falls to L, a voltage that is based on the difference between the reference voltage Vref and the reset signal level read out to the vertical output line 207 is output from the operational amplifier 213. The image sensor 100 is set in advance such that the CPU 101 causes any one of control signals GAIN0 to GAIN2 to rise to H, based on an ISO sensitivity set using the operation unit 102. The image capturing apparatus of this embodiment is provided with ISO sensitivities 100, 200 and 400. The control signals GAIN0 to GAIN2 rise to H respectively in accordance with the ISO sensitivities 100 to 400. A corresponding switch out of the switches 218 and 219 is thereby turned on. The operational amplifier 213 amplifies a voltage that has been input, by an inverted gain determined according to a ratio of the clamp capacitor 211 to any one of the feedback capacitors 214 to 216, and outputs the voltage. Here, a random noise component generated in the circuit up to the operational amplifier 213 is also amplified, and the random noise amount of a signal that is output will be different depending on the ISO sensitivities 100, 200 and 400.

Next, at a time t6, the ramp signal generator 230 starts outputting a ramp signal whose signal level changes in proportion to the time that has elapsed. At the same time, the counter 231 starts counting up from a reset state, and LATEN_N rises to H. The comparator 221 compares an output signal of the operational amplifier 213 to the ramp signal output by the ramp signal generator 230. The signal level of the ramp signal that has been input rises with the lapse of time, and at a time when the signal level exceeds the value of the output signal of the operational amplifier 213, a signal output to the Latch_N222 is inverted from L to H (a time t7). When a signal from a comparator 211 is inverted from L to H in a state where LATEN_N is H, the Latch_N222 stores the counter value being output from the counter 231 at this time. This stored counter value serves as an N signal level. After that, at a time t8, change of the ramp signal ends, and LATEN_N falls to L.

At a time t9, the control signal TX_A rises to H, and photoelectric charge of the photodiode 201a is independently transferred to the floating diffusion region 203. After that, at a time t10, the control signal TX_A falls to L. This operation causes the electric charge accumulated in the photodiode 201a to be transferred to the floating diffusion region 203. A voltage that is based on the change is then output to the readout circuit 235 via the amplification unit 204 and the vertical output line 207. A voltage that is based on the difference between the reference voltage Vref and the reset signal level read out to the vertical output line 207 is output from the operational amplifier 213. The operational amplifier 213 amplifies a voltage that has been input, by an inverted gain determined according to a ratio of the clamp capacitor 211 to any one of the feedback capacitors 214 to 216, and outputs the voltage.

Next, at a time t11, the ramp signal generator 230 starts outputting a ramp signal. At the same time, the counter 231 starts counting up from the reset state, and LATEN_S rises to H. The comparator 221 compares the output signal of the operational amplifier 213 to the ramp signal output by the ramp signal generator 230. At the time when the signal level of the ramp signal exceeds the value of the output signal of the operational amplifier 213, the signal to be output to the Latch_N223 is inverted from L to H (at a time t12). When the signal from the comparator 211 is inverted from L to H in a state where LATEN_S is H, the Latch_N223 stores the counter value being output from the counter 231 at this time. This stored counter value serves as the A signal level. After that, at a time t13, change of the ramp signal ends, and LATEN_S falls to L.

After that, from a time t14 to a time t15, the control signals hsr (h) output from the horizontal scanning circuit 232 sequentially rise from L to H, and fall back to L. Accordingly, the switches 226 and 227 change from off to on, and return to off. N signal data and A signal data held in the Latch_N222 and the Latch_N223 of each column are respectively read out to the common output lines 228 and 229, and are input to the data output unit 233. The data output unit 233 outputs the difference between the A signal data and the N signal data in each column to the outside.

At a time t16, the control signal TX_A rises to H again and the control signal TX_B also rises to H. After that, at a time t17, the control signals TX_A and TX_B fall to L. This operation causes photoelectric charges of both the photodiodes 201a and 201b to be transferred to the floating diffusion region 203. A voltage that is based on the change is then output to the readout circuit 235 via the amplification unit 204 and the vertical output line 207. A voltage that is based on the difference between the reference voltage Vref and the reset signal level read out to the vertical output line 207 is output from the operational amplifier 213. The operational amplifier 213 amplifies a voltage that has been input, by an inverted gain determined according to a ratio of the clamp capacitor 211 to any one of the feedback capacitors 214 to 216, and outputs the voltage.

Next, at a time t18, the ramp signal generator 230 starts outputting a ramp signal. At the same time, the counter 231 starts counting up from the reset state, and LATEN_S rises to H. The comparator 221 compares the output signal of the operational amplifier 213 to the ramp signal output by the ramp signal generator 230. At a time when the signal level of the ramp signal exceeds the value of the output signal of the operational amplifier 213, the signal to be output to the Latch_N223 is inverted from L to H (at a time t19). When the signal from the comparator 211 is inverted from L to H in a state where LATEN_S is H, the Latch_N223 stores the counter value being output from the counter 231 at this time. This stored counter value serves as an AB signal level. After that, at a time t20, change of the ramp signal ends, and LATEN_S falls to L.

After that, from a time t21 to a time t22, the control signals hsr (h) output from the horizontal scanning circuit 232 sequentially rise from L to H, and fall back to L. Accordingly, the switches 226 and 227 change from off to on, and return to off. The N signal data and AB signal data held in the Latch_N222 and the Latch_N223 of each column are respectively read out to the common output lines 228 and 229, and are input to the data output unit 233. The data output unit 233 outputs the difference between the AB signal data and the N signal data in each column to the outside.

Lastly, the control signal RES_C rises to H at a time t23, the control signal RES rises to H at a time t24, and the control signal SEL falls to L at a time t25, completing a readout operation for one row. Image signals for one screen are obtained by repeating this operation for a predetermined number of rows.

The image capturing apparatus of this embodiment is provided with a still image mode and a moving image mode. In the still image mode, pixel data for all the rows of the image sensor 100 is read out. In the moving image mode, a configuration is adopted in which row pixel data is read out from every third row, and the number of rows that are read out is smaller than that in the still image mode. However, the configurations and the readout in the still image mode and the moving image mode are not limited thereto.

Due to the above-described operations, the A signal and the AB signal whose noise has been removed are obtained. This A signal is used as a focus detection signal, and the AB signal is used as data constituting an image that has been shot or a focus detection signal.

Next, processing of image data output by the image sensor 100 will be described. FIGS. 5A to 6B are diagrams showing the concept of focus detection by a phase difference detection method. First, the relationship between focus and phase difference in the image sensor 100 will be described with reference to FIGS. 5A and 5B.

FIG. 5A shows luminous beams and the positional relationship between an imaging lens 302, an object 300, an optical axis 301 and the pixel array 234 in the case where the imaging optical system is in focus (focal position is correct). Also, FIG. 5B shows luminous beams and the positional relationship in the case where the imaging optical system is not in focus. The pixel array 234 shown here is the pixel array 234 shown in FIG. 1 that is viewed from a cross-sectional direction.

One microlens 236 is provided in each of the pixels of the pixel array 234. As described above, a configuration is adopted in which the photodiodes 201a and 201b receive light that has passed through the same microlens. Different images having a phase difference enter the photodiodes 201a and 201b due to a configuration to be described later. Here, the photodiode 201a is assumed to be a photoelectric conversion portion for image A, and the photodiode 201b is assumed to be a photoelectric conversion portion for image B. In FIGS. 5A and 5B, the photoelectric conversion portion for image A is denoted by A, and the photoelectric conversion portion for image B is denoted by B. Note that in this embodiment, a configuration is adopted in which two photodiodes are arranged for one microlens, but the present invention is not limited thereto. It is sufficient that a configuration is adopted in which a plurality of photodiodes are arranged vertically or horizontally for one microlens.

The imaging lens 302 is equivalent to an imaging lens obtained when the first lens group 114, the second lens group 116 and the third lens group 117 shown in FIG. 1 are regarded as being combined into one. Light from the object 300 passes through each region of the imaging lens 302 centered on the optical axis 301, and forms an image on the pixel array 234 of the image sensor 100. Note that the position of the exit pupil and the central portion of the imaging lens are assumed to be the same here.

According to such a configuration, the imaging optical system being viewed from the photoelectric conversion portion for image A and the imaging optical system being viewed from the photoelectric conversion portion for image B are equivalent to the pupil of the imaging optical system being symmetrically divided. In other words, a configuration of so-called pupil division is achieved in which a luminous beam from the imaging optical system is divided into two luminous beams. The divided luminous beams (a first luminous beam and a second luminous beam respectively) enter the photoelectric conversion portion for image A and the photoelectric conversion portion for image B. In this manner, the photoelectric conversion portion for image A and the photoelectric conversion portion for image B can each function as a focus detection pixel by receiving light that passed through different pupil regions in the exit pupil of the imaging optical system and performing photoelectric conversion. The photoelectric conversion portion for image A and the photoelectric conversion portion for image B can also function as image capturing pixels by adding the respective signals.

A luminous beam from a specific point on the object 300 is divided into a luminous beam ΦLa that passes through a divided pupil corresponding to the photoelectric conversion portion for image A and enters the photoelectric conversion portion for image A, and a luminous beam ΦLb that passes through a divided pupil corresponding to the photoelectric conversion portion for image B and enters the photoelectric conversion portion for image B. These two luminous beams come from the same point on the object 300, and thus in a state where the imaging optical system is in focus, pass through the same microlens and reach a single point on the image sensor, as shown in FIG. 5A. Therefore, image signals that are obtained from the photoelectric conversion portion for image A and the photoelectric conversion portion for image B match each other.

However, in the state where the focus is shifted by Y in the optical axis direction as shown in FIG. 5B, arrival positions of the luminous beams ΦLa and ΦLb are shifted relative to each other in a direction vertical to the optical axis by the change amount of the incident angles of the luminous beams ΦLa and ΦLb at the microlens. Therefore, a phase difference is generated between the image signals obtained from the photoelectric conversion portion for image A and the photoelectric conversion portion for image B. The photoelectric conversion portion for image A and the photoelectric conversion portion for image B (i.e., a focus detection pixel) photoelectrically convert two object images (an A image and a B image) that include a phase difference, and generate a signal for focus detection. This signal is output to the outside of the image sensor 100, and is used for an AF operation.

As described above, the image sensor 100 performs first readout for independently reading out only signals of the photoelectric conversion portions for image A (hereinafter, also referred to as focus detection signals), and second readout for reading out signals (hereinafter, also referred to as image signals) obtained by adding the signals of the photoelectric conversion portions for image A and signals of the photoelectric conversion portions for image B. Hereinafter, A signals output from the image sensor 100 are assumed to constitute an A image, and AB signals obtained by adding the signals of the photoelectric conversion portion for image A and the photoelectric conversion portion for image B are assumed to constitute an AB image. The image A and the AB image are input to the AF calculation unit 107, and a B image is generated by performing processing to be described later, and is used for AF operation.

Note that in this embodiment, a configuration has been described in which a plurality of photoelectric conversion portions are arranged for one microlens, and a luminous beam that underwent pupil division enters each photoelectric conversion portion, but the present invention is not limited thereto. For example, a pixel for focus detection may have a configuration in which pupil division is performed by including one PD under a microlens, and shielding a right or left portion or an upper or lower portion of the PD from light by a light-shielding layer. A configuration may also be adopted in which an A image signal and a B image signal are obtained from pixels for focus detection that are discretely arranged.

Figure 6A:
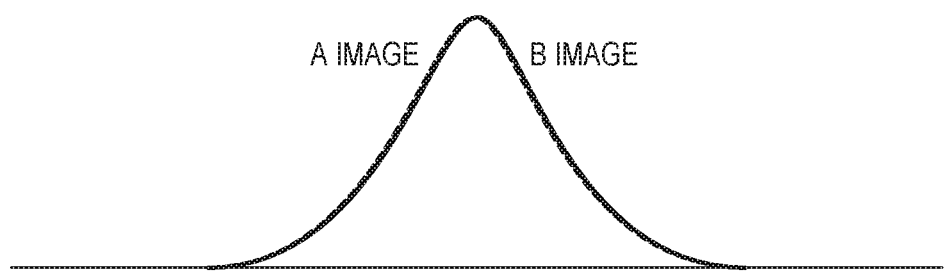
FIGS. 6A and 6B are diagrams showing the concept of focus detection by a phase difference detection method.
Figure 6B:
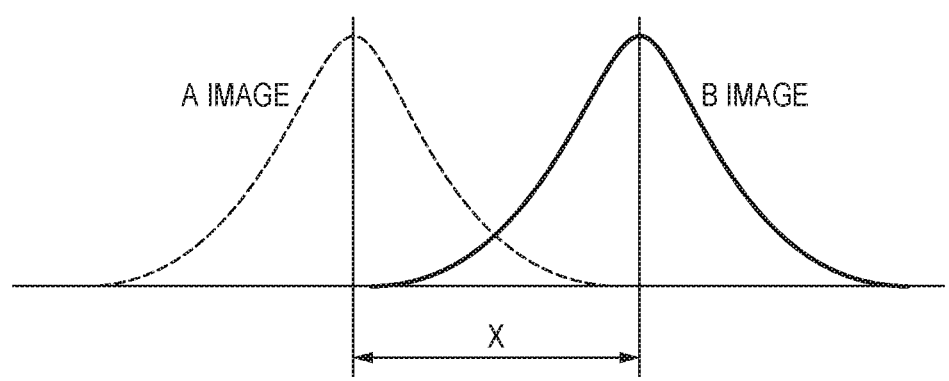

The AF calculation unit 107 performs a focus detection operation using an AB image and an A image that have been input. FIG. 6A is a graph showing the intensity distribution of the A image and the B image in a state shown in FIG. 5A in which the imaging optical system is in focus. The horizontal axis indicates the pixel position, and the vertical axis indicates the intensity of output signals. In the case where the imaging optical system is in focus, the A image and the B image match. FIG. 6B is a graph showing the intensity distribution of the A image and the B image in a state shown in FIG. 5B in which the imaging optical system is not in focus. In this case, the A image and the B image include a phase difference for the above-described reason, and the intensity peak positions are shifted from each other by a shift amount X. The AF calculation unit 107 calculates the shift amount X for each frame, performs predetermined calculation processing using this, and thereby calculates a defocus amount, in other words, the Y value in FIG. 5B. The AF calculation unit 107 transfers the calculated Y value to the focus driving circuit 110.

The focus driving circuit 110 calculates an amount by which the third lens group 117 is to be moved, based on the Y value obtained from the AF calculation unit 107, and outputs a driving signal to the focus actuator 112. The third lens group 117 moves to a position where the imaging optical system is in focus, by driving of the focus actuator 112, and a state where the imaging optical system is in focus is realized.

Figure 7:
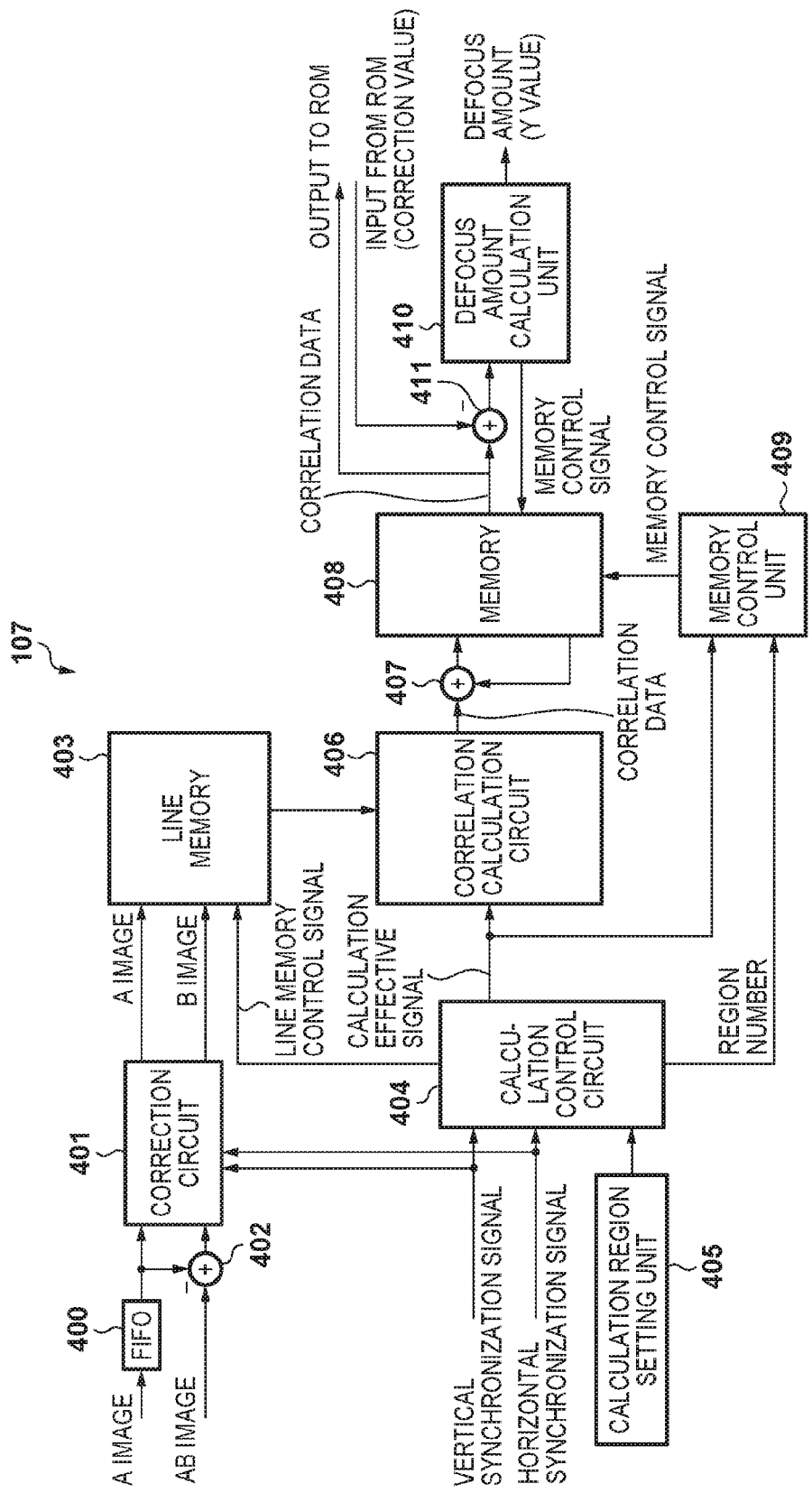
FIG. 7 is a diagram showing the configuration of an AF calculation unit in a first embodiment.

Next, the configuration and operation of the AF calculation unit 107 of this embodiment will be described with reference to FIG. 7. FIG. 7 is a diagram showing the configuration of the AF calculation unit 107. The AF calculation unit 107 has a correlation calculation circuit 406, a line memory 403, a calculation control circuit 404, a memory 408, a memory control unit 409, a defocus amount calculation unit 410, a subtractor 411, a subtractor 402, an adder 407, a FIFO memory 400, a calculation region setting unit 405 and a correction circuit 401.

An A image input to the AF calculation unit 107 is input to the FIFO memory 400, and an AB image input to the AF calculation unit 107 is input to the subtractor 402. The FIFO memory 400 has a function for matching the data input timing between the A image and the AB image. The A image output from the FIFO memory 400 is input to the correction circuit 401 and the subtractor 402. The subtractor 402 subtracts the A image from the AB image that has been input so as to calculate a B image, and outputs the B image to the correction circuit 401. At this time, input timing is matched between the A image and the AB image, and thus this subtraction is performed on data at the same pixel positions.

The correction circuit 401 recognizes the positions of the pixels of the A image and the B image relative to a screen, based on a vertical synchronization signal and a horizontal synchronization signal that are input, and performs offset or gain correction. However, the correction content is not limited thereto. The A image and the B image after being corrected are output to the line memory 403.

The calculation control circuit 404 outputs a line memory control signal to the line memory 403, based on the horizontal synchronization signal that is input. In accordance with the line memory control signal, the A image and the B image for one row that are input to the line memory 403 are written to the line memory 403. After that, the calculation control circuit 404 calculates vertical positions, in one frame, of image data of the A image and the B image, in reference with the vertical synchronization signal that is input. In this embodiment, a focus detection region (AF region) is set for the calculation region setting unit 405 in advance by the CPU 101. Therefore, in the case where a calculated vertical position is within a region that has been set, the calculation control circuit 404 outputs a calculation effective signal to the correlation calculation circuit 406. The calculation control circuit 404 causes, based on one or more AF regions that have been set, the A image and the B image at position corresponding to the setting to be output from the line memory 403 to the correlation calculation circuit 406. In the case where the calculation effective signal indicates that the calculated vertical position is within the region that has been set, the correlation calculation circuit 406 performs correlation calculation on the A image and the B image, and outputs the result to the adder 407. In this manner, the correlation calculation circuit 406 and the calculation control circuit 404 function as a correlation calculation means.

Figure 8A:
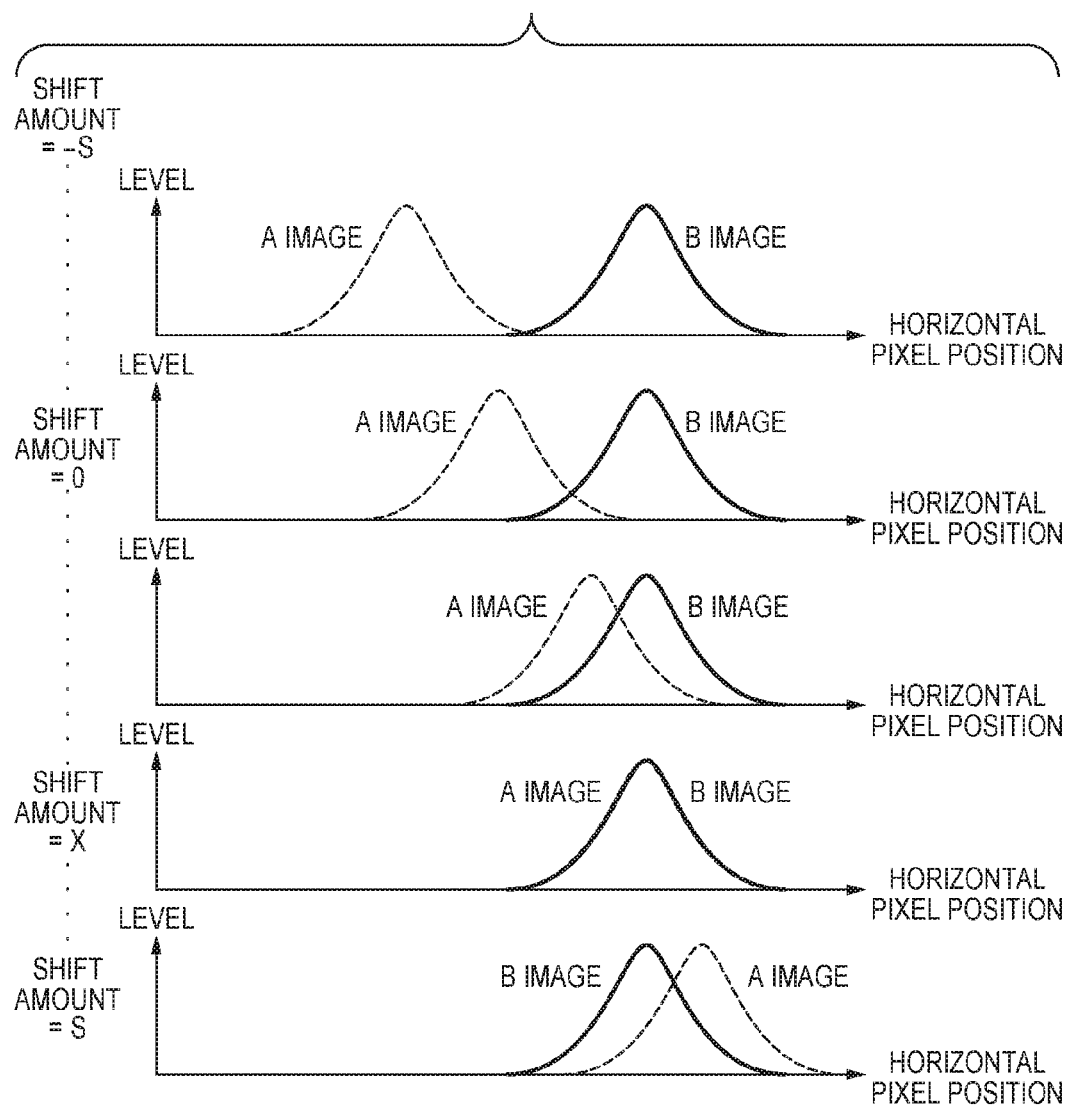
FIGS. 8A and 8B are diagrams illustrating the operation of the AF calculation unit in the first embodiment.
Figure 8B:
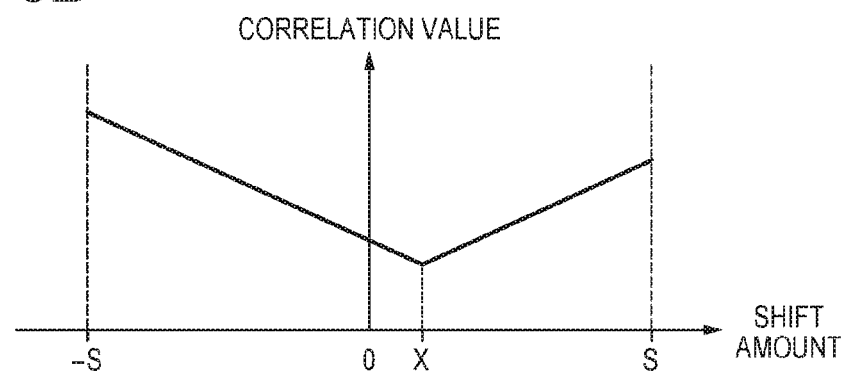

Correlation calculation processing performed by the correlation calculation circuit 406 will be described with reference to FIGS. 8A and 8B. The graphs shown in FIG. 8A indicate the levels (intensities) of an A image and a B image with respect to the positions of the pixels in the horizontal direction. In the graphs, the position of the A image is shifted and moved in a range from −S to S. In this manner, the A image is shifted and moved in the horizontal direction and is input to the correlation calculation circuit 406 at the same time. Here, it is assumed that the shift amount in the case of shifting A image data to the left is negative, and the shift amount in the case of shifting the A image data to the right is positive.

The correlation calculation circuit 406 calculates the absolute values of the differences between the A image and the B image at corresponding positions, and calculates a correlation value for one row by adding this absolute value data at the pixel positions. FIG. 8B is a graph showing correlation values calculated for the shift amounts in the example in FIG. 8A. In the example shown in FIG. 8A, regarding the focal position, the A image and the B image match when shift amount=X. In this case, as shown in FIG. 8B, when shift amount=X, the correlation value is minimum. Note that a correlation value calculation method that can be applied to this embodiment is not limited thereto. Any method can be applied as long as the method is a calculation method that indicates the correlation between the image A and the B image.

The calculation control circuit 404 determines whether or not the A image and the AB image that are input are within the set region, based on the vertical synchronization signal and the horizontal synchronization signal that are input. In the case where the image A and the AB image are within the set region, the calculation control circuit 404 outputs a region number indicating an AF region to the memory control unit 409. The memory control unit 409 references the region number, and outputs, to the memory 408, a control signal for outputting, to the adder 407, the correlation calculation result for the row immediately preceding the current row to be subjected to calculation. The adder 407 adds, for each shift amount, the correlation data output from the correlation calculation circuit 406 and the correlation calculation result for the preceding row that is output from the memory 408 (addition means). A correlation value (the correlation data) of one AF region for each shift amount, which is calculated in this manner, is output to the memory 408, and is held in the memory 408.

When correlation calculation in one or more set AF regions ends, the defocus amount calculation unit 410 outputs a memory control signal to the memory 408. The memory 408 outputs the correlation data of each AF region in accordance with the memory control signal. At the same time, the CPU 101 transfers, to the AF calculation unit 107, a correction value that is stored in the ROM 105 and will be described later. The subtractor 411 subtracts the correction value that is input, from the data output from the memory 408, and the subtraction result is input to the defocus amount calculation unit 410. The defocus amount calculation unit 410 calculates a defocus amount (a Y value) based on the correlation data of each AF region, and outputs the defocus amount.

Figure 9:
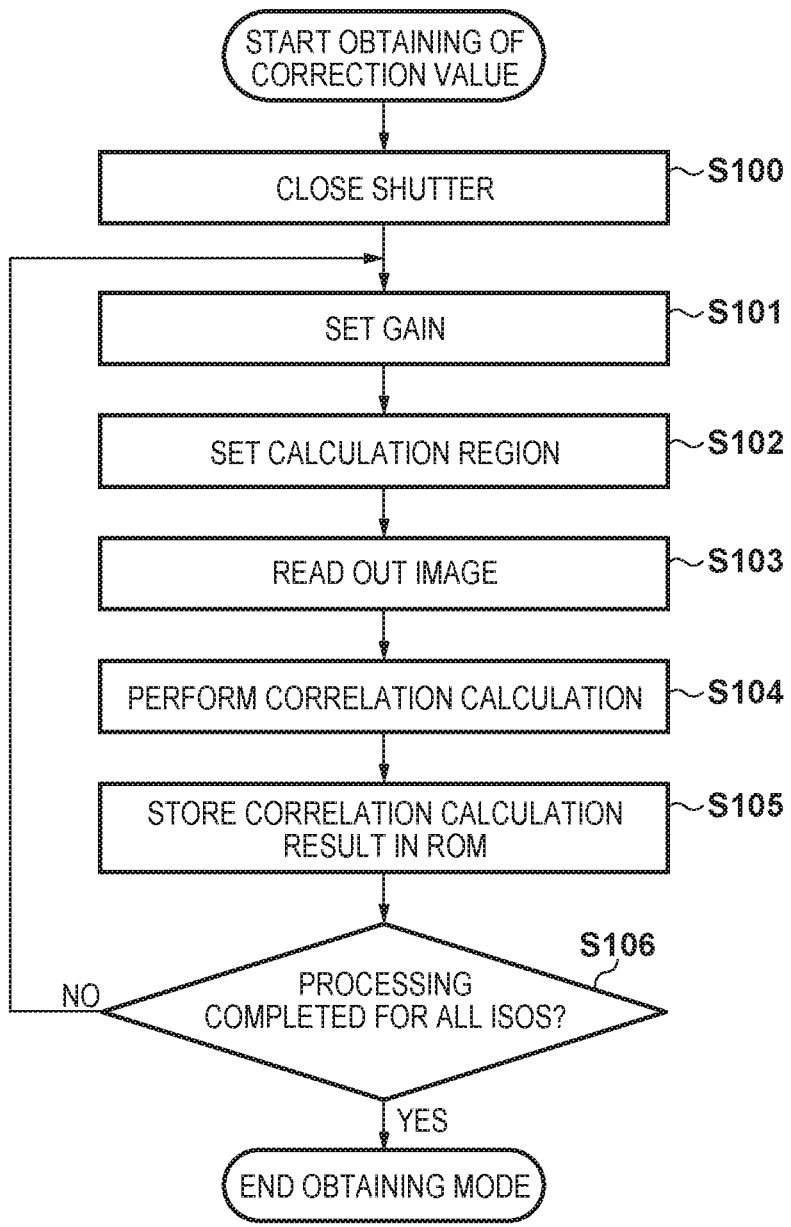
FIG. 9 is a flowchart showing the operations of an image capturing apparatus in the first embodiment.

Next, the operations of the image capturing apparatus 1000 in this embodiment will be described with reference to the flowcharts in FIGS. 9 and 10. The image capturing apparatus 1000 of this embodiment has a correction value obtaining mode for operating the apparatus in advance at the time of factory shipment and a normal mode for the user to perform normal shooting. In the correction value obtaining mode, a correction value that is used when performing correlation calculation during normal shooting is obtained, and is stored in the ROM 105 in the image capturing apparatus.

First, the correction value obtaining mode will be described with reference to FIG. 9. When the correction value obtaining mode is turned on by operating the operation unit 102, the image capturing apparatus 1000 starts shooting for obtaining a correction value. First, in step S100, the CPU 101 achieves a state where the focal plane shutter 109 is closed. Accordingly, the image sensor 100 enters a state of being shielded from light.

Next, in step S101, the CPU 101 sets, for the image sensor 100, a gain equivalent to the ISO sensitivity 100 (ISO 100). In the image sensor 100, a control signal GAIN 0 rises to H due to the ISO 100 being set. Accordingly, when pixel signals are read out, the pixel signals will be amplified by an inverted gain in a case where the feedback capacitor 214 is used.

Figure 11A:
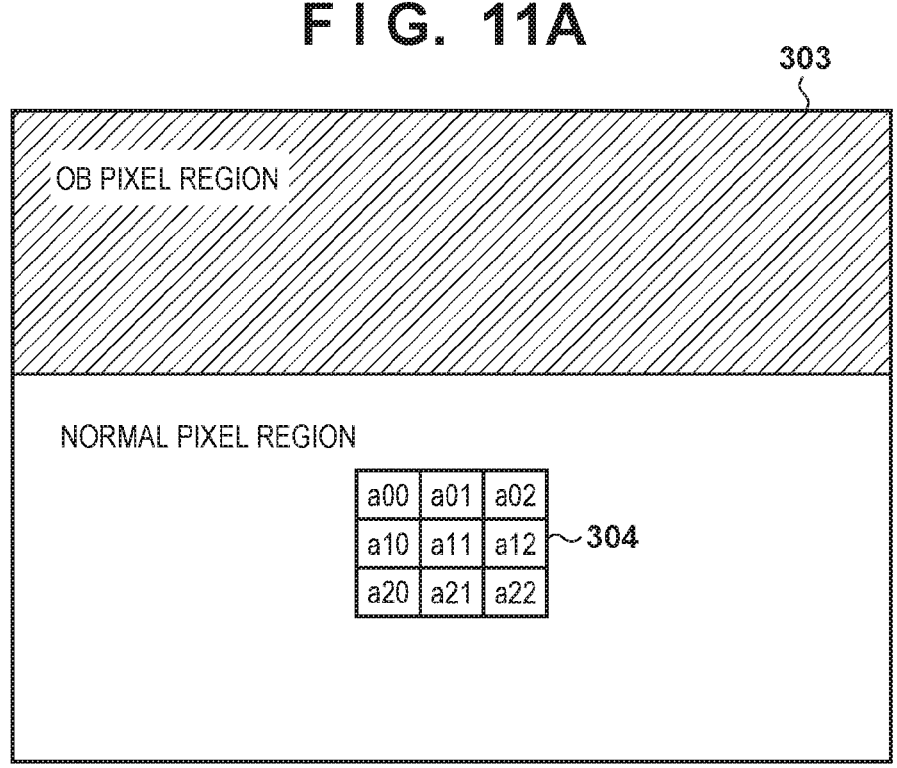
FIGS. 11A and 11B are diagrams illustrating the operations of an image sensor and the AF calculation unit in the first embodiment.

After that, in step S102, the CPU 101 sets a calculation region for correlation calculation, for the AF calculation unit 107. When the setting is made, the calculation region is set for the calculation region setting unit 405. FIG. 11A shows the calculation region (correction value calculation region) at this time. An image in which an image A and an AB image are read out is denoted by 303. The pixel array 234 of this embodiment has OB pixels (optical black pixels) whose upper portion is shielded from light. A calculation region 304 is positioned in a region of normal pixels, rather than OB pixels, and is configured to be divided into regions a00 to a22 as shown in FIG. 11A.

After that, in step S103, image readout is started. In the correction value obtaining mode, shooting is started in the moving image mode. When image readout is performed, the A image and the AB image that are read out are transferred to the AF calculation unit 107. When the A image and the AB image are transferred, correlation calculation is performed by the above-described operation.

Figure 12A:
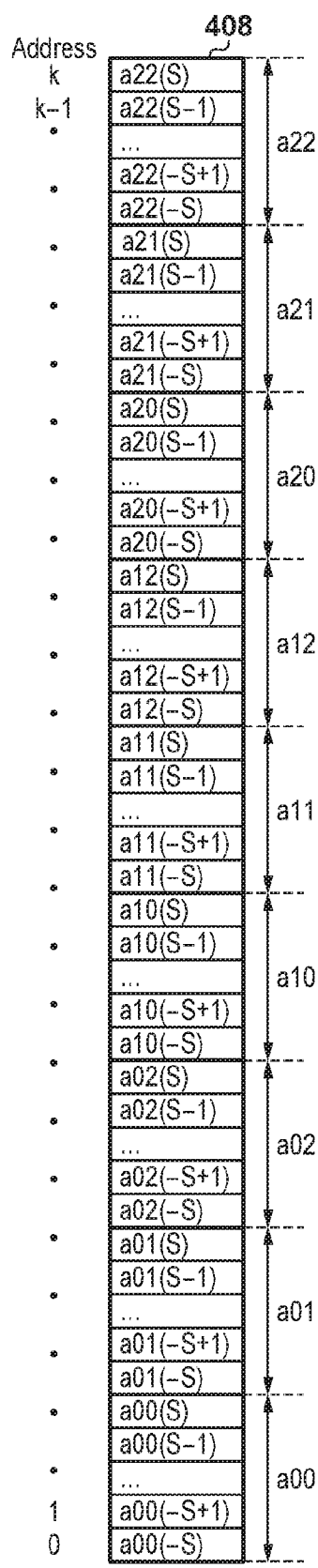
FIGS. 12A and 12B are diagrams illustrating the operation of the AF calculation unit in the first embodiment.

As the results of the correlation calculation, results regarding shift amounts −S to S for each of the regions a00 to a22 are stored in the memory 408, as shown in FIG. 12A. For example, FIG. 12A shows a state where a correction value for a shift amount S of the region a00 is stored as a00(S) in the memory 408. This stored correlation calculation result is a correlation value related to a state of being shielded from light, namely, random noise, and serves as a correction value.

Next, in step S105, the CPU 101 writes, in the ROM 105, the correction value stored in the memory 408. In step S106, it is determined whether or not the processing of steps S101 to S105 has been performed for all of the ISO sensitivities of the image capturing apparatus. Here, the processing has not been performed for all the ISO sensitivities, and thus the procedure returns to step S101.

Next, in step S101, the CPU 101 sets a gain equivalent to the ISO sensitivity 200 (ISO 200) for the image sensor 100. In the image sensor 100, a control signal GAIN1 rises to H due to ISO 200 being set. Accordingly, when pixel signals are read out, the pixel signals will be amplified by an inverted gain in the case where the feedback capacitor 215 is used. The operations of steps S102 to S105 after that are similar to the above-described operations.

Figure 12B:
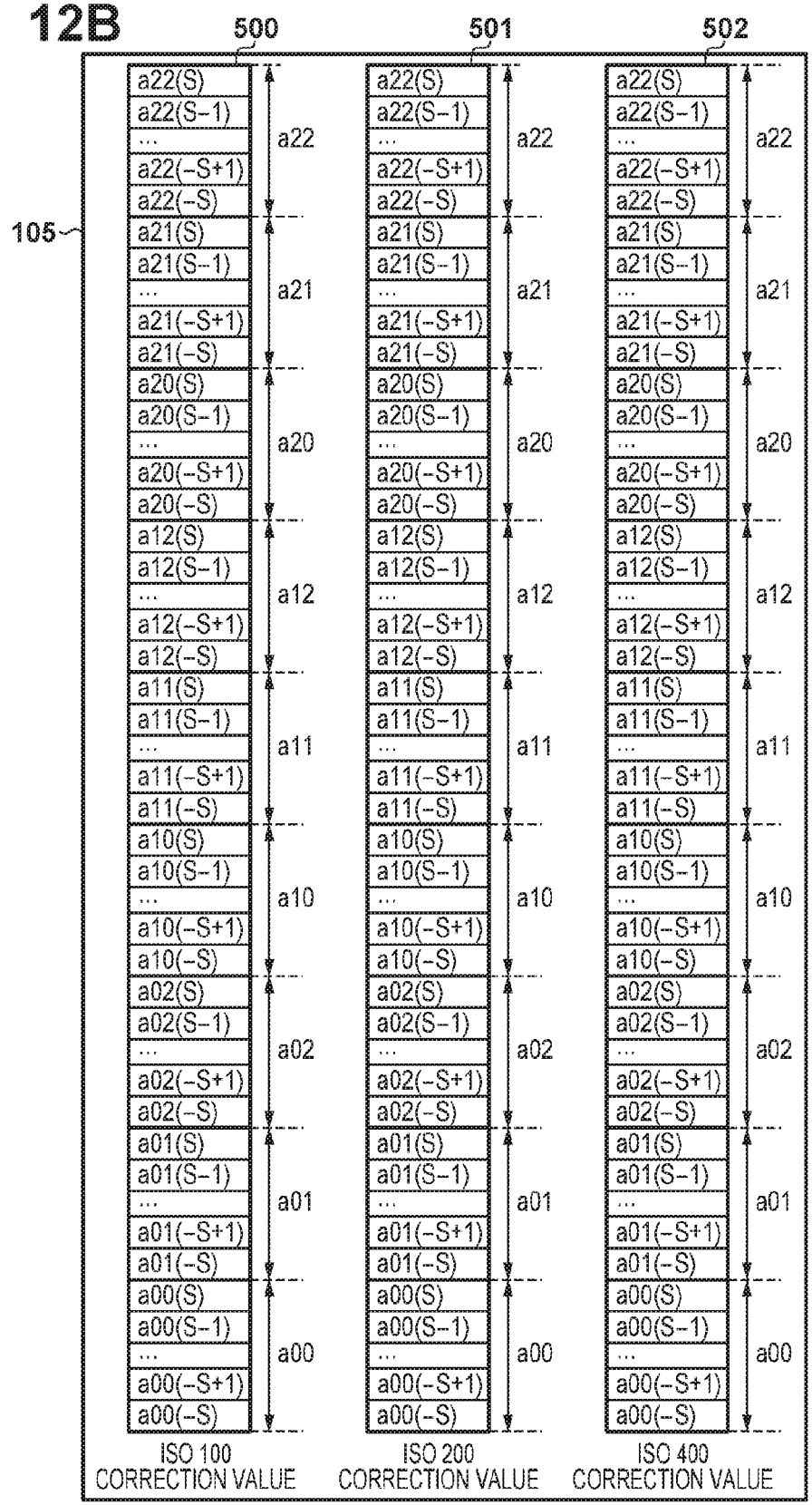

When the operations of steps S101 to S106 are performed for all of the ISO sensitivities 100 to 400, correction value obtaining is complete. When correction value obtaining is complete, the correction values 500 to 502 for ISO 100 to ISO 400 will be stored in the ROM 105 as shown in FIG. 12B.

Next, operations in the normal mode will be described with reference to FIG. 10. When moving image shooting is started by operating the operation unit 102, first, in step S200, the CPU 101 achieves a state where the focal plane shutter 109 is open. Accordingly, the image sensor 100 enters a state where exposure is possible.

Next, in step S201, it is determined whether or not shooting is being started or the ISO sensitivity is being changed. Here, moving image shooting is being started, and thus the procedure advances to step S202. In the case where shooting is not being started and the ISO sensitivity is not being changed, the procedure advances to step S203.

In step S202, the CPU 101 sets a gain that is based on the ISO sensitivity in the image sensor 100. Here, it is assumed that the ISO sensitivity 100 is selected, and a control signal GAIN0 rises to H by ISO 100 being set in the image sensor 100. Accordingly, when pixel signals are read out, the pixel signals will be amplified by an inverted gain in the case where the feedback capacitor 214 is used.

Next, in step S203, it is determined whether or not an AF switch included in the operation unit 102 has been pressed. Here, in the case where the AF switch has been pressed, the procedure advances to step S204. In the case where the AF switch has not been pressed, the procedure advances to step S211.

In step S211, image readout is started. When image readout is performed, an AB image that has been read out is transferred to the image processing unit 106. The AB image is subjected to predetermined image correction and compression in the image processing unit 106, and is then recorded as a moving image file in the storage unit 108. After that, the procedure advances to step S207.

Figure 11B:
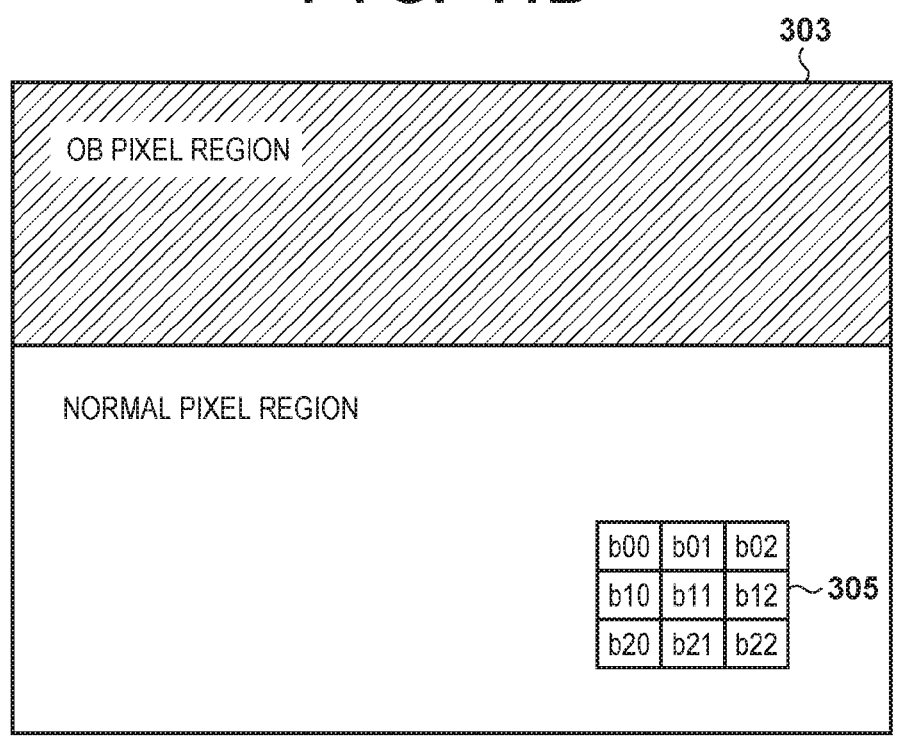

In step S204, the CPU 101 sets a calculation region for correlation calculation, for the AF calculation unit 107. When the setting is made, the calculation region is set for the calculation region setting unit 405. FIG. 11B shows the calculation region at this time. A calculation region 305 is positioned in a region of normal pixels, rather than OB pixels, and is configured to be divided into regions b00 to b22 as shown in FIG. 11B. Both the number of pixels in the vertical direction and the number of pixels in the horizontal direction in each of the regions b00 to b22 are assumed to be the same as those in each of the above-described regions a00 to a22, respectively.

After that, in step S205, image readout is started. When image readout is performed, an AB image that has been read out is transferred to the image processing unit 106. The AB image is subjected to predetermined image correction and compression in the image processing unit 106, and is then recorded as a moving image file in the storage unit 108. Also, an A image that is read out and the AB image are transferred to the AF calculation unit 107. When the image A and the AB image are transferred, correlation calculation is performed by the above-described operation.

Figure 13:
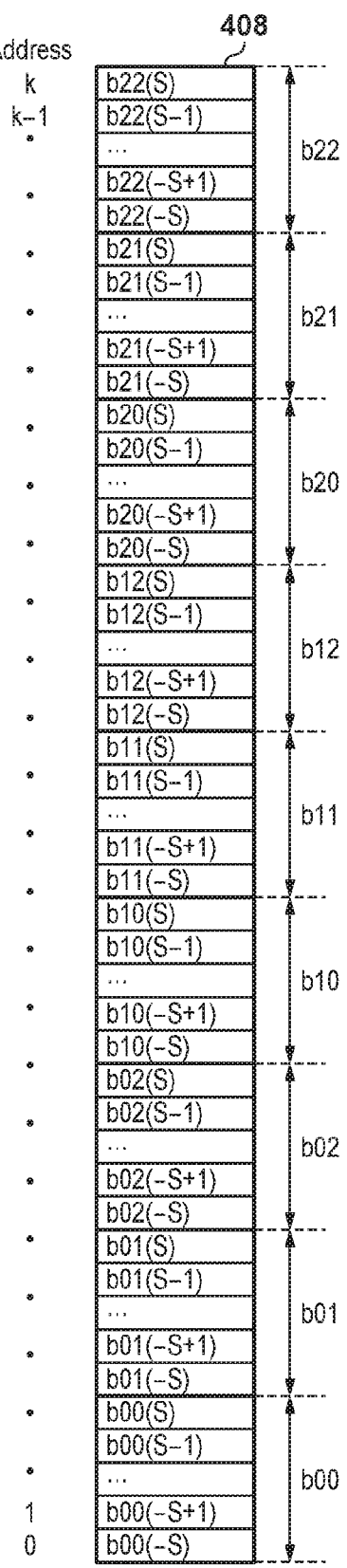
FIG. 13 is a diagram illustrating the operation of the AF calculation unit in the first embodiment.

Results regarding shift amounts −S to S for each of the regions b00 to b22 are stored in the memory 408 as the results of the correlation calculation, as shown in FIG. 13. When the correlation calculation ends, the defocus amount calculation unit 410 outputs a memory control signal to the memory 408. The memory 408 outputs the correlation data for each AF region in accordance with the memory control signal. At the same time, the CPU 101 transfers, to the AF calculation unit 107, correction values as shown in FIG. 12B that are stored in the ROM 105. Here, the correction values 500, which are correction values for ISO 100, are transferred. The subtractor 411 subtracts, from the data of the regions b00 to b22 output from the memory 408, correction values corresponding to a00 to a22, which are the correction values 500. For example, letting a correction value of the region a00 for the shift amount S be a00(S), and data of the region b00 for the shift amount S be b00(S), the following calculations are performed.

$$b00(-S) - a00(-S)$$
$$b00(-S+1) - a00(-S+1)$$
$$\ldots$$
$$b00(S-1) - a00(S-1)$$
$$b00(S) - a00(S)$$

$$b01(-S) - a01(-S)$$
$$b01(-S+1) - a01(-S+1)$$
$$\ldots$$
$$b01(S-1) - a01(S-1)$$
$$b01(S) - a01(S)$$

$$\ldots$$

$$b22(-S) - a22(-S)$$
$$b22(-S+1) - a22(-S+1)$$
$$\ldots$$
$$b22(S-1) - a22(S-1)$$
$$b22(S) - a22(S)$$

As described above, correlation amounts for which noise has been corrected can be obtained by subtracting, from data of the correlation amounts of the regions b00 to b22, data of the correlation amounts of the corresponding regions a00 to a22 for the same shift amount S while the image sensor is shielded from light.

Note that, to be exact, it is preferred that the calculation regions a00 to a22 of correlation calculation for calculating correction amounts and the calculation regions b00 to b22 of correlation calculation for AF match in position in the screen of the image sensor. However, as in this embodiment, even if calculation regions of correlation calculation for calculating correction amounts and calculation regions of correlation calculation for AF are different in position, a correlation amount for a shift amount of 0 that appears as noise does not change by a large amount, and thus a sufficient effect can be obtained. Note that in the case where an increase in storage capacitor for storing calculation amounts and data is acceptable, if correction amounts for not only limited regions such as a00 to a22 but also for the regions of the entire screen are calculated and stored, the correction accuracy can be further improved.

Figure 14A:
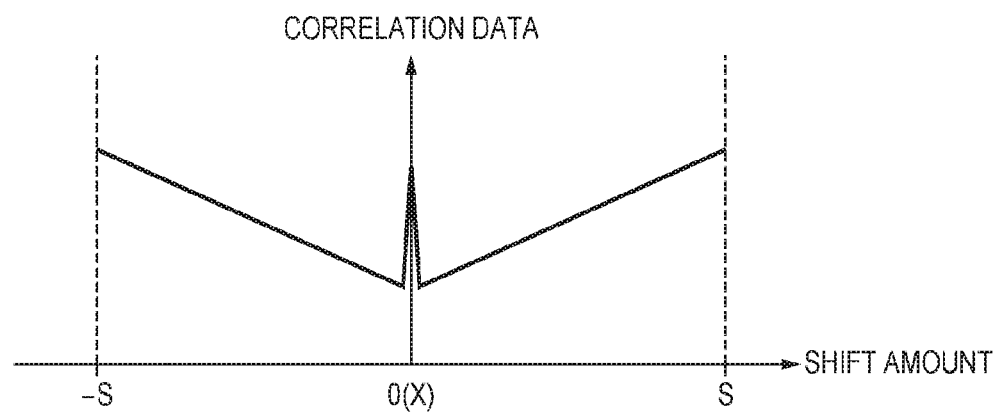
FIGS. 14A to 14C are diagrams illustrating the operation of the AF calculation unit in the first embodiment.
Figure 14B:
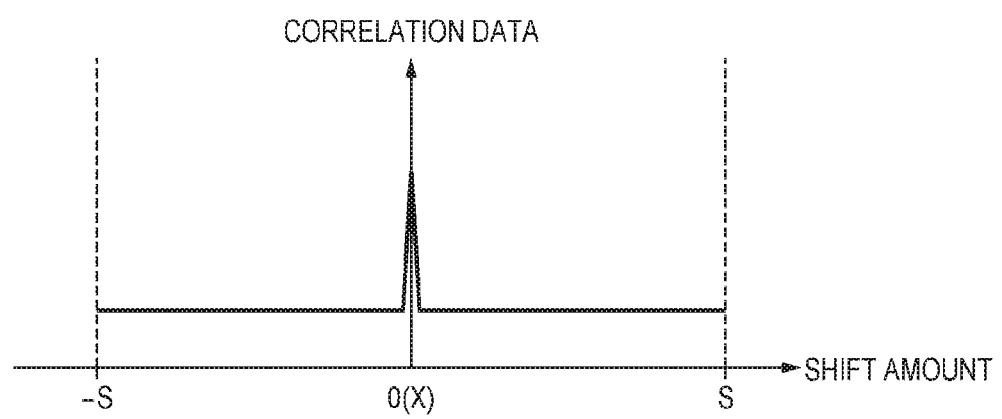
Figure 14C:
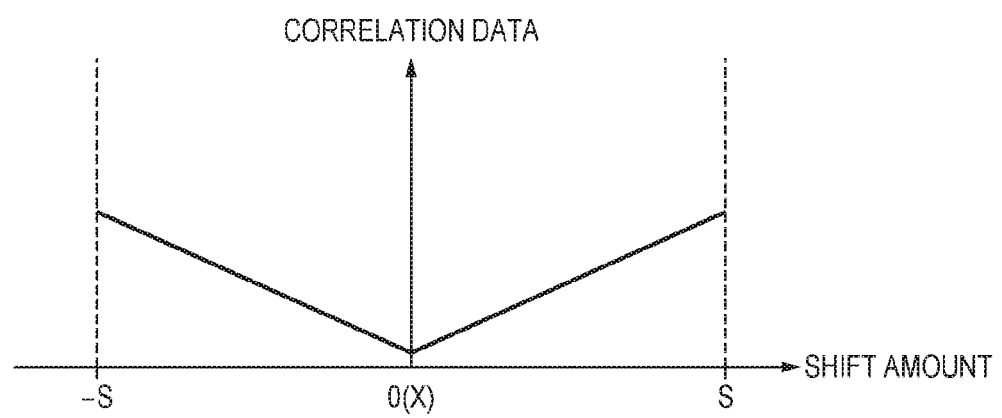
Figure 28A:
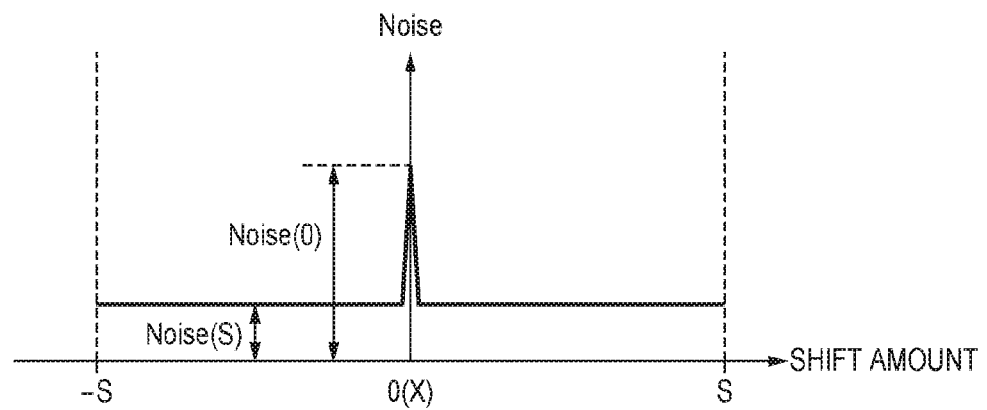
FIGS. 28A to 28C are diagrams illustrating the configuration and operation of a conventional technique.
Figure 28B:
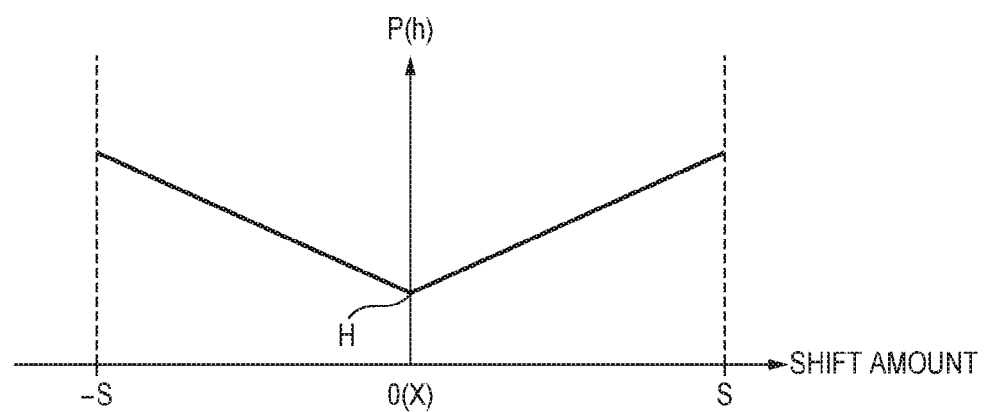
Figure 28C:
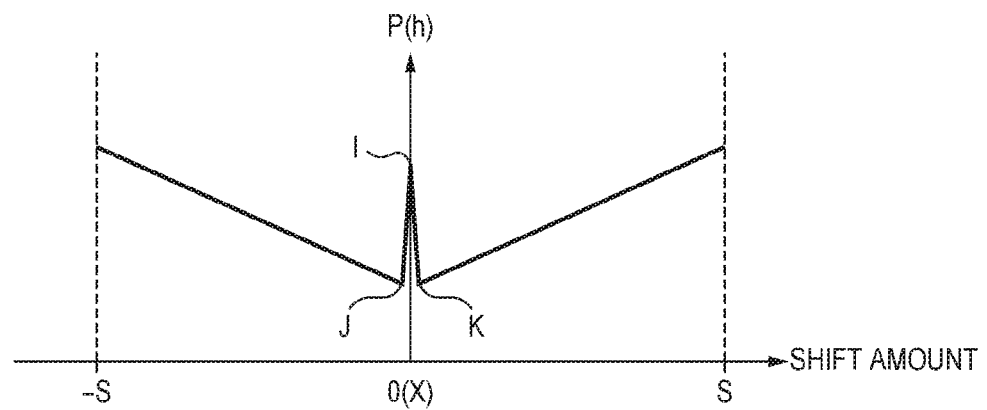

The concept of the above-described correction value subtraction is shown in FIGS. 14A to 14C. FIGS. 14A to 14C show correlation data in the case where the imaging optical system is in focus (X=0). FIG. 14A shows, out of correlation calculation results stored in the memory 408, correlation data of one region (e.g., b00) for the shift amounts −S to S. Also, FIG. 14B shows, out of the correction values 500 stored in the ROM 105, correlation data of one region (e.g., a00) for the shift amounts −S to S. The correction values 500 are correlation data obtained in the light-shielded state, and thus as shown in FIG. 14B, correlation amount data increases if shift amount=0. This is a result of a random noise amount, which is obtained by inverting the sign of the amount of random noise superimposed on an A image, being superimposed on a B image due to the above-described subtraction of the A image from an A+B image, generation of the B image, and execution of correlation calculation. This is a noise amount of N[A]*2 superimposed during correlation calculation when the shift amount is 0, and a similar correlation amount is superimposed on correlation data obtained from an exposed image as in FIG. 14A. This is the above-described state in FIG. 28A. A plurality of minimum points are generated in the waveform of correlation data in this manner, but if the above-described correction value subtraction (correction) is performed, the correlation amount in the light-shielded state when the shift amount is 0 is cancelled, as shown in FIG. 14C.

The subtraction result is input to the defocus amount calculation unit 410. The defocus amount calculation unit 410 calculates a defocus amount (a Y value) based on correlation data of each AF region, and outputs the defocus amount to the RAM 104. At this time, the defocus amount is calculated using the correlation data that depends on a correlation amount generated in the light-shielded state, and in which a plurality of minimum points have been corrected, and thus the Y value can be appropriately calculated.

Next, in step S206, the CPU 101 compares the Y value stored in the RAM 104 to a predetermined threshold, and in the case where the driving distance of the focus lens is smaller than the predetermined threshold, determines that the imaging optical system is in focus, and the procedure advances to step S207. In the case where it is determined that the imaging optical system is not in focus, the procedure advances to step S210. In step S210, the CPU 101 selects, from the Y values for the regions that are stored in the RAM 104, driving distance information to be transferred to the focus driving circuit 110. In this embodiment, driving distance information of the region b11 is selected as driving distance information of a region in which the focus position is closest. After that, the CPU 101 transfers the selected driving distance information to the focus driving circuit 110. The focus driving circuit 110 generates a signal for driving the focus actuator 112 based on the driving distance information (driving signal generation means), and drives the third lens group 117 so as to advance/retreat in the optical axis direction, thereby performing focus adjustment. After that, the procedure returns to step S204.

In step S206, if it is determined that the imaging optical system is in focus and the procedure advances to step S207, the CPU 101 determines in step S207 whether or not a still image shooting switch included in the operation unit 102 has been pressed by the user. In the case where it is determined that the still image shooting switch has been pressed, the procedure advances to step S208. In the case where it is determined that the still image shooting switch has not been pressed, the procedure advances to step S209.

In the case where the still image shooting switch has been pressed, in step S208, moving image shooting is stopped, and still image shooting is performed. After that, moving image shooting is resumed, and the procedure advances to step S209. In step S209, the CPU 101 determines whether or not a moving image shooting switch has been pressed by the user. In the case where it is determined that the moving image shooting switch has been pressed, moving image shooting is ended. In the case where it is determined that the moving image shooting switch has not been pressed, the procedure returns to step S201, where it is determined whether or not the ISO sensitivity has been changed.

In the case where it is determined in step S201 that the ISO sensitivity has been changed, the procedure advances to step S202, where the CPU 101 sets a gain for the changed ISO sensitivity, for the image sensor 100. Here, in the case where the ISO sensitivity is ISO 200, a setting is made such that a control signal GAIN1 rises to H, and in the case where the ISO sensitivity is 400, a setting is made such that a control signal GAIN2 rises to H. In correspondence with this, during correlation calculation in step S205, the correction value 501 will be transferred from the ROM 105 to the AF calculation unit 107 in the case of ISO 200, and the correction value 502 will be transferred from the ROM 105 to the AF calculation unit 107 in the case of ISO 400.

The above-described operations make it possible to calculate correlation values of an object image and perform appropriate focus position detection, even in the case where a correlation value that is not related to a correlation value obtained from the object image and that is related to a noise component of random noise or the like is superimposed on the correlation calculation result. As a result, even low luminance and low contrast objects can be focused on. Also, even in the case where the gain to be applied to an image is changed due to the ISO sensitivity being changed or the like, and the noise amount changes, the correlation calculation result can be corrected in accordance with the noise amount.

In this embodiment, a configuration is adopted in which correction values that is based on a noise amount are provided, but the present invention is not limited thereto. A configuration may be adopted in which a correction value is provided for each of various temperature ranges, and the correction value is changed according to the environmental temperature during shooting. Also, a configuration can be applied in which, for example, a correction value is provided for each of various accumulation time ranges, and the correction value is changed according to the accumulation time during shooting. In other words, any configuration can be applied as long as a correction value is provided for each of various conditions with a different correlation amount that is not related to a correlation value obtained from an object image.

Second Embodiment

Next, an image capturing apparatus according to a second embodiment of the present invention will be described. The configuration of the image capturing apparatus of this embodiment is the same as that of the first embodiment shown in FIG. 1, and thus the description thereof is omitted.

In the image capturing apparatus of this embodiment, the internal circuit configuration of the AF calculation unit is different. FIG. 15 is a diagram showing the configuration of an AF calculation unit 107A in the second embodiment. The AF calculation unit 107A of this embodiment has a subtractor 412 and a selector 413. Other constituent elements and the operations thereof are similar to those of the AF calculation unit 107 in the first embodiment, and the description thereof is omitted. Configurations and operations different from those of the first embodiment will be described below.

In this embodiment, the AF calculation unit 107A has a correction value obtaining mode and a focus detection mode. In the correction value obtaining mode, a CPU 101 controls a selector 413 so as to select an input 1, which is output of the subtractor 412. The subtractor 412 subtracts, from the value of 0, correlation data output from a correlation calculation circuit 406. Accordingly, correlation data will be converted into a negative value (inverted in positive/negative sign). An adder 407 adds, for each shift amount, the correlation data converted into a negative value and the correlation calculation result for the preceding row output from a memory 408 (addition means). The correlation value (correlation data) of one AF region for each shift amount calculated in this manner is output to the memory 408, and is held in the memory 408. In the correction value obtaining mode, this operation causes a correlation calculation result for a designated region to be stored as a correction value in a negative value.

In the focus detection mode, the CPU 101 controls the selector 413 so as to select an input 0, which is correlation data that is output from the correlation calculation circuit 406 and input without any change. The adder 407 adds, for each shift amount, the correlation data output from the correlation calculation circuit 406 and the correlation calculation result for the preceding row output from the memory 408 (addition means). In this case, during addition for the first row, a correction value is output from the memory 408, and correlation data and the correction value are added. Regarding the succeeding rows, correlation data of the row will be added to the result of adding the correction value and the correlation calculation result of a preceding row.

Figure 16:
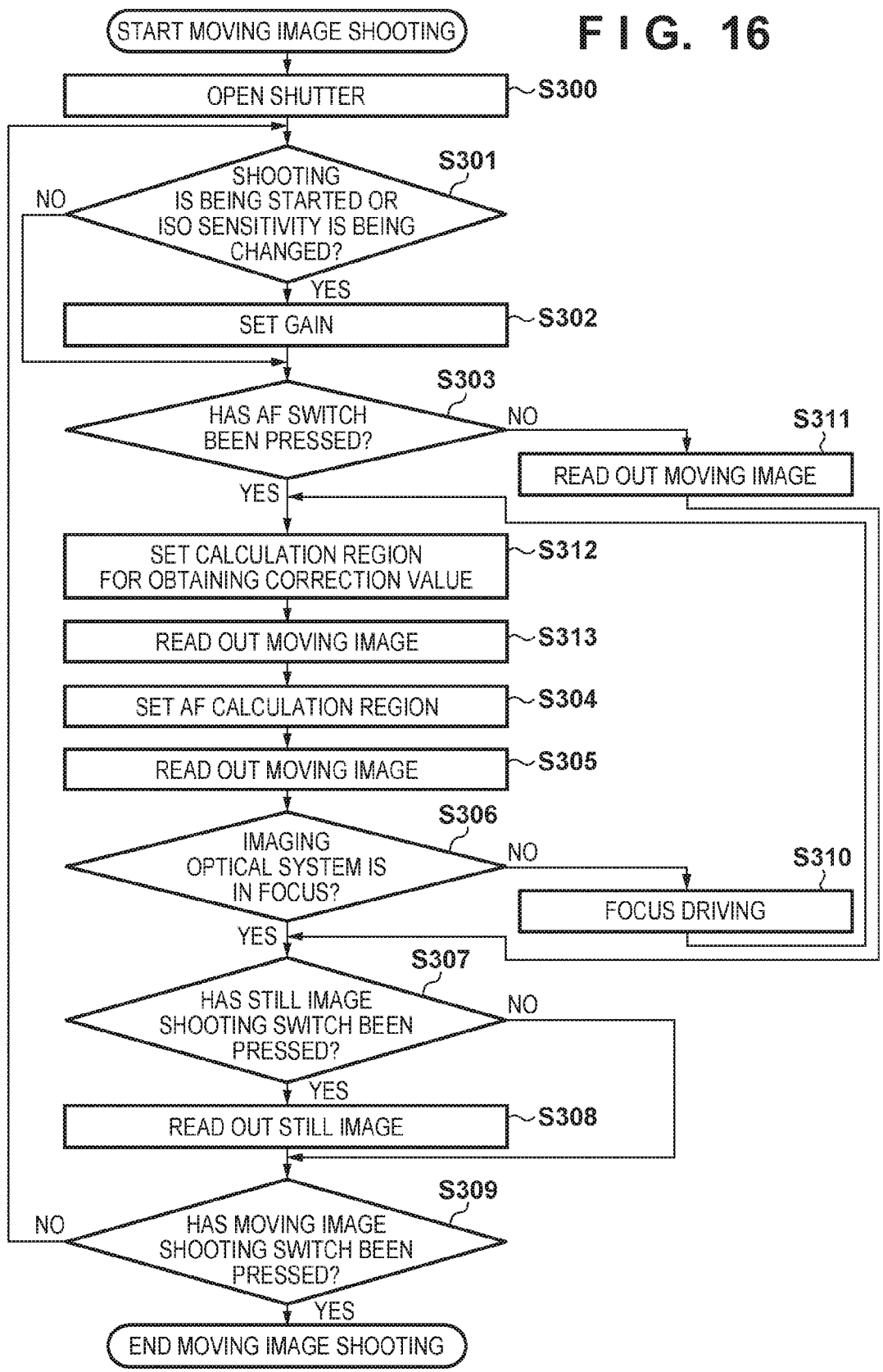
FIG. 16 is a flowchart showing the operations of an image capturing apparatus in the second embodiment.

Here, the operation of the image capturing apparatus in this embodiment will be described with reference to FIG. 16. When an operation unit 102 is operated and moving image shooting is started, first, in step S300, the CPU 101 achieves a state where the focal plane shutter 109 is open. Accordingly, an image sensor 100 enters a state where exposure is possible.

Next, in step S301, it is determined whether or not shooting is being started or the ISO sensitivity is being changed. Here, moving image shooting is being started, and thus the procedure advances to step S302. In the case where shooting is not being started and the ISO sensitivity is not being changed, the procedure advances to step S303.

Figure 10:
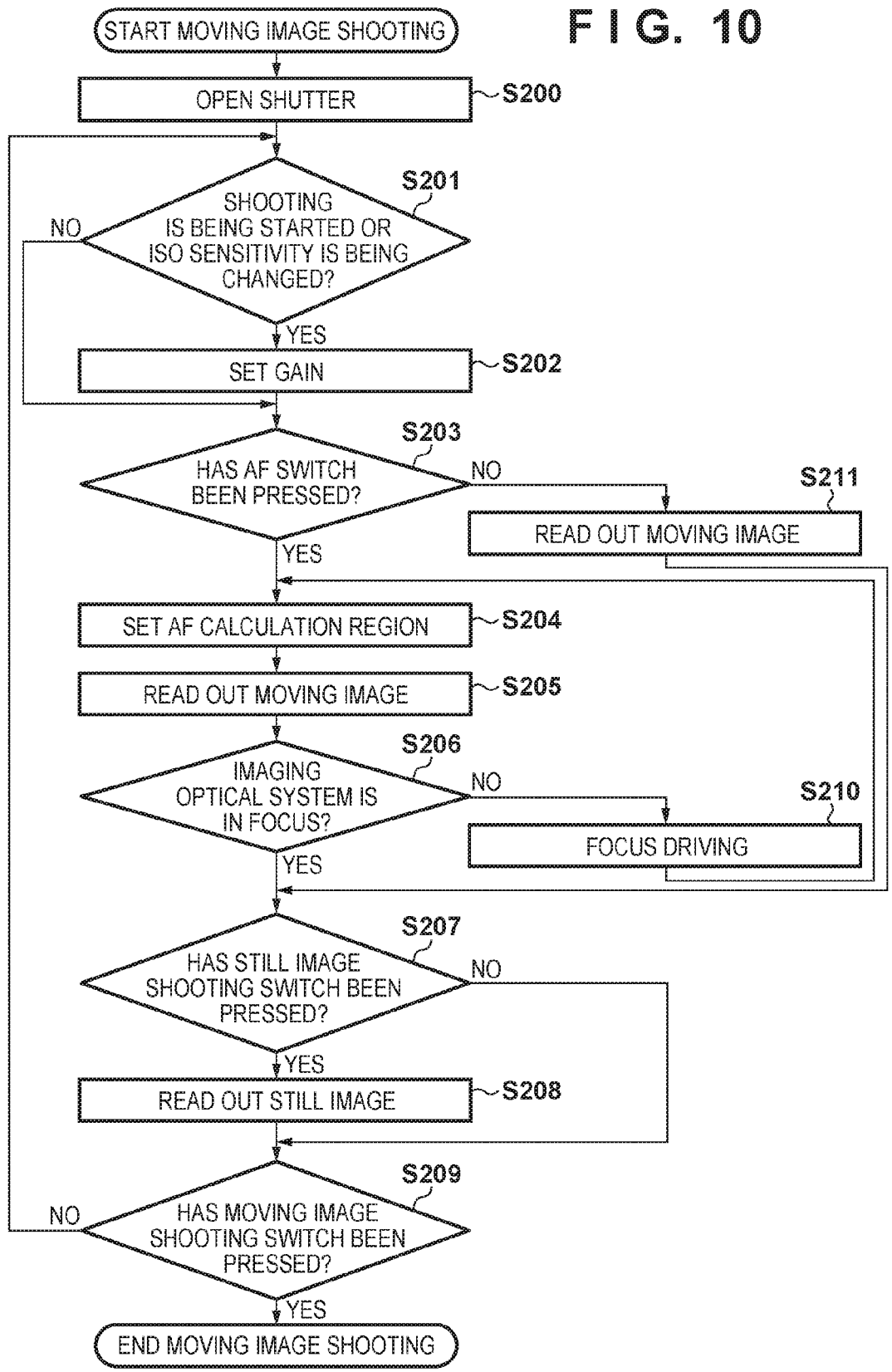
FIG. 10 is a flowchart showing the operations of the image capturing apparatus in the first embodiment.

The operation of step S302 is the same as that of step S202 shown in FIG. 10, and thus the description thereof is omitted. Next, in step S303, it is determined whether or not an AF switch included in the operation unit 102 has been pressed. In the case where it is determined here that the AF switch has been pressed, the procedure advances to step S312. In the case where the AF switch has not been pressed, the procedure advances to step S311. The operation in step S311 is similar to the operation of step S211 in FIG. 10, and thus the description thereof is omitted.

Figure 17A:
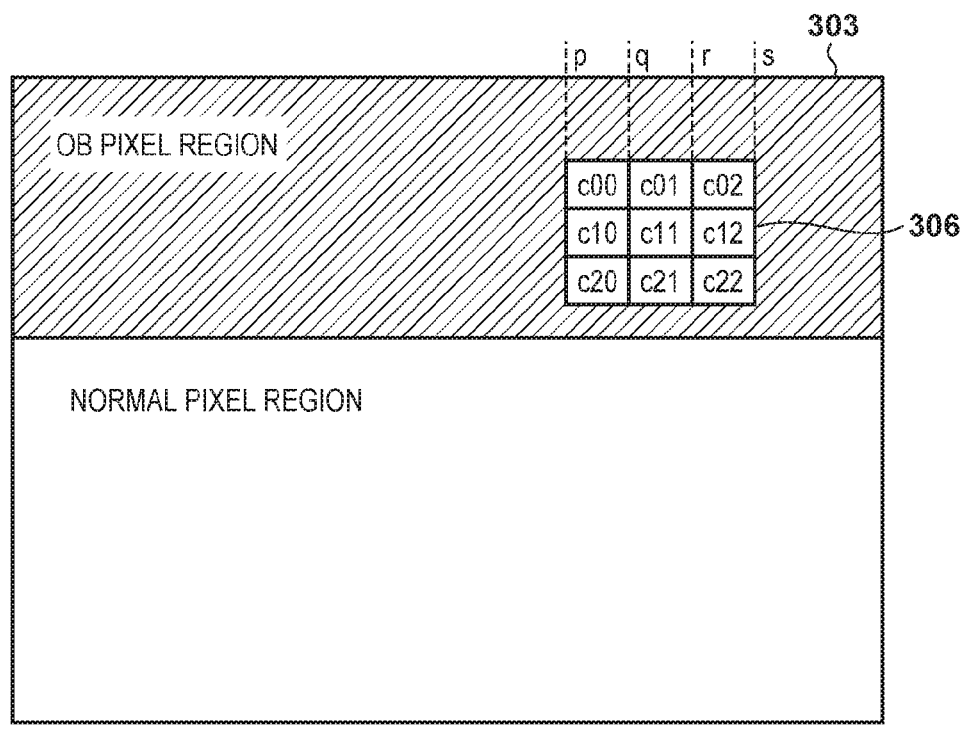
FIGS. 17A and 17B are diagrams illustrating the operations of an image sensor and the AF calculation unit in the second embodiment.

In step S312, the CPU 101 sets a calculation region for correlation calculation for obtaining a correction value, in the AF calculation unit 107A. When the setting is made, the calculation region is set for the calculation region setting unit 405. FIG. 17A is a diagram showing the calculation region at this time. A calculation region 306 is positioned in an OB pixel region, and is configured to be divided into regions c00 to c22, as shown in FIG. 17A. The number of pixels in the vertical direction and the number of pixels in the horizontal direction, as well as the positions in the horizontal direction in each of the regions c00 to c22 are set to be the same as those of calculation regions in which focus detection is performed and which will be described later.

After that, in step S313, image readout is started. When image readout is performed, an AB image that has been read out is transferred to an image processing unit 106. The AB image is subjected to predetermined pixel correction and compression in the image processing unit 106, and is then recorded as a moving image file in a storage unit 108. Also, an A image that is read out and the AB image are transferred to the AF calculation unit 107A. When the A image and the AB image are transferred, correlation calculation is performed by the above-described operations in the AF calculation unit 107A. At this time, the CPU 101 controls the selector 413 so as to select the input 1, which is output of the subtractor 412. Accordingly, as shown in FIG. 18A, the results regarding the shift amounts −S to S for each of the regions c00 to c22 are stored as negative values in the memory 408. After that, the procedure advances to step S304.

Figure 17B:
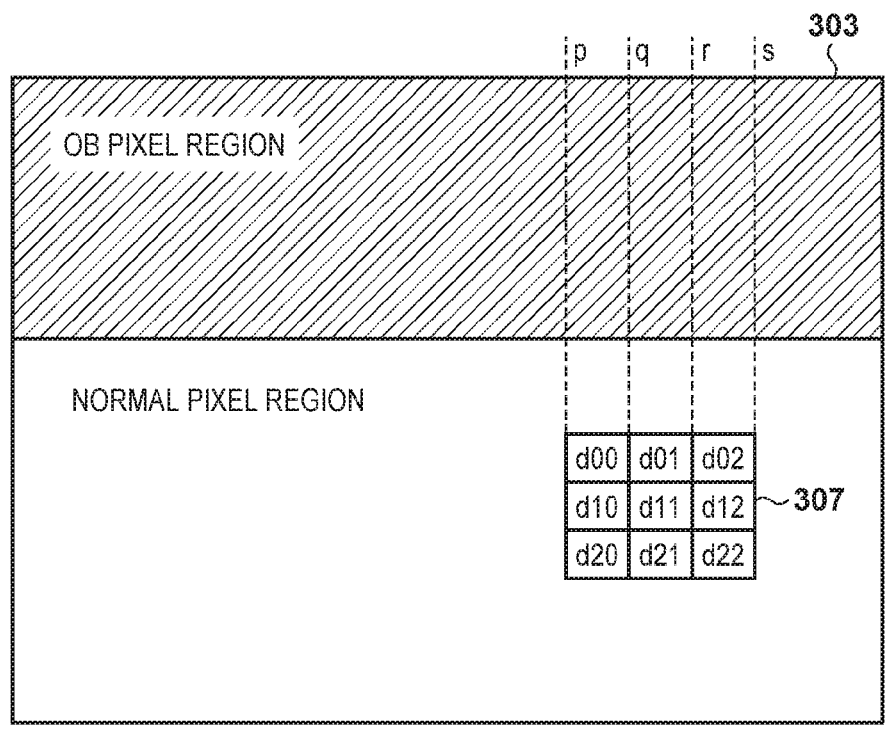

In step S304, the CPU 101 sets a calculation region for correlation calculation for AF, in the AF calculation unit 107A. When the setting is made, the calculation region is set for the calculation region setting unit 405. FIG. 17B shows the calculation region at this time. A calculation region 307 is positioned in a region of normal pixels, rather than OB pixels, and is configured to be divided into regions d00 to d22 as shown in FIG. 17B. Both the number of pixels in the vertical direction and the number of pixels in the horizontal direction in each of the regions d00 to d22 are the same as those in each of the above-described regions c00 to c22. Also, regarding the in the horizontal positions in the regions as well, as indicated by coordinates p, q, r and s in FIG. 17B, coordinates in each of the regions d00 to d22 are assumed to be the same as coordinates in c00 to c22.

After that, in step S305, image readout is started. When image readout is performed, an AB image that has been read out is transferred to the image processing unit 106. The AB image is subjected to predetermined image correction and compression in the image processing unit 106, and is then recorded as a moving image file in the storage unit 108. Also, an A image that is read out and the AB image are transferred to the AF calculation unit 107A. When the A image and the AB image are transferred, correlation calculation is performed by the above-described operations in the AF calculation unit 107A.

At this time, the CPU 101 controls the selector 413 so as to select the input 0, which is output of the correlation calculation circuit 406 that is input without any change. The results of the correlation calculation are added to the correction values stored in the memory 408, as shown in FIG. 18B. For example, letting a correction value of the region c00 for a shift amount S be c00(S), and data of the region d00 for the shift amount S be d00(S), the following calculations are performed.

$$-c00(-S) + d00(-S)$$
$$-c00(-S+1) + d00(-S+1)$$
$$...$$
$$-c00(S-1) + d00(S-1)$$
$$-c00(S) + d00(S)$$

$$-c01(-S) + d01(-S)$$
$$-c01(-S+1) + d01(-S+1)$$
$$...$$
$$-c01(S-1) + d01(S-1)$$
$$-c01(S) + d01(S)$$

$$...$$

$$-c22(-S) + d22(-S)$$
$$-c22(-S+1) + d22(-S+1)$$
$$...$$
$$-c22(S-1) + d22(S-1)$$
$$-c22(S) + d22(S)$$

As described above, the regions c00 to c22 respectively correspond to the regions d00 to d22, and as shown in FIG. 18B, data from which data for a corresponding shift amount in each region was subtracted will be stored in the memory 408.

Figure 19A:
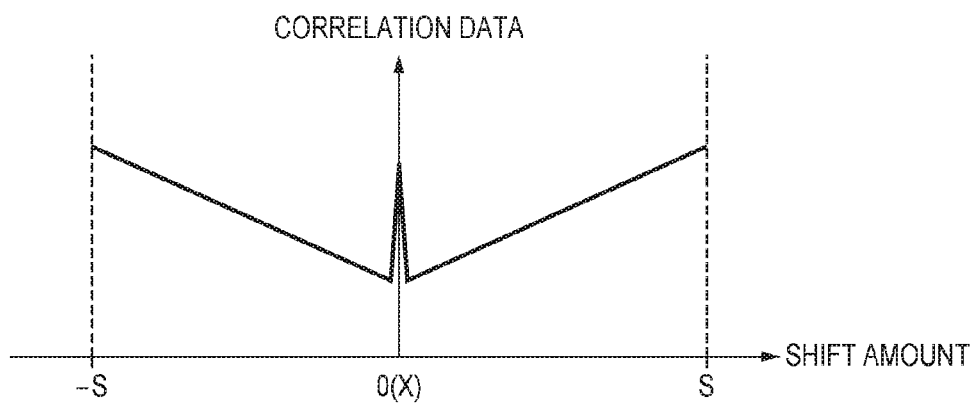
FIGS. 19A to 19C are diagrams illustrating the operation of the AF calculation unit in the second embodiment.
Figure 19B:
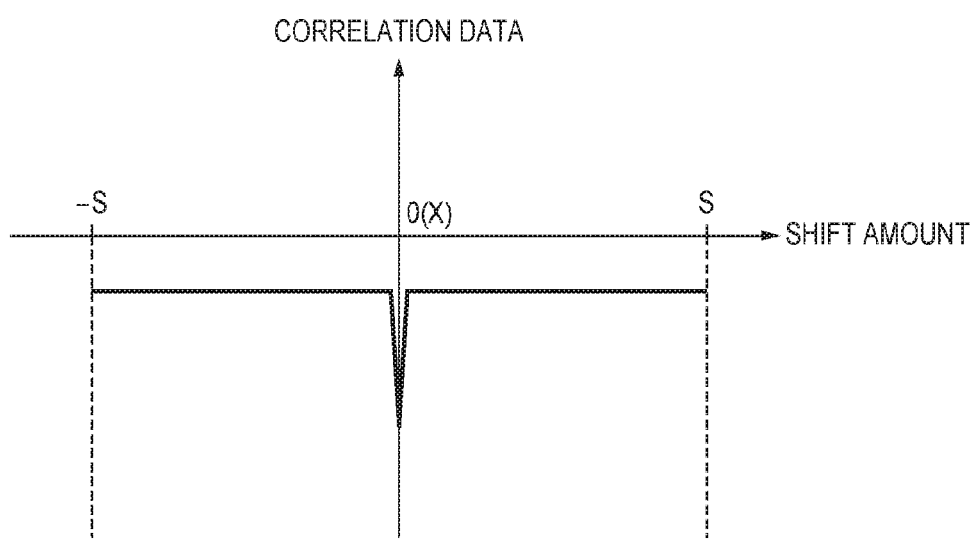
Figure 19C:
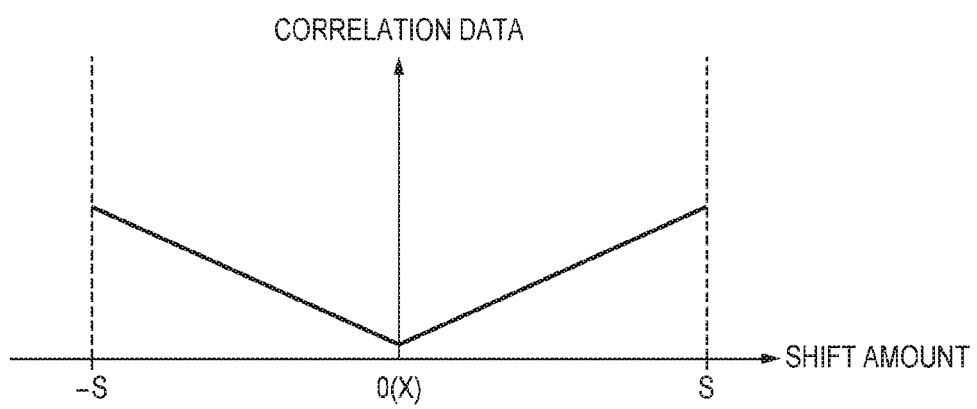

The concept of the above-described correction value subtraction is shown in FIGS. 19A to 19C. FIGS. 19A to 19C show correlation data in the case where the imaging optical system is in focus (X=0). FIG. 19A shows, out of correlation calculation results at the time of focus detection, correlation data of one region (e.g., d00) for shift amounts −S to S. Also, FIG. 19B shows correlation data (correction values) of one region (e.g., c00) for the shift amounts −S to S at the time of obtaining correction values. This is a result of a random noise amount obtained by inverting the sign of the amount of random noise superimposed on an A image being superimposed on a B image, in the case of performing the above-described subtraction of the A image from an A+B image, generation of the B image, and execution of correlation calculation. This is a noise amount of N[A]*2 superimposed during correlation calculation when the shift amount is 0, and a similar correlation amount is superimposed on correlation data at the time of focus detection as in FIG. 19A. This is the above-described state in FIG. 28A. A plurality of minimum points are generated in the waveform of correlation data in this manner. Correlation data of c00 is data obtained by converting correlation data obtained in an OB region into a negative value, and thus as described above, when correlation data at the time of focus detection is added to a correction value, a correlation amount in the light-shielded state, which will be noise when the shift amount is 0 is cancelled, as shown in FIG. 19C.

The subtraction result is input to a defocus amount calculation unit 410. The defocus amount calculation unit 410 calculates a defocus amount (a Y value) based on correlation data of each AF region, and outputs the defocus amount to a RAM 104. At this time, the defocus amount is calculated using the correlation data that depends on a correlation amount generated in the light-shielded state, and in which a plurality of minimum points have been corrected, and thus the Y value can be appropriately calculated. After that, the procedure advances to step S306.

The operations of steps S306 to S310 are similar to the operations of steps S206 to S210 shown in FIG. 10, and thus the description thereof is omitted.

Note that in the case where it is determined in step S309 that the moving image shooting switch has not been pressed, and the procedure returns to step S301, it is determined in step S301 whether or not the ISO sensitivity has been changed. In the case where the ISO sensitivity has been changed, the procedure advances to step S302, where the CPU 101 sets a gain for the changed ISO sensitivity, for the image sensor 100. Here, in the case where the ISO sensitivity is ISO 200, setting is made such that a control signal GAIN1 rises to H, and in the case where the ISO sensitivity is ISO 400, setting is made such that a control signal GAIN2 rises to H. This operation makes it possible to generate correction values for the ISO sensitivity at a time of focus detection and correct the correction value in step S313.

The above-described operations make it possible to calculate correlation values of an object image and perform appropriate focus position detection even in the case where a correlation value that is not related to a correlation value obtained from the object image and that is related to a noise component of random noise or the like is superimposed on the correlation calculation result. As a result, even low luminance and low contrast objects can be focused on.

In addition, even in the case where the gain to be applied to an image is changed due to the ISO sensitivity being changed or the like, and the noise amount changes, a correlation calculation result can be corrected in accordance with the noise amount. At this time, a correlation value (correction value) related to a noise component of random noise or the like is obtained immediately before performing focus detection, and thus even in the case where the noise amount changes due to the temperature or the like, a correction value that is adapted to the change can be applied.

Also, even in the case where the correction of different gain amounts in the horizontal direction or the like is applied and the noise amount varies in an image, appropriate correction can be performed by aligning, in the horizontal direction, the region for calculation at the time of focus detection and the region for calculation at the time of correction value acquisition.

Moreover, correction values are stored in the same memory as the memory for storing correlation data at the time of focus detection, and thus there is no need to provide a memory for the correction values.

Furthermore, due to a configuration in which correction values are obtained immediately in advance, a storage area for storing the correction values, a manufacturing process for obtaining the correction values and the like are not necessary.

Third Embodiment

Next, an image capturing apparatus according to a third embodiment of the present invention will be described. The configuration of the image capturing apparatus of this embodiment is the same as that of the first embodiment shown in FIG. 1, and thus the description thereof is omitted.

Figure 20:
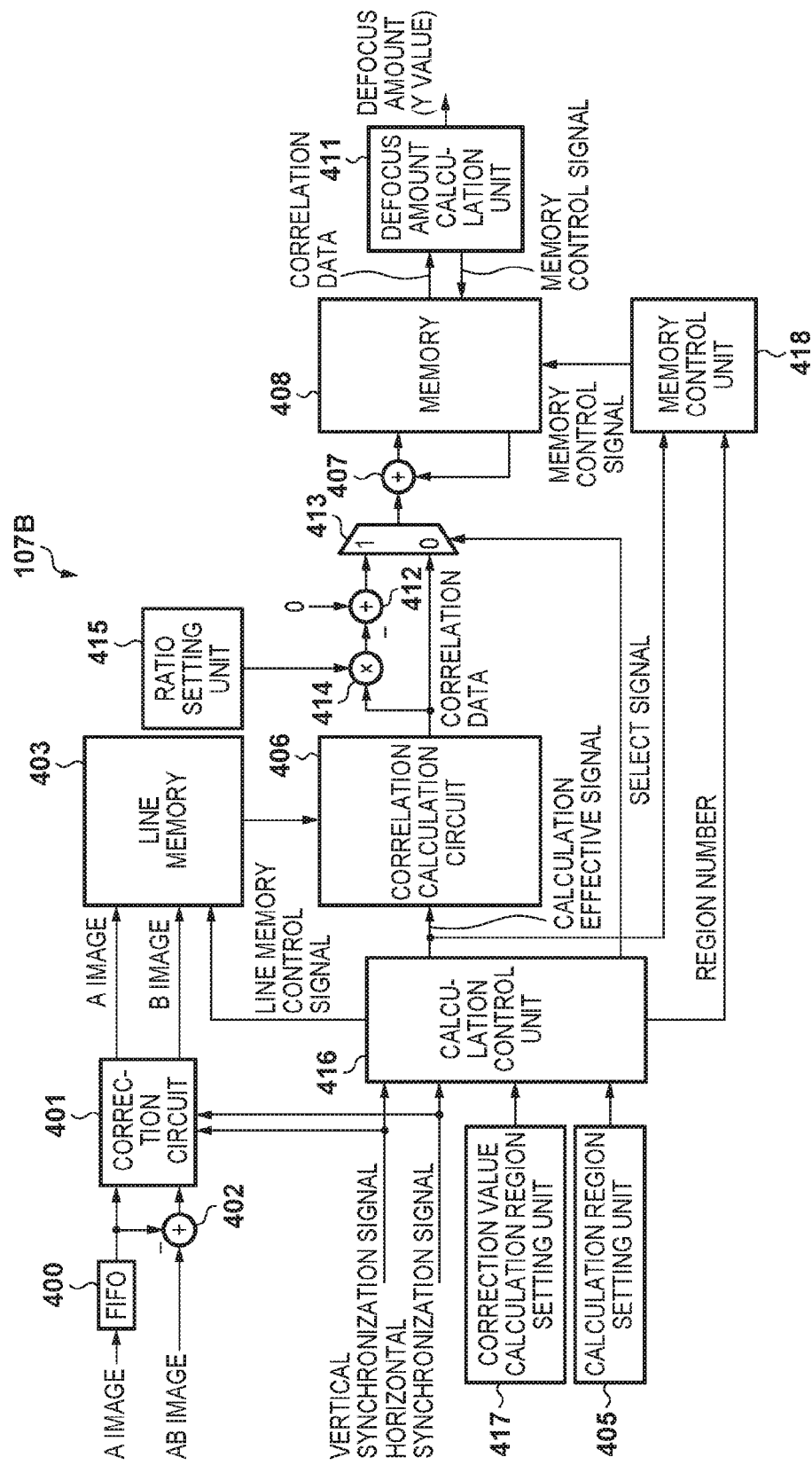
FIG. 20 is a diagram showing the configuration of an AF calculation unit in a third embodiment.

In the image capturing apparatus of this embodiment, the internal circuit configuration of the AF calculation unit is different. FIG. 20 is a diagram showing the configuration of an AF calculation unit 107B in this embodiment. The AF calculation unit 107B of this embodiment has a subtractor 412, a selector 413, a multiplier 414, a ratio setting unit 415, a calculation control unit 416, a correction value calculation region setting unit 417 and a memory control unit 418. Other constituent elements and the operations thereof are similar to those of the AF calculation unit 107 in the first embodiment, and the description thereof is omitted. Configurations and operations different from those of the first embodiment will be described below.

In this embodiment, the AF calculation unit 107B has the correction value calculation region setting unit 417 for setting a correlation calculation region for obtaining a correction value in an image of one frame, and the calculation region setting unit 405 for setting a correlation calculation region for performing focus detection. The correction value calculation region setting unit 417 and the calculation region setting unit 405 are set by a CPU 101. In the case where a calculated vertical position is within a correction value calculation region or a focus detection calculation region that has been set, the calculation control unit 416 outputs a calculation effective signal to a correlation calculation circuit 406. The calculation control unit 416 causes, based on an AF region that has been set, an A image and a B image at positions corresponding to the setting to be output from a line memory 403 to the correlation calculation circuit 406. In the case where the calculation effective signal indicates that the calculated vertical position is within a region that has been set, the correlation calculation circuit 406 performs correlation calculation on the A image and the B image, and outputs the result to the multiplier 414 or the selector 413. In addition, the calculation control unit 416 outputs a select signal to the selector 413. The calculation control unit 416 outputs, to the selector 413, a select signal for selecting the input 1, which is output of the subtractor 412 in the case of a correction value calculation region and selecting the input 0, which is output of the correlation calculation circuit 406 in the case of a focus detection calculation region. The correlation calculation circuit 406 and the calculation control unit 416 function as a correlation calculation means in this manner.

Correlation data, which is output of the correlation calculation circuit 406, and the value of the ratio setting unit 415 that is set by the CPU 101 are input to the multiplier 414. The result of multiplying these two types of input is input to the subtractor 412. The subtractor 412 subtracts, from the value of 0, the correlation data output from the correlation calculation circuit 406. Accordingly, the correlation data will be converted into a negative value. When processing an image within a correction value calculation region, the calculation control unit 416 outputs a signal for selecting the input 1 to the selector 413. The adder 407 then adds the correlation data obtained by converting, into a negative value, the value obtained by multiplying the value set in the ratio setting unit 415 by the correlation data and the correlation calculation result for the preceding row output from the memory 408, for each shift amount (addition means). A correlation value (the correlation data) of one AF region for each shift amount, which is calculated in this manner, is output to the memory 408, and is held in the memory 408. Due to this operation, in the correction value obtaining mode, a correlation calculation result for a designated region will be stored as a correction value in a negative value.

When processing an image within a focus detection calculation region, the calculation control unit 416 outputs a signal for selecting the input 0 to the selector 413, and correlation data output from the correlation calculation circuit 406 is input to the adder 407 without any change. The adder 407 adds the correlation data output from the correlation calculation circuit 406 and the correlation calculation result for the preceding row output from the memory 408, for each shift amount (addition means). In this case, during addition for the first row, a correction value is output from the memory 408, and correlation data and the correction value are added. Regarding the succeeding rows, correlation data of the row will be added to the result of adding the correction value and the correlation calculation result of the preceding row. The memory control unit 418 has a function for copying output of the adder 407 in a plurality of locations in the case of processing an image within a correction value calculation region. A specific operation will be described later.

Figure 21:
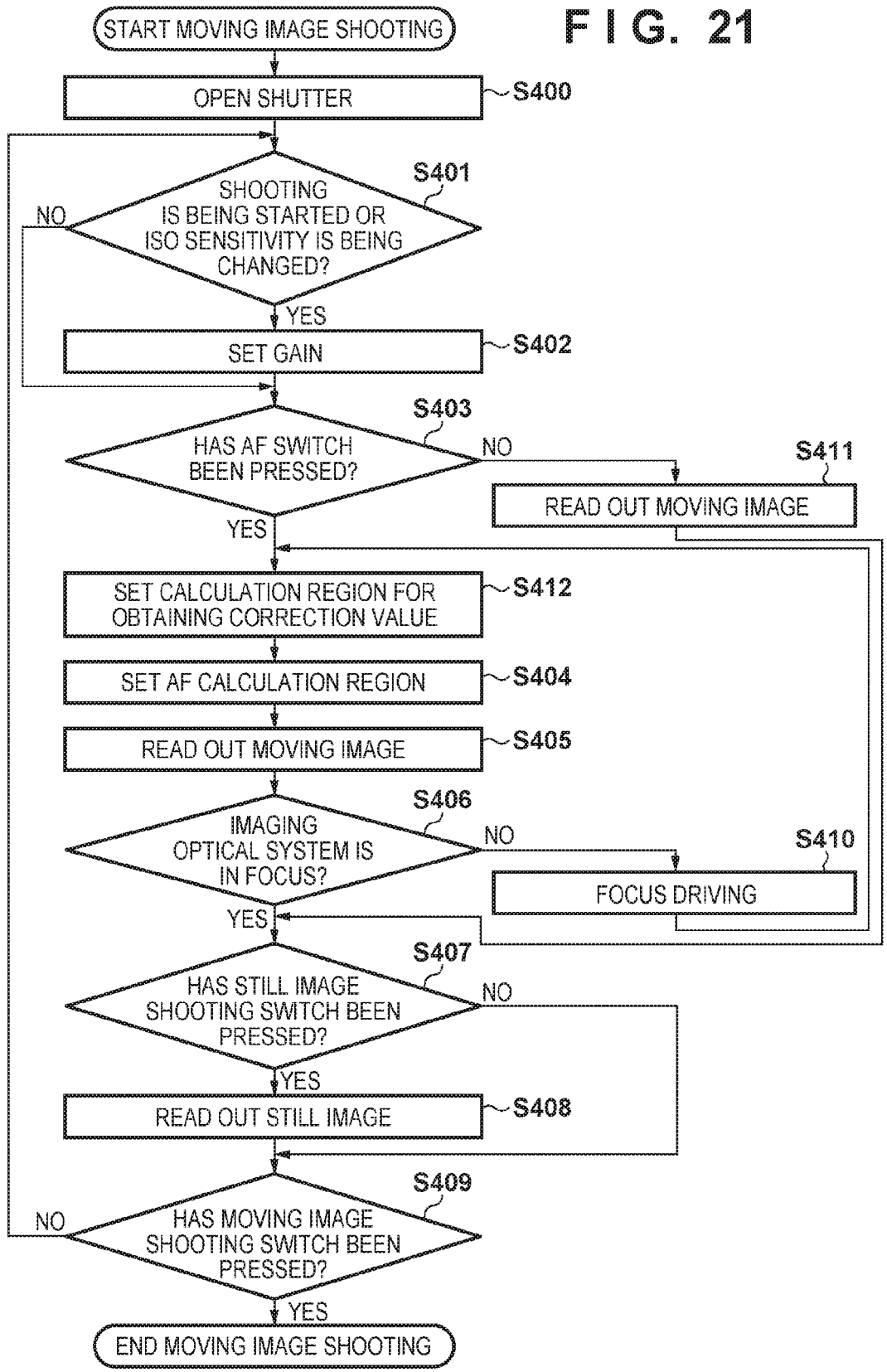
FIG. 21 is a flowchart showing the operations of an image capturing apparatus in the third embodiment.

Here, the operation of the image capturing apparatus in this embodiment will be described with reference to FIG. 21. When moving image shooting is started by operating an operation unit 102, first, in step S400, the CPU 101 achieves a state where a focal plane shutter 109 is open. Accordingly, an image sensor 100 enters a state where exposure is possible.

Next, in step S401, it is determined whether or not shooting is being started or the ISO sensitivity is being changed. Here, moving image shooting is being started, and thus the procedure advances to step S402. In the case where shooting is not being started and the ISO sensitivity is not being changed, the procedure advances to step S403. The operation of step S402 is the same as the operation of step S202 in FIG. 10, and thus the description thereof is omitted.

Next, in step S403, it is determined whether or not an AF switch included in the operation unit 102 has been pressed. Here, in the case where the AF switch has been pressed, the procedure advances to step S412. In the case where the AF switch has not been pressed, the procedure advances to step S411. The operation of step S411 is similar to the operation of step S211 in FIG. 10, and thus the description thereof is omitted.

Figure 22:
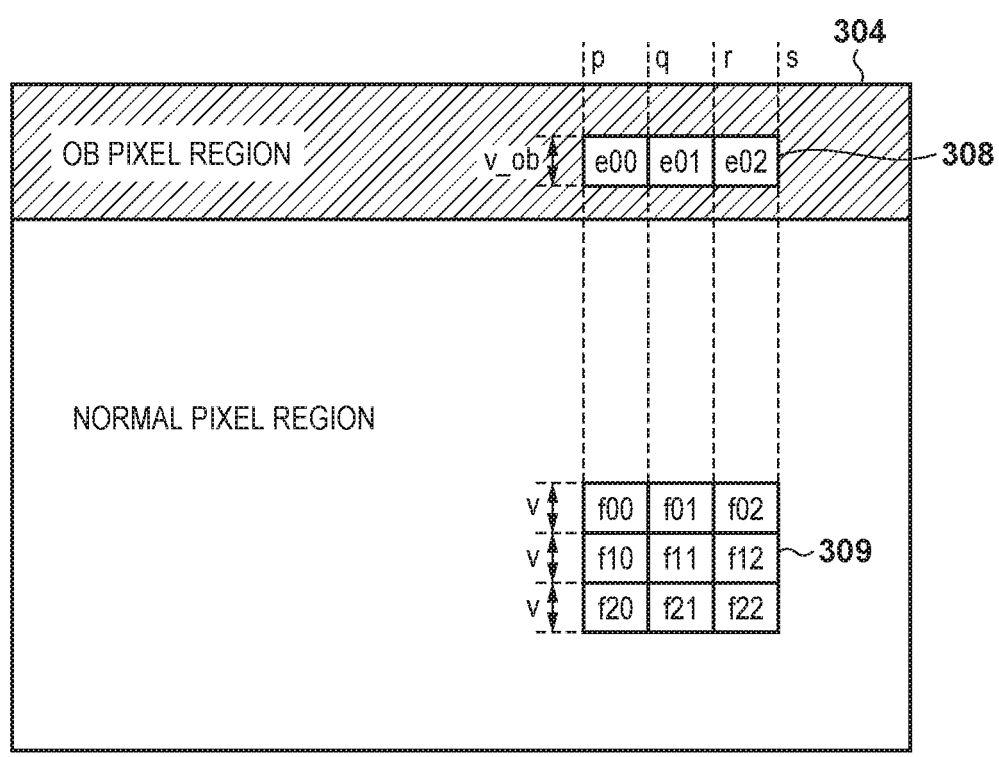
FIG. 22 is a diagram illustrating the operations of an image sensor and the AF calculation unit in the third embodiment.

In step S412, the CPU 101 sets a calculation region for correlation calculation for obtaining a correction value, in the AF calculation unit 107B. When the setting is made, the calculation region is set for the correction value calculation region setting unit 417. FIG. 22 shows a calculation region 308 as the calculation region at this time. The calculation region 308 is positioned in an OB pixel region, and is configured to be divided into regions e00 to e02, as shown in FIG. 22. The number of pixels in the horizontal direction and the positions in the horizontal direction in the regions e00 to e02 are set so as to be the same as those of calculation regions f00 to f22 in which focus detection is performed and which will be described later. Also, the number of pixels in the vertical direction of the regions e00 to e02 is assumed to be v_ob. In addition, the CPU 101 sets the ratio of the number of pixels in the vertical direction (v_ob) of a correction value calculation region to the number of pixels in the horizontal direction (v to be described later) of a focus detection calculation region, for the ratio setting unit 415. In this embodiment, $\alpha(\alpha = v/v\_ob)$ is set.

In step S404, the CPU 101 sets a calculation region for correlation calculation for AF, in the AF calculation unit 107B. When the setting is made, the calculation region is set for the calculation region setting unit 405. FIG. 22 shows a calculation region 309 as the calculation region at this time. The calculation region 309 is positioned in a region of normal pixels, rather than OB pixels, and is configured to be divided into the regions f00 to f22, as shown in FIG. 22. The number of pixels in the horizontal direction in each of the regions f00 to f22 is assumed to be the same as that in each of the above-described regions e00 to e02. Also, regarding the horizontal positions in the region as well, as indicated by coordinates p, q, r and s in FIG. 22, coordinates in each of the regions f00 to f22 are assumed to be the same as coordinates in e00 to e22. In addition, the number of pixels in the vertical direction in the regions f00 to f22 is assumed to be v. Note that the size relationship between v_ob and v in this embodiment is assumed to be v_ob<v.

After that, in step S405, image readout is started. When image readout is performed, an AB image that has been read out is transferred to an image processing unit 106. The AB image is subjected to predetermined image correction and compression in the image processing unit 106, and is then recorded as a moving image file in the storage unit 108. Also, an A image that is read out and the AB image are transferred to the AF calculation unit 107. When the image A and the AB image are transferred, correlation calculation is performed by the above-described operation.

In the case where an image to be processed is within a correction value calculation region, the calculation control unit 416 controls the selector 413 so as to select the input 1, which is output of the subtractor 412. Accordingly, data (a correction value) obtained by converting, into a negative value, a value obtained by multiplying correlation data by α is stored in the memory 408 as a result regarding each of the shift amounts −S to S for each region. For example, a correction value of e00 for shift amount=0 is stored as:

$$-e00(S)*\alpha$$

The memory control unit 418 of this embodiment has a function for copying an addition result when storing the addition result in the memory 408. As shown in FIG. 23A, correction values of e00 to e02 are copied so as to respectively correspond to the regions f10 to f12 and f20 to 22 to be described later.

After that, in the case where an image to be processed is within a focus detection calculation region, the calculation control unit 416 controls the selector 413 so as to select the input 0, which is output of the correlation calculation circuit 406. Results of correlation calculation are added to the correction values stored in the memory 408 as shown in FIG. 23B. For example, letting a correction value of the region e00 for the shift amount S be e00(S), and data of the region f00 for the shift amount S be f00(S), the following calculations are performed.

$$-e00(-S)*\alpha + f00(-S)$$
$$-e00(-S+1)*\alpha + f00(-S+1)$$
$$\ldots$$
$$-e00(S-1)*\alpha + f00(S-1)$$
$$-e00(S)*\alpha + f00(S)$$

$$-e00(-S)*\alpha + f01(-S)$$
$$-e00(-S+1)*\alpha + f01(-S+1)$$
$$\ldots$$
$$-e00(S-1)*\alpha + f01(S-1)$$
$$-e00(S)*\alpha + f01(S)$$

$$-e00(-S)*\alpha + f22(-S)$$
$$-e00(-S+1)*\alpha + f22(-S+1)$$
$$\ldots$$
$$-e00(S-1)*\alpha + f22(S-1)$$
$$-e00(S)*\alpha + f22(S)$$

As described above, the regions e00 to e02 correspond to f00 to f02, e00 to e02 correspond to f10 to f12, and e00 to e02 correspond to f20 to f22, and as shown in FIG. 23B, data from which data for a corresponding shift amount in each region was subtracted will be stored in the memory 408.

Figure 24A:
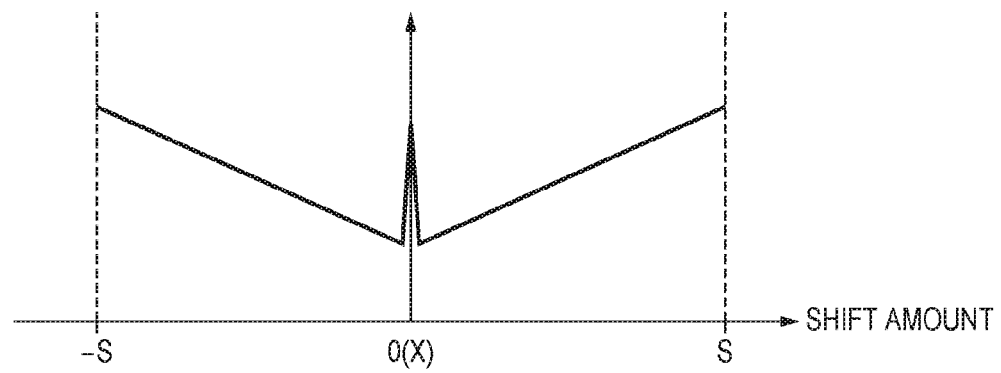
FIGS. 24A to 24C are diagrams illustrating the operation of the AF calculation unit in the third embodiment.

The concept of the above-described correction value subtraction is shown in FIGS. 24A to 25B. FIGS. 24A to 25B show correlation data in the case where the imaging optical system is in focus (X=0). FIG. 24A shows correlation data of one region (e.g., f00) for the shift amounts −S to S out of correlation calculation results at a time of focus detection. Also, FIG. 24B shows correlation data (correction value) of one region (e.g., e00) for the shift amounts −S to S at a time of correction value acquisition.

Figure 24B:
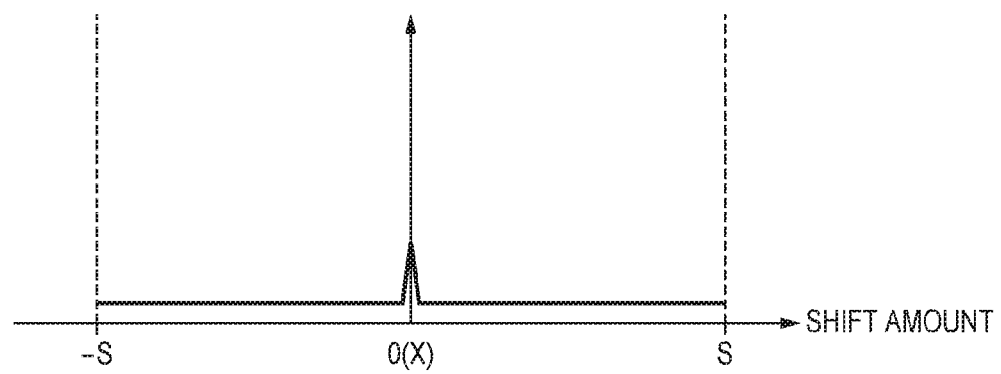
Figure 24C:
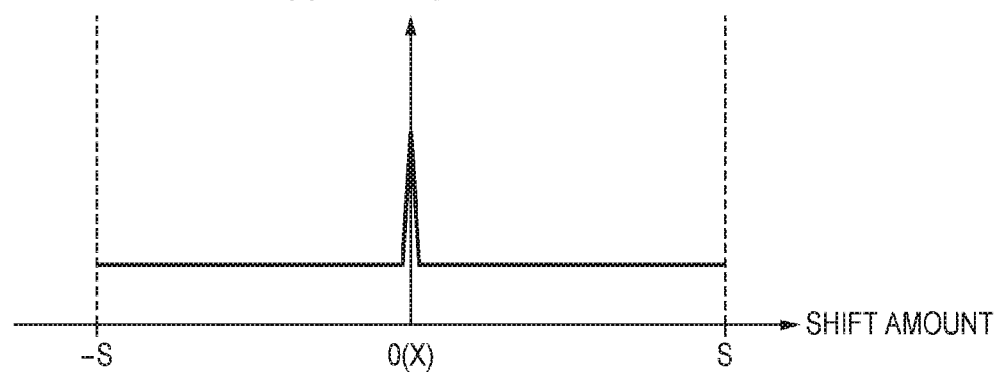
Figure 25A:
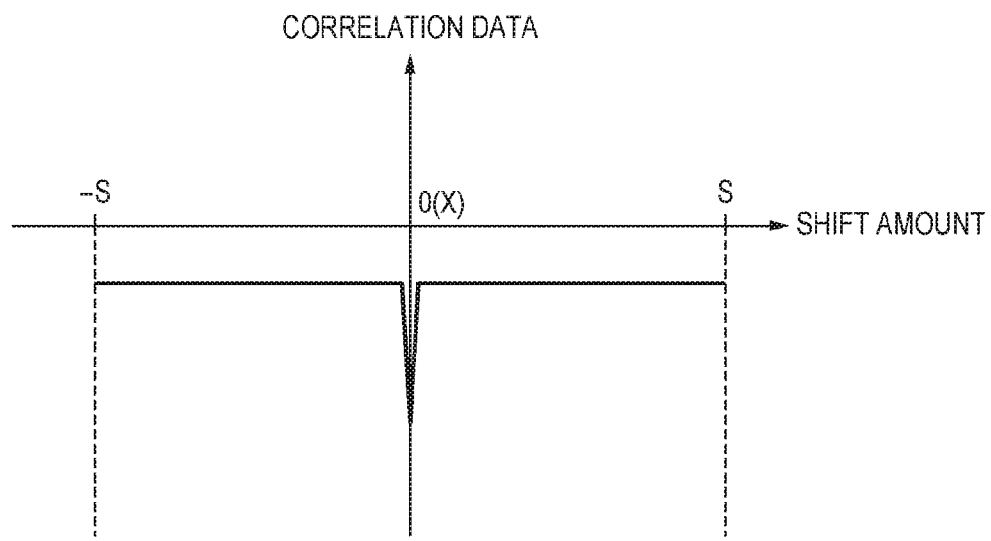
FIGS. 25A and 25B are diagrams illustrating the operation of the AF calculation unit in the third embodiment.

In this embodiment, v_ob is smaller than v, and thus if output of the correlation calculation circuit 406 is added for each row without any change at the time of correction value acquisition, as shown in FIG. 24B, correlation data (noise amount of N[A]*2) serving as the correction value will be smaller than the correlation amount in the light-shielded state that is superimposed on correlation data at the time of focus detection. Therefore, by multiplying the correlation data of each row by α, which is the ratio of the number of rows in the correction value calculation region to the number of rows in the focus detection calculation region, as shown in FIG. 24C, the absolute value of the correction value is associated with the correlation amount in the light-shielded state that is superimposed on correlation data at the time of focus detection. The correction value is then converted into a negative value, and thereby a correction value shown in FIG. 25A is generated.

Figure 25B:
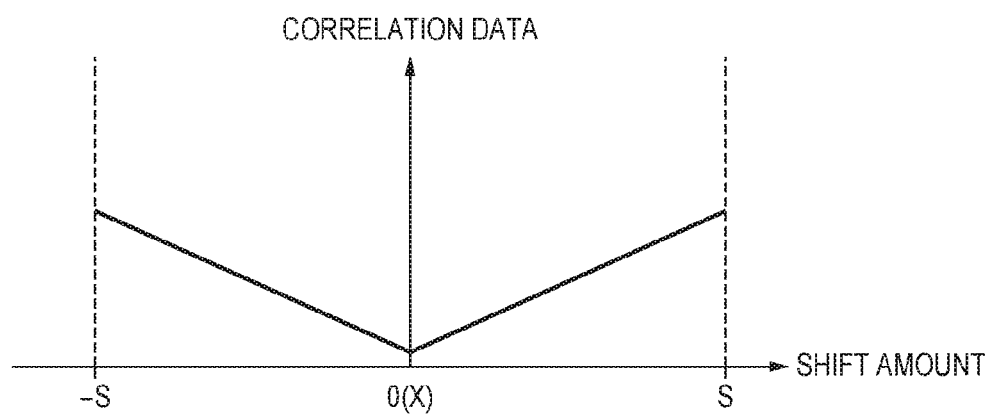
Figure 26:
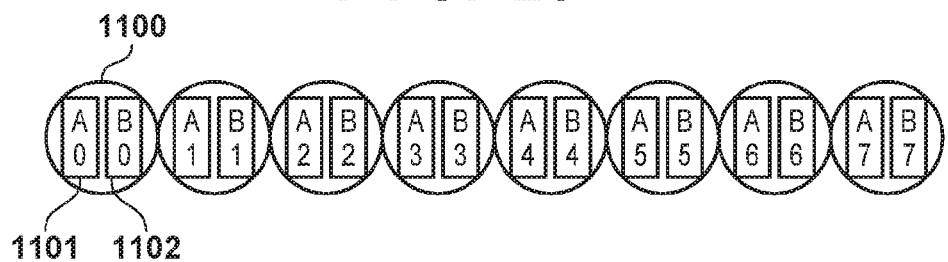
FIG. 26 is a diagram illustrating the configuration and operation of a conventional technique.

The correlation amount in the light-shielded state that increases when the shift amount is 0 as shown in FIG. 24A is superimposed on correlation data at the time of focus detection, and as a result, a plurality of minimum points are generated in the waveform of the correlation data. Correlation data of e00 is data obtained by converting correlation data obtained in an OB region into a negative value, and thus as described above, if correlation data at the time of focus detection is added to the correction value, the correlation amount in the light-shielded state when the shift amount is 0 is cancelled as shown in FIG. 25B.

The addition result is input to the defocus amount calculation unit 410. The defocus amount calculation unit 410 calculates a defocus amount (a Y value) based on correlation data of each AF region, and outputs the defocus amount to the RAM 104. At this time, the defocus amount is calculated using the correlation data that depends on the correlation amount generated in the light-shielded state, and in which a plurality of minimum points have been corrected, and thus the Y value can be appropriately calculated. After that, the procedure advances to step S406.

The operations of steps S406 to S410 are similar to the operations of steps S206 to S210 shown in FIG. 10, and thus the description thereof is omitted.

Note that after it is determined in step S409 that the moving image shooting switch has not been pressed, and the procedure has returned to step S401, in the case where it is then determined in step S401 that the ISO sensitivity has been changed, the procedure advances to step S402, where the CPU 101 sets a gain for the changed ISO sensitivity, for the image sensor 100. Here, in the case where the ISO sensitivity is ISO 200, the setting is made such that a control signal GAIN1 rises to H, and in the case where the ISO sensitivity is ISO 400, the setting is made such that a control signal GAIN2 rises to H.

The above-described operations make it possible to calculate correlation values for an object image and perform appropriate focus position detection, even in the case where a correlation value that is not related to a correlation value obtained from the object image and that is related to a noise component of random noise or the like is superimposed on the correlation calculation result. As a result, even low luminance and low contrast objects can be focused on.

In that case, the correlation value (correction value) related to a noise component of random noise or the like is obtained from the OB region of the same frame as a frame (image) to be subjected to focus detection. Accordingly, even in the case where a gain to be applied to the image is changed due to the ISO sensitivity being changed or the like, and the noise amount changes, a frame for obtaining correction values is not required, and focus detection can be performed immediately.

Also, correction values are always obtained from the OB region of the same frame when performing focus detection, and thus even in the case where a shooting condition such as the ISO sensitivity does not change, a correction value that is adapted to a temperature change can always be applied.

In this embodiment, a configuration is adopted in which correction values are obtained from an OB region positioned in an upper pixel region, but the present invention is not limited thereto. Regarding any signal output of an image sensor that is related to a noise amount (noise readout) at the time of reading out an image, for example, output of a pixel that does not have a photodiode (a signal other than a signal of a photoelectric conversion portion), the type of a pixel to be read out and a correction value obtaining timing are not limited to the configuration of this embodiment.

Fourth Embodiment

Next, an image capturing apparatus according to a fourth embodiment of the present invention will be described. The configuration of the image capturing apparatus of this embodiment is the same as that in the first embodiment shown in FIG. 1, and thus the description thereof is omitted.

Figure 29:
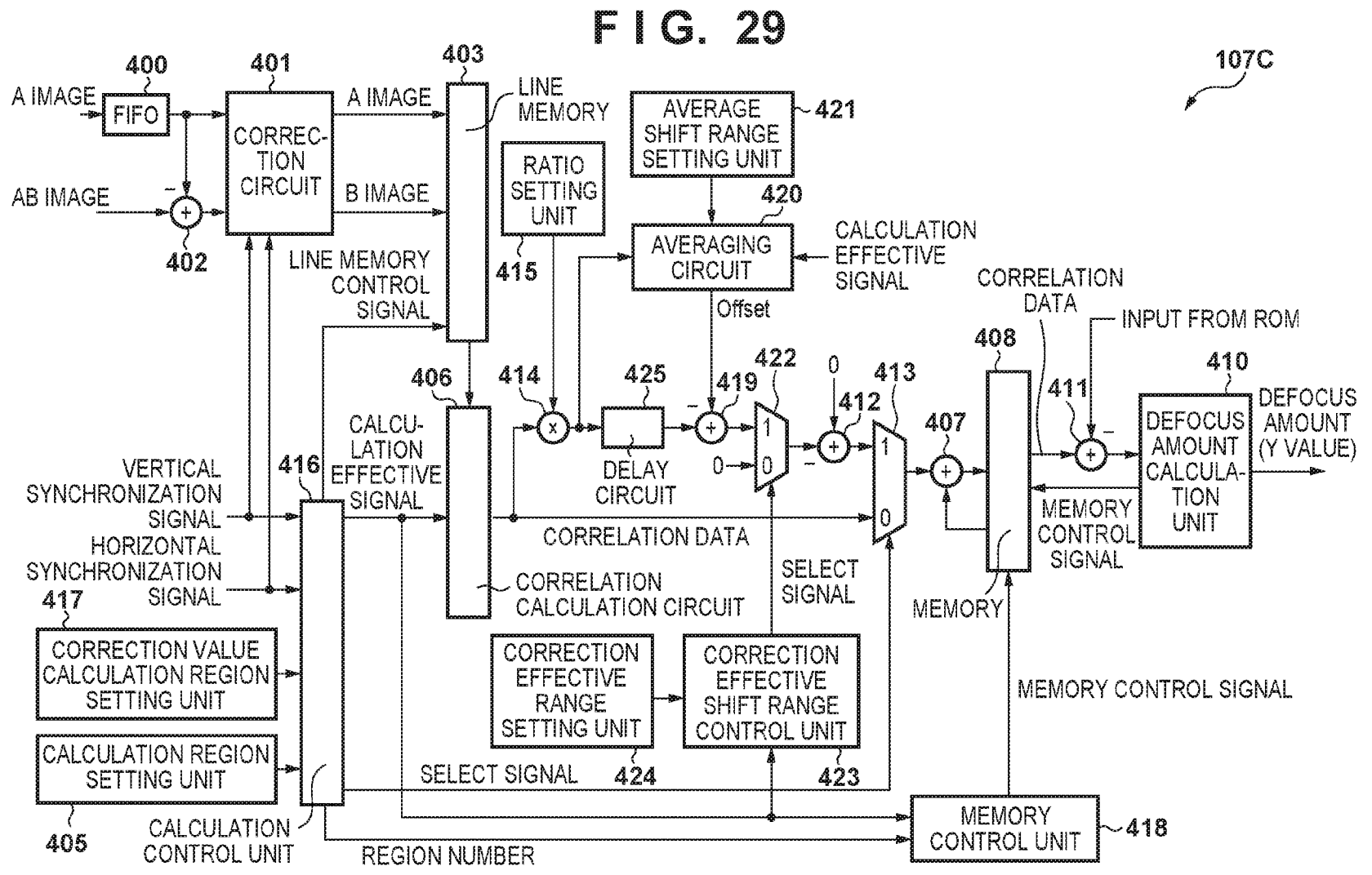

In the image capturing apparatus of this embodiment, the internal circuit configuration of the AF calculation unit is different. FIG. 29 is a diagram showing the configuration of an AF calculation unit 107C in this embodiment. The AF calculation unit 107C of this embodiment has a FIFO memory 400, a correction circuit 401, a subtractor 402, a line memory 403, a calculation region setting unit 405, a correlation calculation circuit 406, an adder 407, a memory 408, a defocus amount calculation unit 410, a subtractor 411 and a subtractor 412. The AF calculation unit 107C of this embodiment also has a selector 413, a multiplier 414, a ratio setting unit 415, a calculation control unit 416, a correction value calculation region setting unit 417, a memory control unit 418, a subtractor 419, an averaging circuit 420, an average shift range setting unit 421 and a selector 422. Furthermore, the AF calculation unit 107C of this embodiment has a correction effective shift range control unit 423, a correction effective range setting unit 424 and a delay circuit 425.

An A image input in the AF calculation unit 107C is input to the FIFO memory 400, and an AB image input in the AF calculation unit 107C is input to the subtractor 402. The FIFO memory 400 has a function for matching the data input timing between the A image and the AB image. The A image output from the FIFO memory 400 is input to the correction circuit 401 and the subtractor 402. The subtractor 402 subtracts the input A image from the input AB image so as to calculate a B image, and outputs the B image to the correction circuit 401. At this time, the input timing is matched between the A image and the AB image, and thus this subtraction is performed on data at the same pixel positions.

The correction circuit 401 recognizes the positions of the pixels of the A image and the B image with respect to the screen, based on a vertical synchronization signal and a horizontal synchronization signal that are input, and performs offset correction or gain correction. However, the correction content is not limited thereto. The A image and the B image after being corrected are output to the line memory 403.

The calculation control unit 416 outputs a line memory control signal to the line memory 403 based on the horizontal synchronization signal that is input. The A image and the B image for one row that are input to the line memory 403 are written in the line memory 403, in accordance with the line memory control signal. After that, the calculation control unit 416 references the vertical synchronization signal that is input, and calculates vertical positions of the A image and the B image for one frame of the image data.

In this embodiment, the AF calculation unit 107C has the correction value calculation region setting unit 417 for setting a correlation calculation region for obtaining a correction value in an image of one frame, and the calculation region setting unit 405 for setting a correlation calculation region for performing focus detection. The correction value calculation region setting unit 417 and the calculation region setting unit 405 are set by the CPU 101. In the case where a calculated vertical position is within a correction value calculation region or a focus detection calculation region that has been set, the calculation control unit 416 outputs a calculation effective signal to the correlation calculation circuit 406. The calculation control unit 416 causes the A image and the B image at positions corresponding to the setting to be output from the line memory 403 to the correlation calculation circuit 406, based on an AF region that has been set. In the case where the calculation effective signal indicates that the calculated vertical position is within the region that has been set, the correlation calculation circuit 406 performs correlation calculation on the A image and the B image, and outputs the calculation result to the multiplier 414 or the selector 413. The calculation control unit 416 then outputs a select signal to the selector 413. The calculation control unit 416 outputs, to the selector 413, the select signal for selecting the input 1, which is output of the subtractor 412, in the case of the correction value calculation region and selecting the input 0, which is output of the correlation calculation circuit 406, in the case of the focus detection calculation region. In this manner, the correlation calculation circuit 406 and the calculation control unit 416 functions as correlation calculation means. Here, correlation calculation processing performed by the correlation calculation circuit 406 is similar to the processing described in the first embodiment with reference to FIG. 8.

Correlation data, which is output of the correlation calculation circuit 406, and the value of the ratio setting unit 415 set by the CPU 101 are input to the multiplier 414. The result of multiplying these two types of input is input to the subtractor 419. The averaging circuit 420 averages correlation values of A image data in a shift range to be described later, based on a setting value set in the average shift range setting unit 421 by the CPU 101 and the calculation effective signal output from the calculation control unit 416. The subtractor 419 subtracts, from output of the multiplier 414 delayed by the delay circuit 425, the average value (Offset) of the correlation values output from the averaging circuit 420. Output of the subtractor 419 is input to the input 1 of the selector 422.

The correction effective shift range control unit 423 outputs, to the selector 422, a select signal for selecting the input 1, based on a setting value set in the correction effective range setting unit 424 by the CPU 101 and a calculation effective signal output from the calculation control unit 416, when the shift range of the A image data to be described later is a specific range. The value of 0 is input to the input 0 of the selector 422, and the value of 0 is output from the selector 422 when a shift range of the A image data is not a specific shift range (does not include a portion of a specific shift range).

The subtractor 412 subtracts, from the value of 0, correlation data output from the selector 422. Accordingly, the correlation data will be converted into a negative value. When processing an image within a correction value calculation region, the calculation control unit 416 outputs a signal for selecting the input 1 to the selector 413. The adder 407 then adds correlation data obtained by converting, into a negative value, a value obtained by multiplying the value set for the ratio setting unit 415 by the correlation data to the correlation calculation result for the preceding row output from the memory 408, for each shift amount (addition means). A correlation value (correlation data) of one AF region for each shift amount calculated in this manner is output to the memory 408, and is held in the memory 408. Due to this operation, in the correction value obtaining mode, a correlation calculation result for a designated region will be stored as a correction value in a negative value.

When processing an image within a focus detection calculation region, the calculation control unit 416 outputs a signal for selecting the input 0 to the selector 413, and correlation data output from the correlation calculation circuit 406 is input to the adder 407 without any change. The adder 407 adds correlation data output from the correlation calculation circuit 406 and the correlation calculation result for the preceding row output from the memory 408, for each shift amount (addition means). In this case, during addition for the first row, a correction value is output from the memory 408, and correlation data and the correction value are added (correction control). Regarding the succeeding rows, correlation data of a row will be added to a result of adding a correction value and the correlation calculation result of a preceding row. The memory control unit 418 has a function for copying output of the adder 407 in a plurality of locations in the case of processing an image within a correction value calculation region. A specific operation will be described later.

When the correlation calculation on one or more AF regions that have been set ends, the defocus amount calculation unit 410 outputs a memory control signal to the memory 408. The memory 408 outputs correlation data of each AF region in accordance with the memory control signal. At the same time, the CPU 101 transfers, to the AF calculation unit 107C, a correction value that is stored in the ROM 105 and will be described later. The subtractor 411 subtracts, from the data that is output from the memory 408, a correction value that is input, and the subtraction result is input to the defocus amount calculation unit 410. The defocus amount calculation unit 410 calculates a defocus amount (a Y value) based on the correlation data of each AF region, and outputs the defocus amount.

Figure 30A:
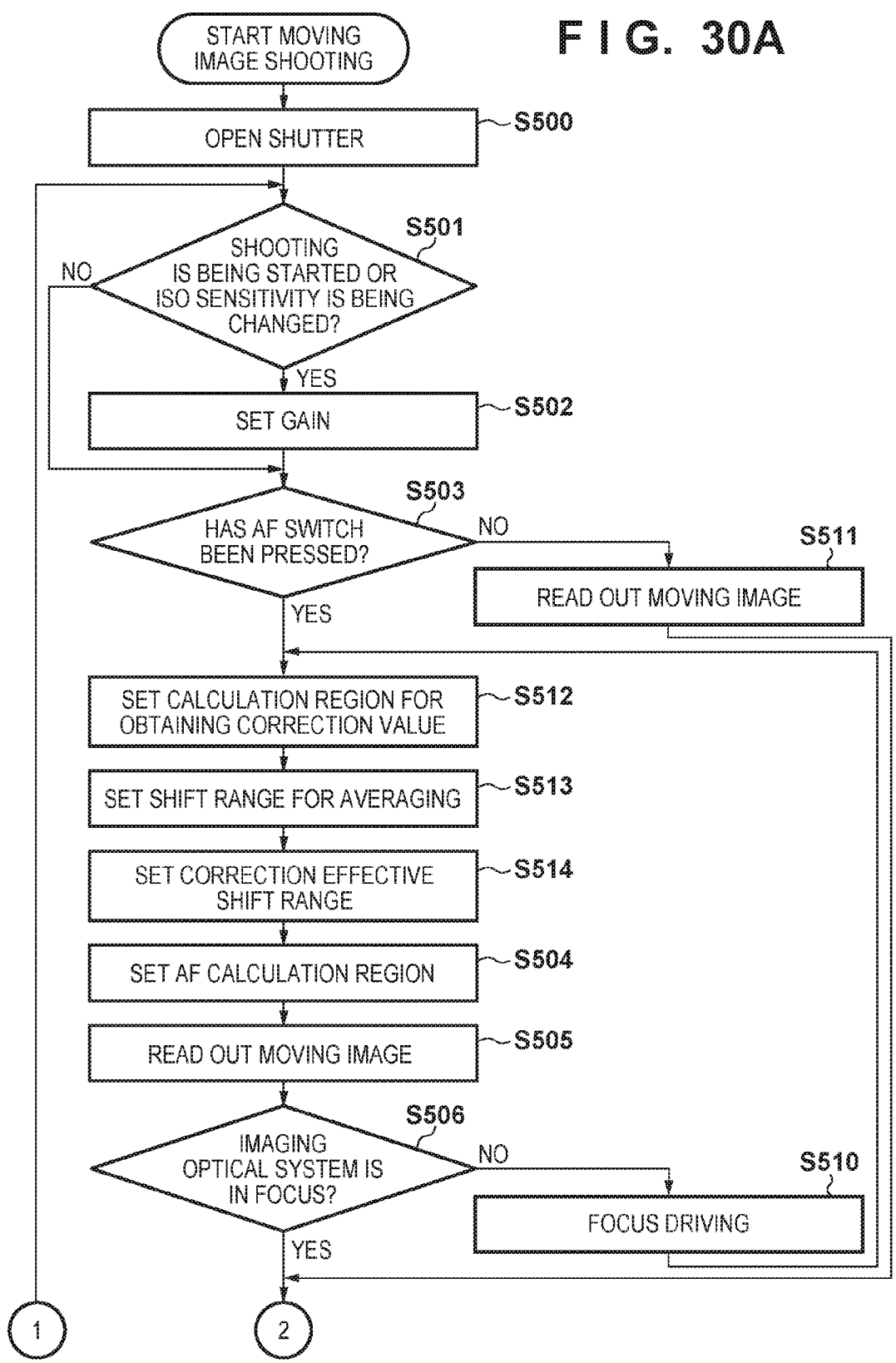
FIGS. 30A and 30B are flowcharts showing the operations of an image capturing apparatus in the fourth embodiment.
Figure 30B:
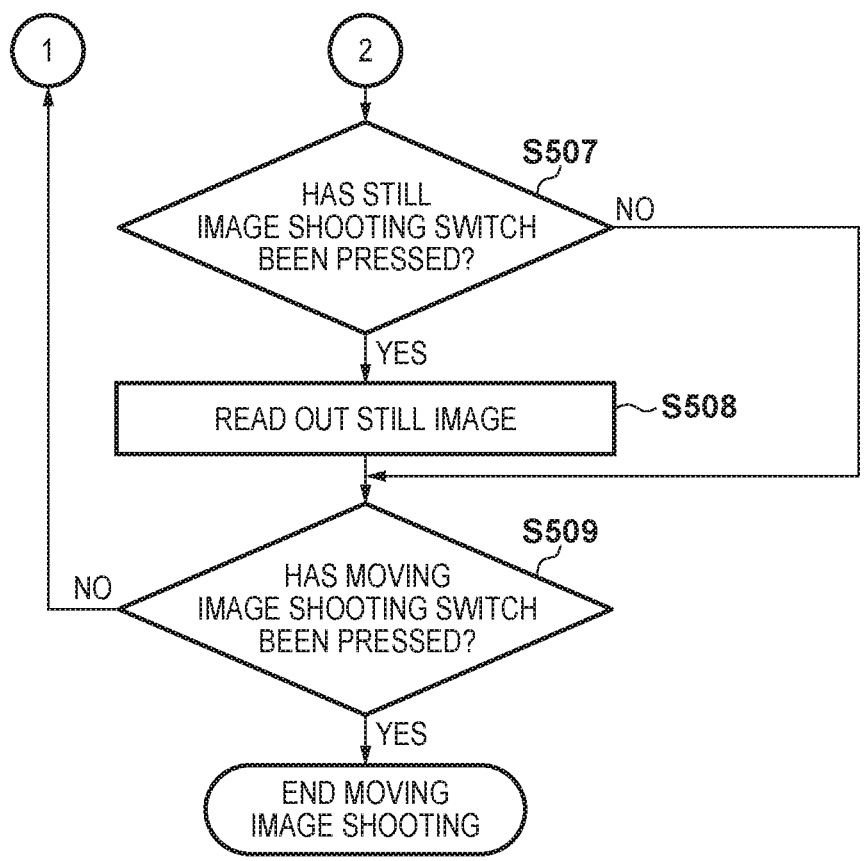

Next, the operations of an image capturing apparatus 1000 in this embodiment will be described with reference to the flowchart in FIGS. 30A and 30B. When moving image shooting is started by operating an operation unit 102, first, in step S500, the CPU 101 achieves a state where a focal plane shutter 109 is open. Accordingly, an image sensor 100 enters a state where exposure is possible.

Next, in step S501, it is determined whether or not shooting is being started or the ISO sensitivity is being changed. Here, moving image shooting is being started, and thus the procedure advances to step S502. In the case where shooting is not being started and the ISO sensitivity is not being changed, the procedure advances to step S503.

In step S502, the CPU 101 sets a gain for the ISO sensitivity, for the image sensor 100. Here, it is assumed that the ISO sensitivity 100 is selected, and a control signal GAIN0 rises to H by ISO 100 being set in the image sensor 100. Accordingly, when pixel signals are read out, the pixel signals will be amplified by an inverted gain in the case where a feedback capacitor 214 is used.

Next, in step S503, it is determined whether or not an AF switch included in the operation unit 102 has been pressed. Here, in the case where it is determined here that the AF switch has been pressed, the procedure advances to step S512. In the case where the AF switch has not been pressed, the procedure advances to step S511.

In step S511, image readout is started. When image readout is performed, an AB image that has been read out is transferred to the image processing unit 106. The AB image is subjected to predetermined image correction and compression in the image processing unit 106, and is then recorded as a moving image file in the storage unit 108. After that, the procedure advances to step S507.

Figure 31:
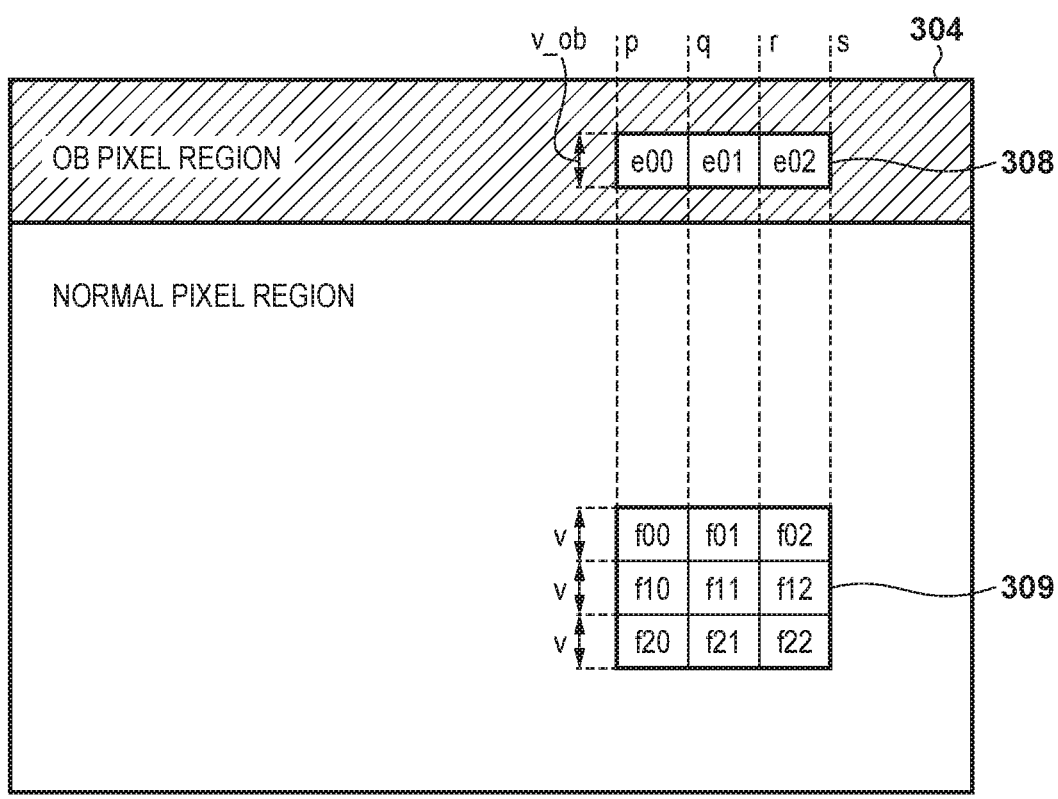
FIG. 31 is a diagram illustrating the operations of an image sensor and the AF calculation unit in the fourth embodiment.

In step S512, the CPU 101 sets a calculation region for correlation calculation for obtaining a correction value, in the AF calculation unit 107C. When the setting is made, the calculation region is set for the correction value calculation region setting unit 417. FIG. 31 shows a calculation region 308 as the calculation region at this time. The calculation region 308 is positioned in an OB pixel region, and is configured to be divided into regions e00 to e02 as shown in FIG. 31. The number of pixels in the horizontal direction and the positions in the horizontal direction in these regions e00 to e02 are set to be the same as those in calculation regions f00 to f22 in which focus detection is performed and that will be described later. Moreover, the number of pixels in the vertical direction in the regions e00 to e02 is assumed to be v_ob. Also, the CPU 101 sets the ratio of the number of pixels in the vertical direction (v_ob) in a correction value calculation region to the number of pixels in the horizontal direction (v, which will be described later) in a focus detection calculation region, for the ratio setting unit 415. In this embodiment, a ($\alpha$=v/v_ob) is set.

Next, in step S513, the CPU 101 sets a shift range for correlation data pieces to be averaged by the averaging circuit 420, for the average shift range setting unit 421. Here, the setting is made such that the correlation data pieces in a range of shift amounts −h to −i are averaged. At this time, the shift range for the averaging is set to be out of a shift range set for a correction effective range setting unit to be described later. After that, the procedure advances to step S514. In step S514, the CPU 101 sets a shift range in which correction is effective, for the correction effective range setting unit 424. Here, it is assumed that shift amount=0 is set to be a correction effective range. After that, the procedure advances to step S504.

In step S504, the CPU 101 sets a calculation region of correlation calculation for AF, for the AF calculation unit 107C. When the setting is made, the calculation region is set for the calculation region setting unit 405. FIG. 31 shows a calculation region 309 as the calculation region at this time. The calculation region 309 is positioned in a region of normal pixels, rather than OB pixels, and is configured to be divided into the regions f00 to f22 as shown in FIG. 31. The number of pixels in the horizontal direction in each of the regions f00 to f22 is assumed to be the same as that in each of the above-described regions e00 to e02. Also, regarding the horizontal positions in the region as well, as indicated by coordinates p, q, r and s in FIG. 31, coordinates in each of the regions f00 to f22 are assumed to be the same as coordinates in e00 to e22. In addition, the number of pixels in the vertical direction in each of the regions f00 to f22 is assumed to be v. Note that the size relationship between v_ob and v in this embodiment is assumed to be v_ob<v.

After that, in step S505, image readout is started. When image readout is performed, an AB image that has been read out is transferred to the image processing unit 106. The AB image is subjected to predetermined image correction and compression in the image processing unit 106, and is then recorded as a moving image file in the storage unit 108. Also, an A image that is read out and the AB image are transferred to the AF calculation unit 107C. When the image A and the AB image are transferred, correlation calculation is performed by the above-described operations.

In the case where an image to be processed is within a correction value calculation region (within the calculation region 308), correlation data of each row for the shift amounts −S to S, which is sequentially output from the correlation calculation circuit 406, is multiplied by a set by the ratio setting unit 415, and is input to the averaging circuit 420. FIG. 32A shows correlation data for one row in one region such as e00 that is input to the averaging circuit 420, for example. In this embodiment, the value of the correlation data fluctuates with a swing width according to each shift amount, affected by random noise superimposed on the image. For the following reason, a peak is generated in the correlation data when the shift amount is 0.

A image signals corresponding to the electric charges of the PDs in the k-th column in the horizontal direction are assumed t be S[A(k)], and AB image signals corresponding to the electric charges of the PDs in the k-th column in the horizontal direction are assumed to be S[(A+B)(k)]. Also, random noise that is caused by a readout circuit and that is superimposed on the pixel data when reading out the A image is assumed to be N[A(k)], and random noise that is caused by the readout circuit and that is superimposed on the pixel data when reading out the AB image is assumed to be N[(A+B)(k)]. When a B image is generated in accordance with the above processing, the following expression holds.

$$B\ \text{image} = AB\ \text{image} - A\ \text{image}$$
$$= (S[(A+B)(k)] + N[(A+B)(k)]) - (S[A(k)] + N[A(k)])$$
$$= S[(A+B)(k)] - S[A(k)] + N[(A+B)(k)] - N[A(k)]$$

In correlation calculation for one column when the shift amount is S (S is not 0), correlation calculation for the A image of the m-th column and the B image of the n-th column is performed, and a correlation value P(h) at this time is as follows.

$$P(h) = |A\ \text{image} - B\ \text{image}|$$
$$= \frac{|(S[A(m)] + N[A(m)]) - (S[(A+B)(n)] -}{S[A(n)] + N[(A+B)(n)] - N[A(n)])|}$$
$$= \frac{|S[A(m)] + S[A(n)] - S[(A+B)(n)] +}{N[A(m)] + N[A(n)] - N[(A+B)(n)]|}$$

Here, the higher the correlation between the A image and the B image is, the smaller the value of this correlation value P(h) becomes.

Also, in correlation calculation for one column when the shift amount is 0, correlation calculation for the A image of the m-th column and the B image of the m-th column is performed, and the correlation value P(h) at this time is as follows.

$$P(h)=|A\ \text{image}-B\ \text{image}|=|(S[A(m)]+N[A(m)])-(S[(A+B)(m)]-S[A(m)]+N[(A+B)(m)]-N[A(m)])|=|S[A(m)]+S[A(m)]-S[(A+B)(m)]+N[A(m)]+N[A(m)]-N[(A+B)(m)]|$$

Here, a random noise amount superimposed on the correlation value when the shift amount is S (S is not 0) and a random noise amount superimposed on the correlation value when the shift amount is 0 are as follows.

When shift amount=S:Noise(S)=N[A(m)]+N[A(n)]−N[(A+B)(n)]

When shift amount=0:Noise(0)=N[A(m)]+N[A(m)]−N[(A+B)(m)]

N[A(m)], N[A(n)] and N[(A+B) (n)] are random noise not correlated with each other, and thus Noise(S) will be a nearly constant value when the shift amount is not 0, as in FIG. 32A. On the other hand, regarding Noise(0), although N[A(m)] and N[(A+B)(m)] are random noise not correlated with each other, N[A(m)] is doubled (N[A(m)]*2) and is larger than Noise(S). Therefore, as shown in FIG. 32A, only when the shift amount is 0, (the value of) the correlation data increases (a peak is generated).

The averaging circuit 420 averages correlation data pieces for shift amounts −h to −i so as to calculate an average value (Offset). Correlation data output from the multiplier 414 is delayed by the delay circuit 425, and is input to the subtractor 419 at the timing when Offset is calculated. The subtractor 419 subtracts Offset from the correlation data, and the result is output to the selector 422. FIG. 32B shows the correlation data input to the input 1 of the selector 422.

The correction effective shift range control unit 423 outputs a select signal for selecting the input 1 to the selector 422, based on a shift range set by the correction effective range setting unit 424. Here, the input 1 is selected only when the shift amount is 0, and otherwise, the input 0, namely, the value of 0 is selected. Therefore, output of the selector 422 is an effective value only when the shift amount is 0 as shown in FIG. 32C, and otherwise the output of the selector 422 is the value of 0.

At this time, the image to be processed is within a correction value calculation region, and thus the calculation control unit 416 controls the selector 413 so as to select the input 1, which is output of the subtractor 412. Accordingly, data (correction value) obtained by converting, into a negative value, the correlation data shown in FIG. 32C that underwent the above-described processing is stored in the memory 408 as the results for the shift amounts −S to S of each region. If such processing is repeated for each row in a similar manner, and the correction values are added, a correction value of e00 when the shift amount is 0 is stored as:

−$e00(0)*\alpha$, for example.

Also, a correction value when the shift amount is not 0 is the value of 0, as shown in FIG. 32D.

The memory control unit 418 of this embodiment has a function for copying an addition result when storing the addition result in the memory 408. As shown in FIG. 33A, correction values of e00 to e02 are copied so as to respectively correspond to regions f10 to f12 and f20 to f22 to be described later.

After that, in the case where the image to be processed is within a focus detection calculation region, the calculation control unit 416 controls the selector 413 so as to select the input 0, which is output of the correlation calculation circuit 406. The results of correlation calculation are added to the correction values stored in the memory 408, as shown in FIG. 33B. For example, letting a correction value of the region e00 for a shift amount S be e00(S), and data of the region f00 for the shift amount S be f00(S), the following calculations are performed.

$$
\begin{array}{l}
0 + f00(-S) \\
\ldots \\
0 + f00(-1) \\
-e00(0) * \alpha + f00(0) \\
0 + f00(1) \\
\ldots \\
0 + f00(S) \\
0 + f01(-S) \\
\ldots \\
0 + f01(-1) \\
-e01(0) * \alpha + f01(0) \\
0 + f01(1) \\
\ldots \\
0 + f01(S) \\
\ldots \\
0 + f22(-S) \\
\ldots \\
0 + f22(-1) \\
-e02(0) * \alpha + f22(0) \\
0 + f22(1) \\
\ldots \\
0 + f22(S)
\end{array}
$$

As described above, the regions e00 to e02 correspond to f00 to f02, e00 to e02 correspond to f10 to f12, and e00 to e02 correspond to f20 to f22, and as shown in FIG. 33B, data from which data for a corresponding shift amount in each region was subtracted will be stored in the memory 408.

Figure 34A:
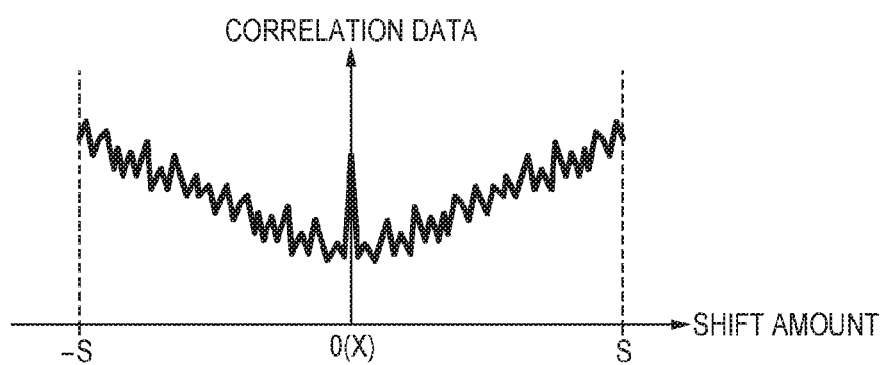
FIGS. 34A to 34C are diagrams illustrating the operation of an AF calculation unit in the fourth embodiment.
Figure 34B:
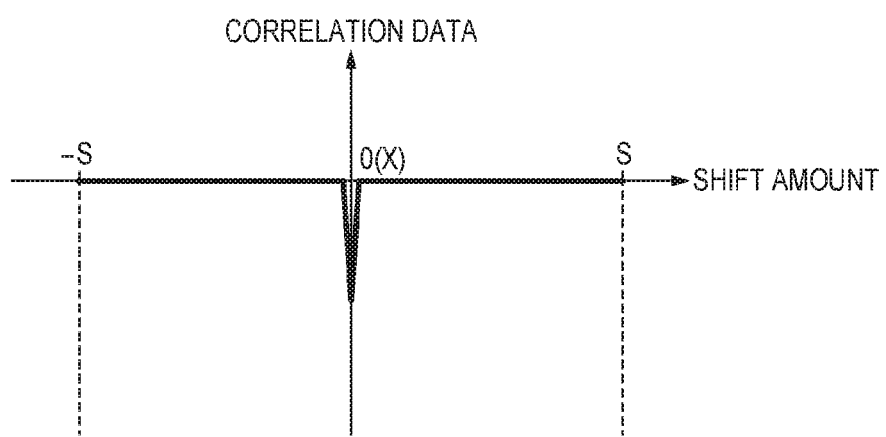
Figure 34C:
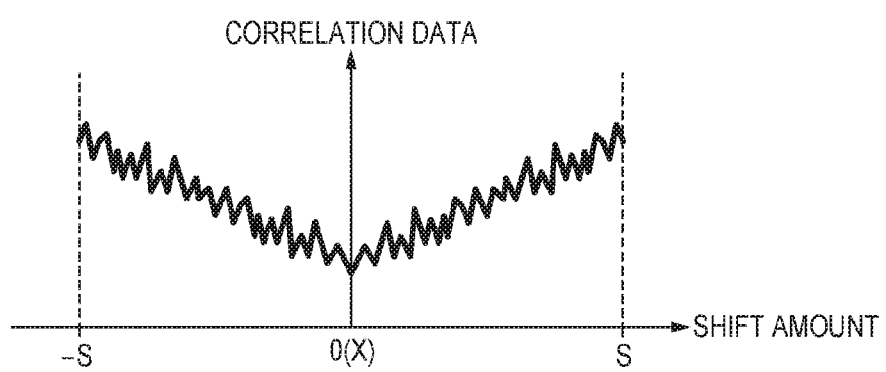

The concept of the above-described correction value subtraction is shown in FIGS. 34A to 34C. FIGS. 34A to 34C show correlation data in the case where the imaging optical system is in focus (X=0). FIG. 34A shows correlation data of one region (e.g., f00) for the shift amounts −S to S out of correlation calculation results at the time of focus detection. Noise caused by the above-described subtraction of an A image from an AB image and generation of a B image is superimposed on the correlation data when the shift amount is 0, increasing (the value of) the correlation data. Also, FIG. 34B shows correlation data (correction values) of one region (e.g., e00) for the shift amounts −S to S at the time of correction value acquisition.

In this embodiment, v_ob is greater than v, and thus the absolute value of a correction value is associated with a correlation amount in the light-shielded state that is superimposed on correlation data at the time of focus detection by multiplying correlation data of each row by $\alpha$, which is the ratio of the number of rows in the correction value calculation region to the number of rows in the focus detection calculation region. In addition, subtracting an offset value of correlation data caused by the influence of random noise realizes a correction value obtained by extracting only a noise amount to which correction is to be applied. Furthermore, influence of the correction on correlation data out of a shift range in which correction is to be performed is eliminated by setting, to 0, a correction value when the shift amount is not the shift amount of 0 for which correction is to be performed. A correction value shown in FIG. 34B is generated by converting correlation data that underwent such processing into a negative value.

As shown in FIG. 34A, a correlation amount in the light-shielded state that increases when the shift amount is 0 is superimposed on correlation data at the time of focus detection, and as a result, a plurality of minimum points are generated in the waveform of the correlation data. Also, the waveform of the correlation data has a swing width, affected by random noise. Correlation data of e00 is data obtained by converting, into a negative value, correlation data obtained in the OB region, and thus if the correlation data at the time of focus detection is added to a correction value as described above, the correlation amount in the light-shielded state when the shift amount is 0 is cancelled as shown in FIG. 34C.

An addition result is input to the defocus amount calculation unit 410. The defocus amount calculation unit 410 calculates a defocus amount (a Y value) based on correlation data for each AF region, and outputs the defocus amount to the RAM 104. At this time, the defocus amount is calculated using the correlation data that depends on a correlation amount generated in the light-shielded state, and in which a plurality of minimum points have been corrected, and thus the Y value can be appropriately calculated. After that, the procedure advances to step S506.

Next, in step S506, the CPU 101 compares the Y value stored in the RAM 104 to a predetermined threshold, and in the case where the driving distance of the focus lens is smaller than the predetermined threshold, determines that the imaging optical system is in focus, and the procedure advances to step S507. In the case where it is determined that the imaging optical system is not in focus, the procedure advances to step S510. In step S510, the CPU 101 selects, from the Y values for the regions that are stored in the RAM 104, driving distance information to be transferred to the focus driving circuit 110. In this embodiment, the driving distance information of the region f11 is selected as driving distance information of a region in which the focus position is closest. After that, the CPU 101 transfers the selected driving distance information to the focus driving circuit 110. The focus driving circuit 110 generates a signal for driving the focus actuator 112 (driving signal generation means) based on the driving distance information, and drives a third lens group 117 so as to advance/retreat in the optical axis direction, thereby performing focus adjustment. After that, the procedure returns to step S512.

If it is determined in step S506 that the imaging optical system is in focus, and the procedure advances to step S507, the CPU 101 determines in step S507 whether or not a still image shooting switch included in the operation unit 102 has been pressed by the user. In the case where it is determined that the still image shooting switch has been pressed, the procedure advances to step S508. In the case where it is determined that the still image shooting switch has not been pressed, the procedure advances to step S509.

In the case where the still image shooting switch has been pressed, moving image shooting is stopped and still image shooting is performed in step S508. After that, moving image shooting is resumed, and the procedure advances to step S509. In step S509, the CPU 101 determines whether or not a moving image shooting switch has been pressed by the user. In the case where it is determined that the moving image shooting switch has been pressed, moving image shooting is ended. In the case where it is determined that the moving image shooting switch has not been pressed, the procedure returns to step S501, where it is determined whether or not the ISO sensitivity has been changed.

In the case where it is determined in step S501 that the ISO sensitivity has been changed, the procedure advances to step S502, where the CPU 101 sets a gain for the changed ISO sensitivity, in the image sensor 100. Here, in the case where the ISO sensitivity is ISO 200, the setting is made such that a control signal GAIN1 rises to H, and in the case where the ISO sensitivity is ISO 400, the setting is made such that a control signal GAIN2 rises to H.

The above-described operations make it possible to calculate correlation values of an object image and perform appropriate focus position detection, even in the case where a correlation value that is not related to a correlation value obtained from the object image and that is related to a noise component of random noise or the like is superimposed on the correlation calculation result. As a result, even low luminance and low contrast objects can be focused on.

At this time, the absolute value of a correlation calculation result does not fluctuate before and after the correction, by cancelling, in a correction value, a component other than a noise component whose amount is to be corrected. The component other than a noise component whose amount is to be corrected is a component that changes in accordance with a shooting condition such as random noise, and a determination criterion for focus detection of a correlation calculation result does not need to be changed in accordance with the shooting condition, making it possible to cope with all shooting conditions.

Moreover, it is possible to process only target noise without affecting a correlation calculation result for data other than data to be corrected, by invalidating a correction value out of a shift range in which correction is to be performed. Accordingly, appropriate focus detection can be performed without increasing the fluctuation of correlation data out of the shift range in which correction is to be performed. In this embodiment, a configuration is adopted in which a correction value out of a shift range in which correction is to be performed is invalidated by setting the value of 0 as the correction value, but the present invention is not limited thereto. Any configuration can be applied as long as the correction is invalidated, for example, by not calculating a correction value out of a shift range in which correction is to be performed, or turning off a correction state.

Moreover, a configuration is adopted in which correlation data pieces for a component other than a noise component whose amount is to be corrected are averaged to calculate an average value (offset of correction values), but the present invention is not limited thereto. Any configuration can be applied as long as an offset of correction values is detected, for example, by using a median or the like, and the present invention is not limited to the configuration in this embodiment.

Fifth Embodiment

Figure 35:
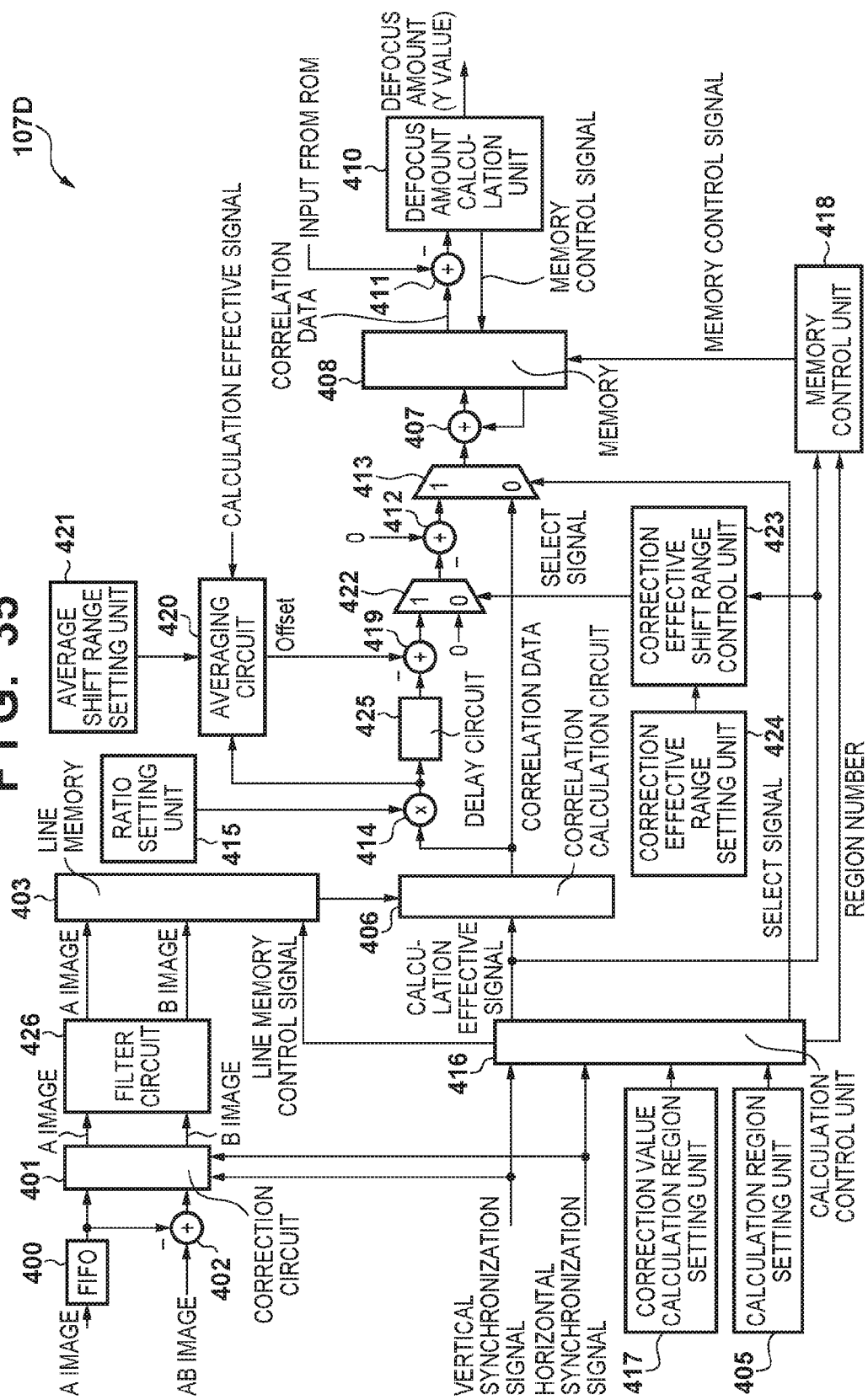
FIG. 35 is a diagram showing the configuration of an AF calculation unit in a fifth embodiment.

Next, an image capturing apparatus according to a fifth embodiment of the present invention will be described. The configuration of the image capturing apparatus of this embodiment is the same as that in the first embodiment (that in the fourth embodiment) shown in FIG. 1, and thus the description thereof is omitted. In the image capturing apparatus of this embodiment, the internal circuit configuration of an AF calculation unit is close to but slightly different from that in the fourth embodiment. FIG. 35 is a diagram showing the configuration of an AF calculation unit 107D in this embodiment. The AF calculation unit 107D of this embodiment is provided with a filter circuit 426. Other constituent elements and the operations thereof are similar to those of the AF calculation unit 107C in the fourth embodiment, and the description thereof is omitted. Configurations and operations different from those of the fourth embodiment will be described below.

In the AF calculation unit 107D of this embodiment, an A image and a B image output from a correction circuit 401 are input to the filter circuit 426. The image A and the B image undergo filter processing in the filter circuit 426 and are then input to a line memory 403.

Here, the filter circuit 426 will be described. The filter circuit 426 performs filter processing on an input image. FIG. 36 shows the relationship between pixel signals and filter coefficients. The pixel value of a target pixel to be subjected to filter processing is denoted by G(0), and the values of pixels adjacent in the horizontal direction are denoted by R(1), G(2), . . . , as in FIG. 36. Letting the value of the target pixel that has undergone filter processing be Gf(0), the following calculations are performed.

$$Gf(0) = X(0)*G(0) + X(1)*R(1) + X(2)*G(2) + X(3)*R(3) + X(4)*G(4) + X(-1)*R(-1) + X(-2)*G(-2) + X(-3)*R(-3) + X(-4)*G(-4)$$

The filter circuit 426 of this embodiment has a mode 1 and a mode 2, representing two coefficients. The mode 1 represents a coefficient for turning of the filter, and is expressed as $X(0)=1$, and the other coefficients take the value of 0. The mode 2 is expressed as $X(-4)=-1$, $X(-2)=-2$, $X(2)=2$ and $X(4)=1$, and the other coefficients take the value of 0.

In this embodiment, the image processing unit 106 is provided with a contrast detection circuit so as to detect an image contrast. In the case where it is determined that the contrast is normal, a CPU 101 sets the filter circuit 426 to the mode 1 (filter off). In the case where it is determined that the contrast is low, the CPU 101 sets the filter circuit 426 to the mode 2.

Due to the above processing, an A image and a B image that have been input are subjected to filter processing, and are input to the line memory 403. Note that in this embodiment, a configuration is adopted in which there are two modes, but the present invention is not limited thereto. A configuration may be adopted in which the coefficient, the number of pixels for filter calculation (the number of taps) and the like can be specified.

Figure 37A:
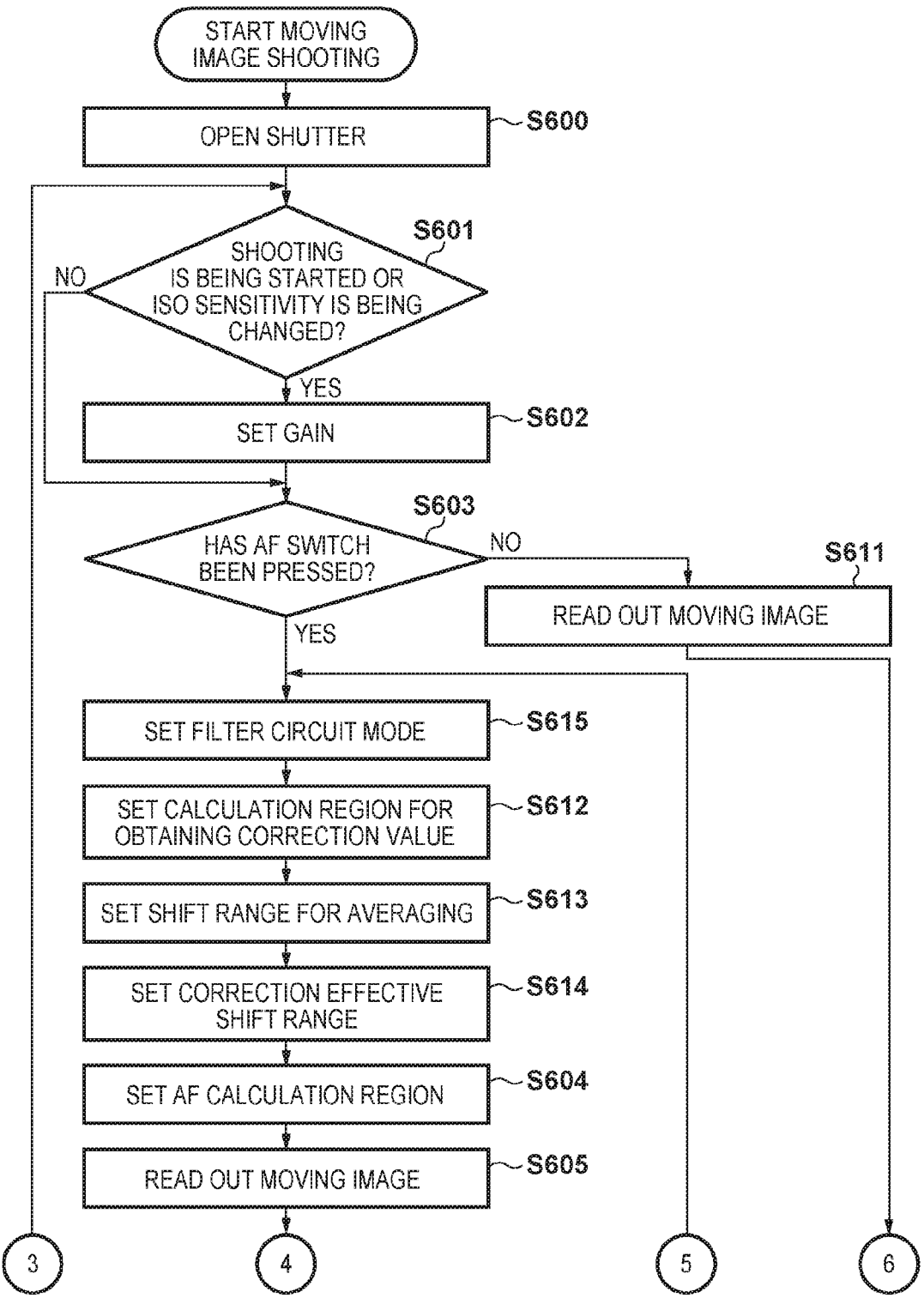
FIGS. 37A and 37B are flowcharts showing the operation of an image capturing apparatus in the fifth embodiment.
Figure 37B:
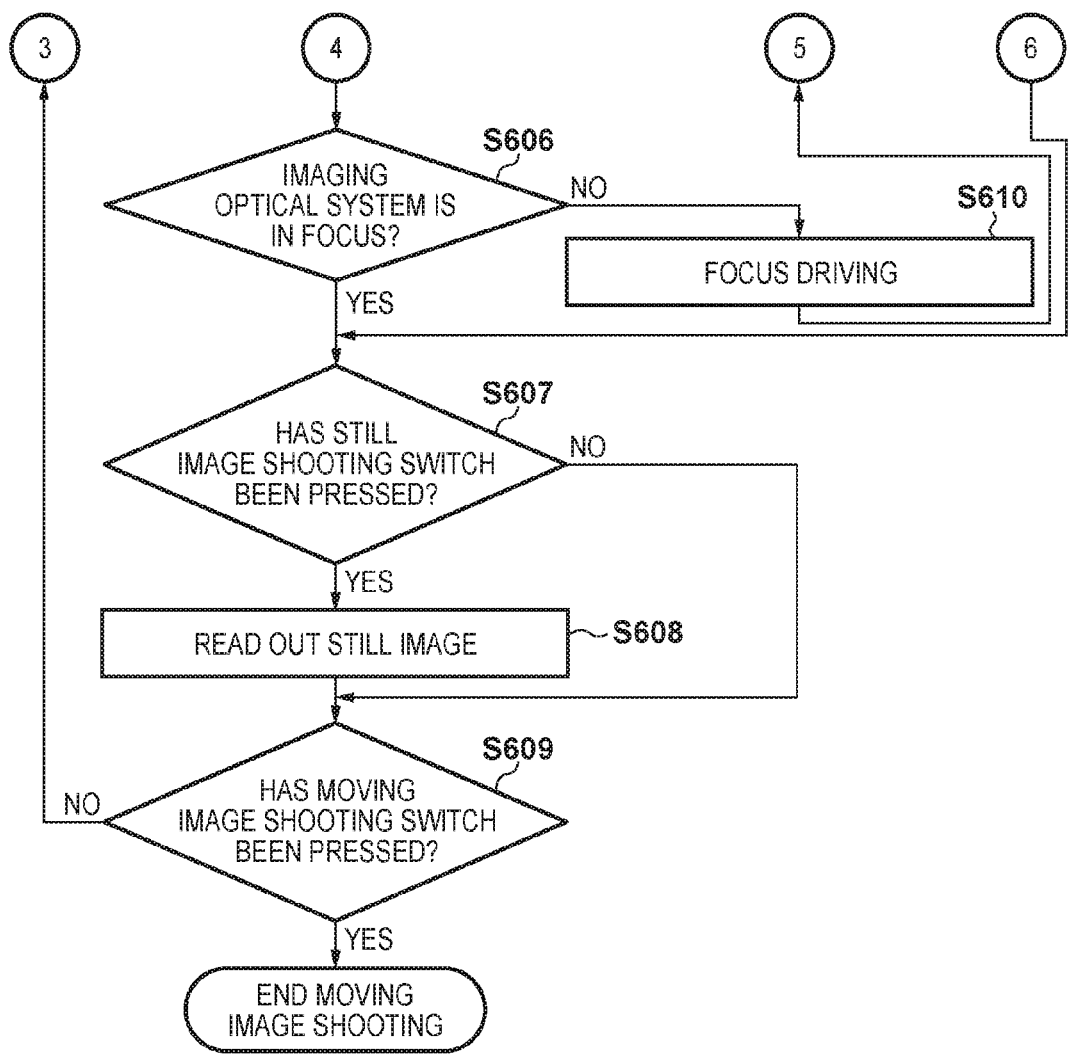

Here, the operations of the image capturing apparatus in this embodiment will be described with reference to FIGS. 37A and 37B. When moving image shooting is started by operating an operation unit 102, first, in step S600, the CPU 101 achieves a state where a focal plane shutter 109 is open. Accordingly, an image sensor 100 enters a state where exposure is possible. After that, the procedure advances to step S601. The processing of steps S601 to S603 is similar to the processing of steps S501 to S503 in the fourth embodiment, and thus the description thereof is omitted.

In the case where it is determined in step S603 that an AF switch has been pressed, the procedure advances to step S615. In step S615, the mode of the filter circuit 426 is set. When shooting is being started, the CPU 101 sets the filter circuit 426 to the mode 1. When shooting is not being started, the mode is set based on a result of the above-described moving image contrast detection. Specifically, in the case where it is determined that the contrast of a moving image is normal, the CPU 101 sets the mode 1. In the case where it is determined that the contrast is low, the CPU 101 sets the mode 2. Next, the procedure advances to step S612. The processing of step S612 is similar to the processing of step S512 shown in FIGS. 30A and 30B, and thus the description thereof is omitted.

Next, in step S613, the CPU 101 sets, for an average shift range setting unit 421, a shift range of correlation data pieces to be averaged by an averaging circuit 420. Here, the setting is made such that correlation data pieces in the range of shift amounts −h to −I are averaged. At this time, as the shift range for the averaging, a shift range other than a shift range set by the correction effective range setting unit 424 to be described later is set. After that, the procedure advances to step S614.

In step S614, the CPU 101 sets a shift range in which correction is effective, for the correction effective range setting unit 424. Here, the setting of a shift range will be described. The shift range set for the correction effective range setting unit 424 is associated with the mode of the filter circuit 426 set in step S615.

As described in the fourth embodiment, when the shift amount is 0, random noise N[A(m)] of an A image is superimposed on a B image by performing correlation calculation for the A image and the B image of the same m-th column. Noise of 2*N[A(m)] is then generated by eliminating the difference in the process of correlation calculation, and will be a peak (noise) of the correlation data. Therefore, when the filter circuit setting is the mode 1, the range of shift amount=0 is set for the correction effective range setting unit 424.

Also, in the case where the filter circuit 426 is set to the mode 2, a component of N[A(m)] in a specific pixel will be included in another pixel due to filter processing. FIG. 38A shows the relationship between the A image and the B image when the shift amount is −4. For example, a component of [A(m)] of G(−4) will be included in G(0) of the A image due to filter processing. Accordingly, if the correlation between G(0) of the A image and G(−4) of the B image is calculated, correlation data noise caused by N[A(m)] will be included. The same applies to the relationship between G(0) and G(4). Therefore, in this embodiment, the correlation data noise caused by N[A(m)] is required to be corrected for shift amounts −4 to 4 at a maximum. For these reasons, in the case where it is determined in step S615 that the filter circuit 426 is set to the mode 2, the range of shift amounts −4 to 4 is set for the correction effective range setting unit 424.

After that, the procedure advances to step S604. The processing of step S604 is similar to the processing of step S504 shown in FIGS. 30A and 30B, and thus the description thereof is omitted. After that, in step S605, image readout is started. When image readout is performed, similarly to step S505 shown in FIGS. 30A and 30B, correlation calculation accompanied by correction of correlation data is performed. The concept of correction value subtraction at this time is shown in FIGS. 39A to 40C.

Figure 39A:
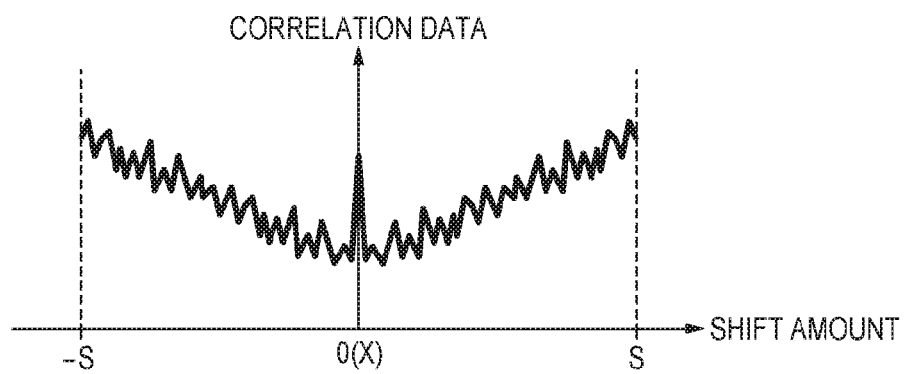
FIGS. 39A to 39C are diagrams illustrating the operation of the AF calculation unit in the fifth embodiment.
Figure 39B:
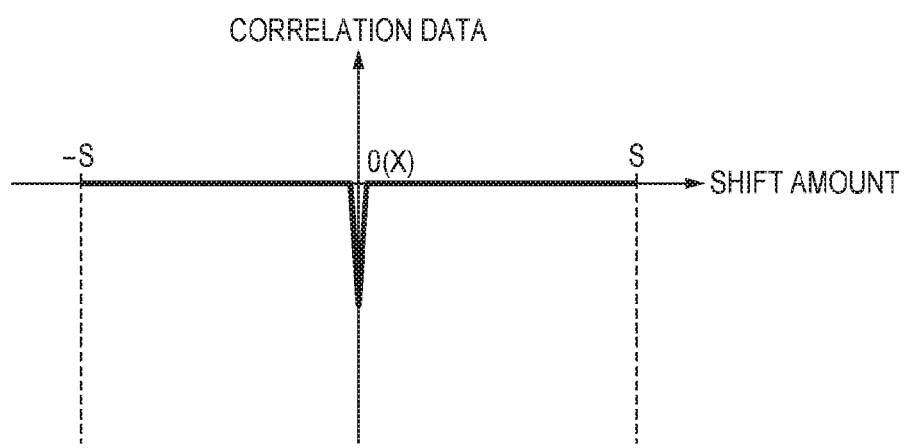
Figure 39C:
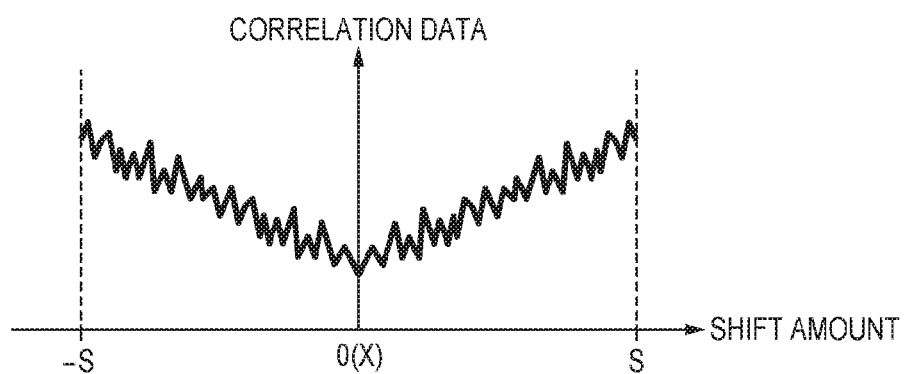

FIGS. 39A to 39C are diagrams showing the concept of correction value subtraction when the filter circuit 426 is in the mode 1. A correlation amount in the light-shielded state that increases when the shift amount is 0 as shown in FIG. 39A is superimposed on correlation data at the time of focus detection, and as a result, a plurality of minimum points are generated in the waveform of the correlation data. Also, the waveform of the correlation data has a swing width, affected by random noise. In addition, as shown in FIG. 39B, the correlation amount in the light-shielded state is reflected on a correction value, and data that has noise of the correlation value only when the shift amount is 0 is obtained. When the correlation data at a time of focus detection is added to the correction value due to correction processing, a correlation amount in the light-shielded state when the shift amount is 0 is cancelled as shown in FIG. 39C.

Figure 40A:
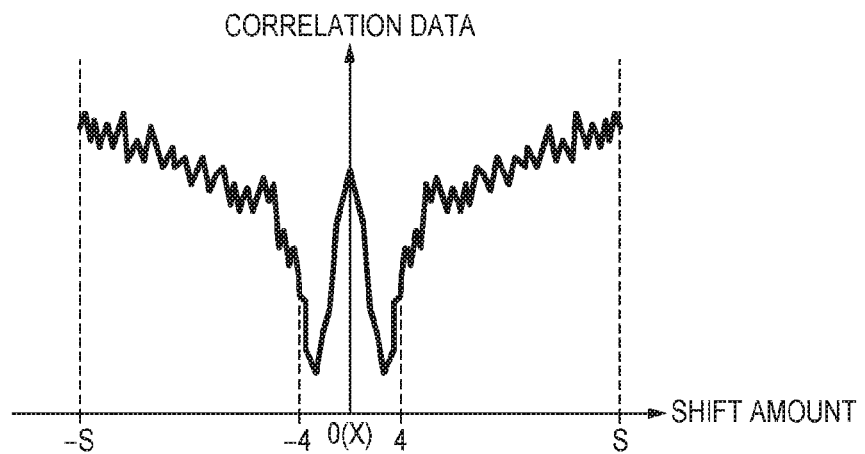
FIGS. 40A to 40C are diagrams illustrating the operation of the AF calculation unit in the fifth embodiment.
Figure 40B:
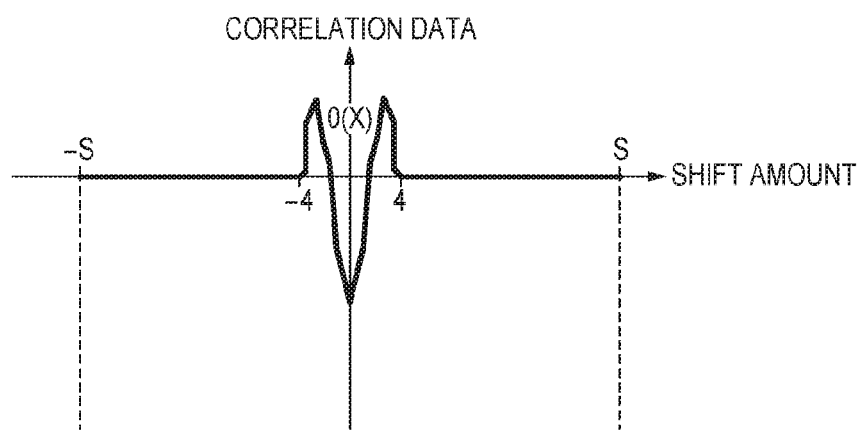
Figure 40C:
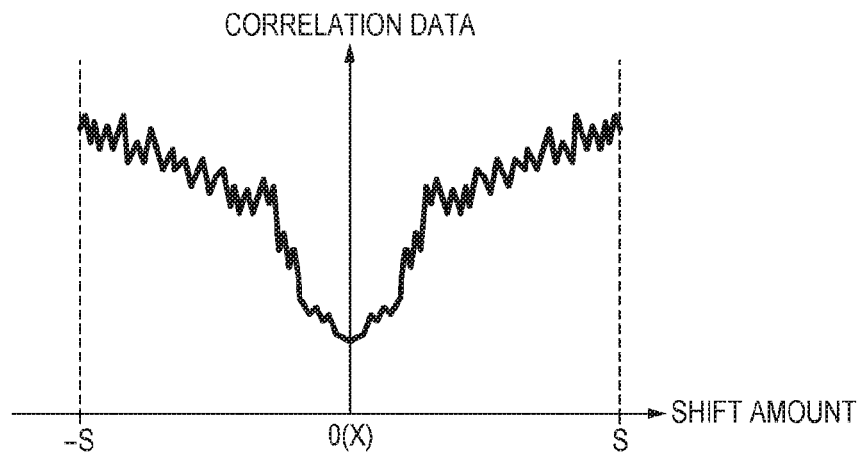

FIGS. 40A to 40C are diagrams showing the concept of correction value subtraction when the filter circuit 426 is in the mode 2. As shown in FIG. 40A, a correlation amount in the light-shielded state that increases in the range of shift amounts −4 to 4 is superimposed on correlation data at a time of focus detection, and as a result, a plurality of minimum points are generated in the waveform of the correlation data. Also, the waveform of the correlation data has a swing width, affected by random noise. In addition, as shown in FIG. 40B, the correlation amount in the light-shielded state is reflected on a correction value. When the filter circuit 426 is in the mode 2, as described above, correlation data noise caused by N[A(m)], which is random noise of an A image, exists in a range of shift amounts −4 to 4, affected by filter processing. Therefore, as shown in FIG. 40B, the correction value will be data that has correlation value noise in the range of shift amounts −4 to 4. If correlation data at the time of focus detection is added to the correction value due to correction processing as shown in FIG. 40C, the correlation amount in the light-shielded state when the shift amount is 0 is cancelled.

The addition result is input to a defocus amount calculation unit 410. The defocus amount calculation unit 410 calculates a defocus amount (a Y value) based on correlation data of each AF region, and outputs the defocus amount to a RAM 104. At this time, the defocus amount is calculated using the correlation data that depends on a correlation amount generated in the light-shielded state, and in which a plurality of minimum points have been corrected, and thus the Y value can be appropriately calculated. After that, the procedure advances to step S606. The operations of steps S606 to S610 are similar to the operations of steps S604 to S610 shown in FIGS. 30A and 30B, and thus the description thereof is omitted.

The above-described operations make it possible to calculate correlation values of an object image and perform appropriate focus position detection, even in the case where a correlation value that is not related to a correlation value obtained from the object image and that is related to a noise component of random noise or the like is superimposed on the correlation calculation result. As a result, even low luminance and low contrast objects can be focused on. At this time, a shift range in which a correction value is effective changes due to filter processing on an A image and a B image, and thus even in the case where a range in which correlation data noise is superimposed is changed due to filter processing, correction adapted to the changed range can be applied.

In this embodiment, a configuration is adopted in which a correction effective range is changed between the case of applying filter processing and the case of not applying filter processing, but the present invention is not limited thereto. A configuration can also be applied in which a correction effective range is changed in accordance with a degree of increased reference pixels for filter processing (the number of taps), a filter coefficient, or the like.

Moreover, in this embodiment, a configuration is adopted in which a correction effective range is changed in accordance with filter processing, but the present invention is not limited thereto. Any processing can be applied as long as a shift range of correlation calculation that is affected by noise caused by subtracting an A image from an AB image to generate a B image fluctuates.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2016-023081, filed Feb. 9, 2016 and No. 2016-214642 filed Nov. 1, 2016, which are hereby incorporated by reference herein in their entirety.

What is claimed is:

1. An image capturing apparatus comprising:
an image sensor in which a plurality of unit pixels, each of which has a first photoelectric conversion portion and a second photoelectric conversion portion arranged for one microlens, are arranged;
a readout unit configured to read out an added signal obtained by adding a signal of the first photoelectric conversion portion and a signal of the second photoelectric conversion portion, and to independently read out the signal of the first photoelectric conversion portion;
a calculation unit configured to calculate a signal corresponding to a signal of the second photoelectric conversion portion by subtracting the signal of the first photoelectric conversion portion from the added signal;
a correlation calculation unit configured to perform correlation calculation for the signal of the first photoelectric conversion portion and the signal corresponding to the signal of the second photoelectric conversion portion; and
a subtraction unit configured to subtract, from a result of the correlation calculation on an object image by the correlation calculation unit, a correction value for correcting noise caused by obtaining the signal corresponding to the signal of the second photoelectric conversion portion by subtracting the signal of the first photoelectric conversion portion from the added signal.

2. The image capturing apparatus according to claim 1, wherein the correction value is generated by the correlation calculation unit performing correlation calculation on an output signal of the image sensor at a position different from a position of the object image.

3. The image capturing apparatus according to claim 2, wherein the output signal of the image sensor at a position different from the position of the object image is an output signal of a light shielded pixel.

4. The image capturing apparatus according to claim 2, wherein the output signal of the image sensor at a position different from the position of the object image is an output signal obtained when the image sensor is shielded from light by a shutter.

5. The image capturing apparatus according to claim 2, further comprising:
a noise readout unit configured to read out a signal other than the signal of the first photoelectric conversion portion and the second photoelectric conversion portion,
wherein the output signal of the image sensor at a position different from the position of the object image is the signal read out by the noise readout unit.

6. The image capturing apparatus according to claim 1, further comprising:
a storage unit configured to store a plurality of correction values; and
a selection unit configured to select a correction value in accordance with a shooting condition,
wherein the subtraction unit subtracts the correction value selected by the selection unit from the result of the correlation calculation on the object image.

7. The image capturing apparatus according to claim 1, wherein the correction value is calculated for each gain amount that is to be applied to a pixel signal of the image sensor.

8. The image capturing apparatus according to claim 1, wherein the correction value is calculated for each environmental temperature of the image capturing apparatus.

9. The image capturing apparatus according to claim 1, wherein the correction value is calculated for each accumulation time of the first and second photoelectric conversion portions.

10. The image capturing apparatus according to claim 1, further comprising:
a correction value calculation unit configured to calculate the correction value using a signal of the image sensor of a frame different from a frame in which focus detection is performed; and
a storage unit configured to store the correction value calculated by the correction value calculation unit,
wherein the subtraction unit subtracts the correction value stored in the storage unit from the result of the correlation calculation on the object image.

11. The image capturing apparatus according to claim 1, further comprising:
a conversion unit configured to convert a positive/negative sign of the correction value,
wherein the subtraction unit subtracts the correction value by adding the value whose positive/negative sign was converted by the conversion unit to the result of the correlation calculation on the object image.

12. The image capturing apparatus according to claim 11, further comprising:
a first setting unit configured to set a pixel region for calculating the correction value;
a second setting unit configured to set a pixel region for performing correlation calculation on the object image; and
a unit configured to, in a case of the pixel region set by the first setting unit, store the value converted by the conversion unit, and to, in a case of the pixel region set by the second setting unit, add the result of the correlation calculation performed by the correlation calculation unit to the converted value.

13. The image capturing apparatus according to claim 12, wherein the pixel region set by the first setting unit and the pixel region set by the second setting unit are positioned in an image of the same frame.

14. The image capturing apparatus according to claim 12, wherein the pixel region set by the first setting unit and the pixel region set by the second setting unit are positioned in images of different frames.

15. The image capturing apparatus according to claim 12, wherein a gain that is applied to the pixel region set by the first setting unit is the same as a gain that is applied to the pixel region set by the second setting unit.

16. The image capturing apparatus according to claim 12, wherein the pixel region set by the first setting unit and the pixel region set by the second setting unit have the same number of pixels in a direction in which the first photoelectric conversion portion and the second photoelectric conversion portion are arranged.

17. The image capturing apparatus according to claim 1, wherein the number of pixels used for calculating the correction value and the number of pixels used for performing correlation calculation on the object image are the same.

18. The image capturing apparatus according to claim 1, further comprising:
a multiplication unit configured to multiply the correction value by a predetermined value.

19. The image capturing apparatus according to claim 18, wherein the predetermined value is a ratio of the number of pixels used for performing correlation calculation on the object image to the number of pixels used for calculating the correction value.

20. The image capturing apparatus according to claim 1, further comprising:
a correction control unit configured to control the subtraction unit such that processing for subtracting the correction value performed by the subtraction unit is applied to a portion of the result of the correlation calculation on the object image.

21. The image capturing apparatus according to claim 20, wherein the correction control unit performs control such that the processing for subtracting the correction value performed by the subtraction unit is not applied to a remaining portion excluding the portion of the result of the correlation calculation on the object image, by setting the correction value to a value of 0.

22. The image capturing apparatus according to claim 20, wherein the correction control unit performs control such that the processing for subtracting the correction value performed by the subtraction unit is not applied to a remaining portion excluding the portion of the result of the correlation calculation on the object image, by not calculating the correction value.

23. The image capturing apparatus according to claim 20, wherein the correction control unit performs control such that the processing for subtracting the correction value performed by the subtraction unit is not applied to a remaining portion excluding the portion of the result of the correlation calculation on the object image, by turning off the subtraction unit.

24. The image capturing apparatus according to claim 20, wherein the correction control unit changes a target in the correlation calculation result to which the processing for subtracting the correction value performed by the subtraction unit is applied, in accordance with image processing on the object image.

25. The image capturing apparatus according to claim 24, wherein the image processing is filter processing.

26. The image capturing apparatus according to claim 25, wherein the correction control unit changes the target in the correlation calculation result to which the processing for subtracting the correction value performed by the subtraction unit is applied, in accordance with a number of taps of filter processing on the object image.

27. The image capturing apparatus according to claim 20, further comprising:
a generation unit configured to generate an offset value that is not related to noise caused by obtaining the signal corresponding to the signal of the second photoelectric conversion portion by subtracting the signal of the first photoelectric conversion portion from the added signal,
wherein the correction value is calculated by the subtraction unit subtracting the offset value generated by the generation unit from the correlation calculation result.

28. The image capturing apparatus according to claim 27, wherein the generation unit generates the offset value by averaging a portion of the correlation calculation result for obtaining the correction value.

29. The image capturing apparatus according to claim 27, wherein the generation unit generates the offset value from a median of a portion of the correlation calculation result for obtaining the correction value.

30. The image capturing apparatus according to claim 27, wherein the generation unit generates the offset value without using data corresponding to the correlation calculation result to which the processing for subtracting the correction value performed by the subtraction unit is applied.

31. A control method of an image capturing apparatus including an image sensor in which a plurality of unit pixels, each of which has a first photoelectric conversion portion and a second photoelectric conversion portion arranged for one microlens, are arranged, the method comprising:

reading out an added signal obtained by adding a signal of the first photoelectric conversion portion and a signal of the second photoelectric conversion portion, and independently reading out the signal of the first photoelectric conversion portion;

calculating a signal corresponding to a signal of the second photoelectric conversion portion by subtracting the signal of the first photoelectric conversion portion from the added signal;

performing correlation calculation for the signal of the first photoelectric conversion portion and the signal corresponding to the signal of the second photoelectric conversion portion; and subtracting, from a result of the correlation calculation on an object image in the calculating of correlation, a correction value for correcting noise caused by obtaining the signal corresponding to the signal of the second photoelectric conversion portion by subtracting the signal of the first photoelectric conversion portion from the added signal.

32. A non-transitory computer-readable storage medium storing a program for causing a computer to execute steps of a control method of an image capturing apparatus including an image sensor in which a plurality of unit pixels, each of which has a first photoelectric conversion portion and a second photoelectric conversion portion arranged for one microlens, are arranged, the control method comprising:

reading out an added signal obtained by adding a signal of the first photoelectric conversion portion and a signal of the second photoelectric conversion portion, and independently reading out the signal of the first photoelectric conversion portion;

calculating a signal corresponding to a signal of the second photoelectric conversion portion by subtracting the signal of the first photoelectric conversion portion from the added signal;

performing correlation calculation for the signal of the first photoelectric conversion portion and the signal corresponding to the signal of the second photoelectric conversion portion; and subtracting, from a result of the correlation calculation on an object image in the calculating of correlation, a correction value for correcting noise caused by obtaining the signal corresponding to the signal of the second photoelectric conversion portion by subtracting the signal of the first photoelectric conversion portion from the added signal.

* * * * *